(12) United States Patent
Wang et al.

(10) Patent No.: US 10,572,952 B1
(45) Date of Patent: Feb. 25, 2020

(54) COMPUTER IMPLEMENTED METHODS SYSTEMS AND ARTICLES OF MANUFACTURE FOR CROSS-FIELD VALIDATION DURING PREPARATION OF ELECTRONIC TAX RETURN

(71) Applicant: Intuit Inc., Mountain View, CA (US)

(72) Inventors: Gang Wang, San Diego, CA (US); Kevin M. McCluskey, Carlsbad, CA (US); Suzette Tritt, San Diego, CA (US); Kyle J. Ryan, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 952 days.

(21) Appl. No.: 14/557,335

(22) Filed: Dec. 1, 2014

(51) Int. Cl.
G06Q 40/00 (2012.01)

(52) U.S. Cl.
CPC ................ *G06Q 40/123* (2013.12)

(58) Field of Classification Search
CPC combination set(s) only.
See application file for complete search history.

(56) References Cited

U.S. PATENT DOCUMENTS

| | | |
|---|---|---|
| 4,213,251 A | 7/1980 | Foundos |
| 4,809,219 A | 2/1989 | Ashford et al. |
| 5,006,998 A | 4/1991 | Yasunobu |
| 5,367,619 A * | 11/1994 | Dipaolo ............... G06F 3/0489 715/221 |
| 5,495,607 A | 2/1996 | Pisello et al. |
| 5,557,761 A | 9/1996 | Chan et al. |
| 5,673,369 A | 9/1997 | Kim |
| 5,742,836 A | 4/1998 | Turpin et al. |
| 5,819,249 A | 10/1998 | Dohanich |
| 6,078,898 A | 6/2000 | Davis |

(Continued)

FOREIGN PATENT DOCUMENTS

| | | |
|---|---|---|
| JP | 2002-117121 A | 4/2002 |
| JP | 2005-190425 A | 7/2005 |

(Continued)

OTHER PUBLICATIONS

Office Action dated Nov. 17, 2016 in U.S. Appl. No. 14/448,922, filed Jul. 31, 2014, inventor: Gang Wang.

(Continued)

*Primary Examiner* — Christopher Bridges
(74) *Attorney, Agent, or Firm* — DLA Piper LLP US

(57) ABSTRACT

Computer-implemented methods, systems and articles of manufacture detecting inconsistent electronic tax return data. In a tax return preparation application in which a tax logic agent and user interface controller share a data store, and the tax logic agent including or executing a cross-field validation engine is separate from or loosely coupled to a user interface controller, the tax logic agent reads runtime data of the electronic tax return from the data store, and the validation engine compares runtime data cross-field rule conditions. A cross-field rule having a condition that is not satisfied by the runtime data is identified, and a non-binding suggestion is generated by the tax logic agent and received by the user interface controller, which generates an interview screen concerning the detected inconsistency for display to the user.

30 Claims, 34 Drawing Sheets

(56) References Cited

U.S. PATENT DOCUMENTS

| | | | |
|---|---|---|---|
| 6,535,883 B1 * | 3/2003 | Lee | G06F 9/44 |
| | | | 707/694 |
| 6,601,055 B1 | 7/2003 | Roberts | |
| 6,631,361 B1 | 10/2003 | O'Flaherty et al. | |
| 6,670,969 B1 | 12/2003 | Halstead et al. | |
| 6,690,854 B2 | 2/2004 | Helbing | |
| 6,697,787 B1 | 2/2004 | Miller | |
| 6,898,573 B1 | 5/2005 | Piehl | |
| 6,912,508 B1 | 6/2005 | McCalden | |
| 7,225,197 B2 * | 5/2007 | Lissar | G06F 16/288 |
| | | | 707/700 |
| 7,234,103 B1 * | 6/2007 | Regan | G06Q 10/00 |
| | | | 705/19 |
| 7,295,998 B2 | 11/2007 | Kulkarni | |
| 7,331,045 B2 | 2/2008 | Martin et al. | |
| 7,448,022 B1 | 11/2008 | Ram et al. | |
| 7,539,635 B1 | 5/2009 | Peak et al. | |
| 7,565,312 B1 | 7/2009 | Shaw | |
| 7,603,301 B1 * | 10/2009 | Regan | G06Q 10/10 |
| | | | 705/30 |
| 7,668,763 B1 | 2/2010 | Albrecht | |
| 7,680,756 B2 | 3/2010 | Quinn | |
| 7,685,082 B1 | 3/2010 | Coletta | |
| 7,693,760 B1 | 4/2010 | Fiteni | |
| 7,693,769 B1 | 4/2010 | Burlison et al. | |
| 7,716,094 B1 | 5/2010 | Sutter et al. | |
| 7,742,958 B1 | 6/2010 | Leek | |
| 7,747,484 B2 | 6/2010 | Stanley | |
| 7,761,333 B2 | 7/2010 | Kapp | |
| 7,778,895 B1 | 8/2010 | Baxter | |
| 7,818,222 B2 | 10/2010 | Allanson et al. | |
| 7,849,405 B1 | 12/2010 | Coletta | |
| 7,860,763 B1 | 12/2010 | Quinn et al. | |
| 7,865,829 B1 | 1/2011 | Goldfield | |
| 7,895,102 B1 | 2/2011 | Wilks et al. | |
| 7,899,757 B1 | 3/2011 | Talan | |
| 7,900,298 B1 | 3/2011 | Char et al. | |
| 7,908,190 B2 | 3/2011 | Enenkiel | |
| 7,912,767 B1 | 3/2011 | Cheatham et al. | |
| 7,912,768 B2 | 3/2011 | Abeles | |
| 7,917,411 B1 * | 3/2011 | Bedell | G06Q 10/10 |
| | | | 705/30 |
| 7,925,553 B2 | 4/2011 | Banks | |
| 8,001,006 B1 | 8/2011 | Yu et al. | |
| 8,019,664 B1 | 9/2011 | Tifford et al. | |
| 8,082,144 B1 | 12/2011 | Brown et al. | |
| 8,086,970 B2 | 12/2011 | Achtermann et al. | |
| 8,108,258 B1 | 1/2012 | Slattery | |
| 8,126,820 B1 | 2/2012 | Talan | |
| 8,190,499 B1 | 5/2012 | McVickar | |
| 8,204,805 B2 | 6/2012 | Eftekhari | |
| 8,224,726 B2 | 7/2012 | Murray | |
| 8,234,562 B1 | 7/2012 | Evans | |
| 8,244,607 B1 | 8/2012 | Quinn | |
| 8,346,635 B1 | 1/2013 | Olim | |
| 8,346,680 B2 | 1/2013 | Castleman | |
| 8,370,795 B1 | 2/2013 | Sage | |
| 8,386,344 B2 | 2/2013 | Christina | |
| 8,407,113 B1 | 3/2013 | Eftekhari et al. | |
| 8,417,596 B1 | 4/2013 | Dunbar et al. | |
| 8,417,597 B1 | 4/2013 | McVickar | |
| 8,447,667 B1 | 5/2013 | Dinamani et al. | |
| 8,452,676 B1 | 5/2013 | Talan | |
| 8,473,880 B1 | 6/2013 | Bennett et al. | |
| 8,478,671 B1 | 7/2013 | Tifford | |
| 8,510,187 B1 | 8/2013 | Dinamani | |
| 8,527,375 B1 | 9/2013 | Olim | |
| 8,560,409 B2 | 10/2013 | Abeles | |
| 8,583,516 B1 | 11/2013 | Pitt et al. | |
| 8,589,262 B1 | 11/2013 | Gang | |
| 8,607,353 B2 | 12/2013 | Rippert et al. | |
| 8,635,127 B1 | 1/2014 | Shaw | |
| 8,639,616 B1 | 1/2014 | Rolenaitis | |
| 8,682,756 B1 | 3/2014 | Tifford et al. | |
| 8,682,829 B2 | 3/2014 | Barthel | |
| 8,694,395 B2 | 4/2014 | Houseworth | |
| 8,706,580 B2 | 4/2014 | Houseworth | |
| 8,788,412 B1 | 7/2014 | Hamm | |
| 8,812,380 B2 | 8/2014 | Murray | |
| 8,813,178 B1 | 8/2014 | Khanna | |
| 8,838,492 B1 | 9/2014 | Baker | |
| 8,892,467 B1 | 11/2014 | Ball | |
| 8,949,270 B2 | 2/2015 | Newton et al. | |
| 9,372,687 B1 | 6/2016 | Pai | |
| 9,690,854 B2 | 6/2017 | Stent et al. | |
| 9,760,953 B1 | 9/2017 | Wang et al. | |
| 9,779,078 B2 * | 10/2017 | Cohen | G06F 17/211 |
| 9,916,628 B1 | 3/2018 | Wang et al. | |
| 9,922,376 B1 | 3/2018 | Wang et al. | |
| 9,990,678 B1 | 6/2018 | Cabrera et al. | |
| 2002/0065831 A1 | 5/2002 | DePaolo | |
| 2002/0107698 A1 | 8/2002 | Brown et al. | |
| 2002/0111888 A1 | 8/2002 | Stanley | |
| 2002/0174017 A1 | 11/2002 | Singh | |
| 2002/0198832 A1 | 12/2002 | Agee | |
| 2003/0101070 A1 | 5/2003 | Mahosky et al. | |
| 2003/0126054 A1 | 7/2003 | Purcell | |
| 2003/0139827 A1 | 7/2003 | Phelps | |
| 2003/0174157 A1 | 9/2003 | Hellman | |
| 2003/0182102 A1 | 9/2003 | Corston-Oliver et al. | |
| 2004/0002906 A1 | 1/2004 | Von Drehnen et al. | |
| 2004/0019540 A1 | 1/2004 | William | |
| 2004/0019541 A1 | 1/2004 | William | |
| 2004/0021678 A1 | 2/2004 | Ullah et al. | |
| 2004/0078271 A1 | 4/2004 | Morano | |
| 2004/0083164 A1 | 4/2004 | Schwartz et al. | |
| 2004/0088233 A1 | 5/2004 | Brady | |
| 2004/0117395 A1 | 6/2004 | Gong | |
| 2004/0123101 A1 * | 6/2004 | Rineer | G06F 21/645 |
| | | | 713/161 |
| 2004/0172347 A1 | 9/2004 | Barthel | |
| 2004/0181543 A1 | 9/2004 | Wu et al. | |
| 2004/0205008 A1 | 10/2004 | Haynie et al. | |
| 2005/0028084 A1 * | 2/2005 | Dziejma | G06F 17/243 |
| | | | 715/225 |
| 2005/0171822 A1 | 8/2005 | Cagan | |
| 2005/0216379 A1 | 9/2005 | Ozaki | |
| 2005/0262191 A1 | 11/2005 | Mamou et al. | |
| 2006/0112114 A1 | 5/2006 | Yu | |
| 2006/0155618 A1 | 7/2006 | Wyle | |
| 2006/0155632 A1 | 7/2006 | Cherkas et al. | |
| 2006/0178961 A1 | 8/2006 | Stanley et al. | |
| 2006/0282354 A1 | 12/2006 | Varghese | |
| 2006/0293990 A1 | 12/2006 | Schaub | |
| 2007/0033116 A1 | 2/2007 | Murray | |
| 2007/0033117 A1 | 2/2007 | Murray | |
| 2007/0033130 A1 | 2/2007 | Murray | |
| 2007/0055571 A1 | 3/2007 | Fox et al. | |
| 2007/0094207 A1 | 4/2007 | Yu et al. | |
| 2007/0136157 A1 * | 6/2007 | Neher, III | G06Q 40/02 |
| | | | 705/31 |
| 2007/0150387 A1 * | 6/2007 | Seubert | G06Q 10/10 |
| | | | 705/31 |
| 2007/0156564 A1 | 7/2007 | Humphrey et al. | |
| 2007/0179841 A1 | 8/2007 | Agassi | |
| 2007/0192166 A1 | 8/2007 | Van Luchene | |
| 2007/0250418 A1 | 10/2007 | Banks et al. | |
| 2008/0059900 A1 | 3/2008 | Murray | |
| 2008/0097878 A1 | 4/2008 | Abeles | |
| 2008/0126170 A1 | 5/2008 | Leck et al. | |
| 2008/0147494 A1 | 6/2008 | Larson | |
| 2008/0162310 A1 | 7/2008 | Quinn | |
| 2008/0177631 A1 | 7/2008 | William | |
| 2008/0215392 A1 | 9/2008 | Rajan | |
| 2008/0243531 A1 | 10/2008 | Hyder et al. | |
| 2009/0024694 A1 | 1/2009 | Fong | |
| 2009/0037305 A1 | 2/2009 | Sander | |
| 2009/0037847 A1 | 2/2009 | Achtermann et al. | |
| 2009/0048957 A1 | 2/2009 | Celano | |
| 2009/0064851 A1 | 3/2009 | Morris et al. | |
| 2009/0117529 A1 | 5/2009 | Goldstein | |
| 2009/0125618 A1 | 5/2009 | Huff | |
| 2009/0138389 A1 | 5/2009 | Barthel | |

(56) References Cited

U.S. PATENT DOCUMENTS

| | | |
|---|---|---|
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0088124 A1 | 4/2010 | Diefendori et al. |
| 2010/0131394 A1 | 5/2010 | Rutsch et al. |
| 2010/0153138 A1 | 6/2010 | Evans |
| 2011/0004537 A1 | 1/2011 | Allanson et al. |
| 2011/0078062 A1* | 3/2011 | Kleyman ............. G06Q 40/123 705/31 |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari ................. G06F 21/31 705/31 |
| 2012/0109793 A1 | 5/2012 | Abeles |
| 2012/0136764 A1 | 5/2012 | Miller |
| 2012/0272221 A1* | 10/2012 | Pessoa .................. G06F 9/4492 717/127 |
| 2012/0278365 A1 | 11/2012 | Labat et al. |
| 2013/0036347 A1 | 2/2013 | Eftekhari |
| 2013/0080302 A1 | 3/2013 | Allanson et al. |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1 | 10/2013 | Finley et al. |
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1* | 5/2016 | Ciaramitaro ......... G06Q 40/123 705/31 |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang et al. |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).

(56) References Cited

OTHER PUBLICATIONS

PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings-taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. App. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages)
Advisory Action for U.S. Appl. No. 14/555,553 dated Apr. 24, 2018 (3pages).

(56) References Cited

OTHER PUBLICATIONS

Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/448,986 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center: pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 16843282.1-1217, (1page).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages)
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).

(56) References Cited

OTHER PUBLICATIONS

Office Action dated Jun. 28, 2017 in U.S. Appl. No. 14/207,121, (29pages).
Office Action dated Sep. 14, 2017 in U.S. Appl. No. 14/530,159, (41pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Application U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Vanderbilt University, "Free tax prep help available for Vanderbilt employees", Feb. 6, 2014, Vanderbilt University, p. 1-3 [NPL-1].
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).

(56) References Cited

OTHER PUBLICATIONS

Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Search Report for PCT/US2017/062777, Applicant: Intuit Inc., Form PCT/ISA/210 and 220, dated: Feb. 21, 2018 (5pages).
PCT Written Opinion of the International Search Authority for PCT/US2017/062777, Applicant: The Regents of the University of California, Form PCT/ISA/237, dated: Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).

\* cited by examiner

| | A | B | C | D | E | F | G | Goal |
|---|---|---|---|---|---|---|---|---|
| R1 | Y | ? | N | ? | ? | ? | ? | Yes |
| R2 | Y | ? | Y | ? | ? | ? | Y | Yes |
| R3 | N | Y | ? | ? | ? | N | Y | Yes |
| R4 | N | Y | ? | ? | N | N | ? | Yes |
| R5 | N | N | ? | N | ? | ? | ? | Yes |

Columns (Questions 462)
(Rows) (Rules 461)
460

Cross Out Since Answer to Question A is "yes" 1010

FIG. 6C

COMPUTER IMPLEMENTED METHODS SYSTEMS AND ARTICLES OF MANUFACTURE FOR CROSS-FIELD VALIDATION DURING PREPARATION OF ELECTRONIC TAX RETURN

SUMMARY

Embodiments are related to cross-field validation of data of an electronic tax return by a tax return preparation application in which tax logic determinations are separated from or independent of generation of interview screens. Data inconsistencies may involve inconsistent data within the same interview screen or form, or inconsistent data of fields that are scattered across multiple screens and not in proximity to each other during the user's tax return preparation experience.

Embodiments are also related to converting runtime data into inactive or shadow data, and reactivating inactive data and reincorporating reactivated data into the electronic tax return. For example, certain data may be active or current runtime data, but as a result of a change of other electronic tax return data, that data is no longer applicable, and can be reclassified or tagged as inactive or shadow data. With a subsequent change of electronic tax return data, inactive or shadow data may once again be relevant or applicable, and can be reintroduced into the electronic tax return, e.g., automatically or together with a request for user confirmation, whereas other data is now categorized or tagged as inactive or shadow data.

Embodiments are also related to cross-field validation system architectures. Certain architectures involve back end or server side cross-field checks and detection of inconsistent tax return data. Systems may be embodied within or comprise a desktop version of a tax return preparation application. Systems may also be embodied within or comprise a tax return preparation application that is an online or cloud resource accessible by multiple users through respective networks. Other architectures involve front end or client side cross-field checks and detection of inconsistent electronic tax return data, e.g., by execution of a validation engine by a browser executed by an end user's or client computing device. Other architectures involve a combination, or a hybrid architecture, in which certain cross-field checks and detection of electronic tax return data inconsistencies are performed on both client and server devices.

Certain embodiments are related to distributed cross-field checks of electronic tax return data. For example, in hybrid systems, front or client side and back or server side cross-field checks can be performed independently, at different times or simultaneously. In certain embodiments, the same set of rules are analyzed by both the client and server systems. In other embodiments, a server system utilizes a complete set of cross-field rules, whereas a subset of cross-field rules is used for client side data checks. The subset of rules may be downloaded to the client computer during a single download or on an as-needed basis based on electronic tax return data that is entered using or received at the client computing device. Thus, server side cross-field checks may be used to supplement or double check cross-field checks performed by the client, and client and server checks may be the same.

Certain embodiments are related to utilizing a browser of an end user's computing device for local cross-field checks of electronic tax return data.

Certain embodiments are related to automatically changing electronic tax return data in response to identifying a cross-field rule having a condition that is not satisfied. User confirmation may be subsequently obtained. Other embodiments are related to identifying a data inconsistency and requesting a user to address the inconsistency or provide data that addresses satisfies the identified cross-field rule.

One embodiment is directed to a computer-implemented method of detecting inconsistent electronic tax return data and is performed a computing device executing or accessing a tax return preparation application to prepare the electronic tax return. The tax return preparation application includes a user interface controller, a tax logic agent in communication with the user interface controller, and a data store shared by the user interface controller and the tax logic agent. The computer-implemented method comprises the tax logic agent reading runtime data of the electronic tax return from the data store and executing a validation engine that accesses cross-field rules, comparing runtime data and conditions of respective cross-field rules, and identifies one or more cross-field rules including one or more conditions that are not satisfied based at least in part upon the runtime data. A non-binding suggestion based at least in part upon the at least one identified cross-field rule is generated by the tax logic agent and received by the user interface controller, which receives the non-binding suggestion and generates an interview screen involving the at least one identified cross-field rule and that is presented to the user.

A further embodiment is directed to a computerized system of a tax return preparation application executable by a computer. One embodiment of a system comprises a user interface controller, a tax logic agent in communication with the user interface controller and comprising a cross-field validation engine; and a data store shared by the user interface controller and the tax logic agent. The user interface controller can write data to the data store, and the tax logic agent can read data from the data store. The tax logic agent includes or executes a cross-field validation engine that is programmed or configured to access a plurality of cross-field rules, compare the runtime data and conditions of respective cross-field rules, and identify at least one cross-field rule including at least one condition that is not satisfied based at least in part upon the runtime data. The tax logic agent is programmed or configured to generate a non-binding suggestion based at least in part upon the at least one identified cross-field rule, and to provide the non-binding suggestion to the user interface controller, which is programmed or configured to receive the non-binding suggestion generated by the tax logic agent and generate an interview screen involving the at least one identified cross-field rule.

Yet other embodiments are directed to a non-transitory computer-readable medium comprising instructions, which when executed by a processor of a computing device, causes the computing device to execute a process for detecting inconsistent electronic tax return data.

In a single or multiple embodiments, runtime data of two, three or other numbers of fields is analyzed relative to cross-field rules. A cross-field rule may be structured as, for example, an if-then rule such as if X then Y, or as a multiple element if-then, rule, such as if X and if Y then Z, if X, then Y and Z, or if X and Y, then A and B. Cross-field rules may involve runtime data that is sued to populate fields of the same or a single interview screen generated by the user interface controller, or of the same electronic tax document or worksheet. Cross-field rules may also involve fields of different interview screens, forms or worksheets.

In a single or multiple embodiments, an inconsistency that is identified involves numerical runtime data for different fields. In other embodiments, an inconsistency involves first runtime data of a first field and second runtime data based on selection of an option from a plurality of options, e.g., checking a box or selecting an answer from "Yes" and "No" options, or selecting an option from a plurality of options. Further, cross-field checks may be performed for current runtime data that is used to populate fields, or to determine which unpopulated fields must be populated given the current runtime data.

In a single or multiple embodiments, the shared data store comprises runtime data of the same documents or topics, e.g., for a first Form W-2 and for a second Form W-2 for when the user had two jobs during the year. Respective instance identifiers may be generated to differentiate these different documents or topics such that when cross-field validation checks are performed and non-binding suggestions are generated for same, the particular document or topic and field thereof can be specifically identified by a corresponding instance identifier.

In a single or multiple embodiments, the user interface controller automatically corrects a data inconsistency. For example, the UI controller may determine how the at least one condition can be satisfied based at least in part upon the non-binding suggestion generated by the tax logic agent or a configuration file that specifies conditions for automatic correction, and automatically writes updated runtime data addressing the inconsistency to the data store. The updated runtime data satisfying the identified cross-field rule replaces the prior runtime data that was stored in the shared data store that caused the at least one condition of the at least one cross-field rule to not be satisfied or the status of that data is changed or designated as active runtime data. Certain corrections do not require user confirmation, e.g., when a rule includes a pre-determined maximum number of response options, such as when a user indicates that he is married, other runtime data indicating he is single can be automatically corrected to reflect a status of married. Other corrections, based on the topic, or number of possible answers, may involve user confirmation. Thus, when a user submits an answer or confirmation, the UI controller writes the answer or confirmed data to the data store to update runtime data, and the next iteration of tax logic agent and validation engine processing is executed using the current or updated runtime data.

In a single or multiple embodiments, runtime data that was previously current tor active, but that was later changed or modified by the UI controller, or replaced with other data, is maintained by the data store and marked or tagged as being shadow or inactive data. Inactive or shadow data may be reactivated later depending on whether the electronic tax return data that is changed back to what it was previously. Thus, when there is a change to certain electronic tax return data, the UI controller may present an interview screen or message to the user regarding the change and indicating that the inactive data is being reactivated given certain electronic tax return data changes. The UI controller may also generate an interview screen that includes inactive data that is presented within a field of an interview screen or form but and that is grayed out, or in shadow, to visually indicate to the user that the shadowed data in the grayed out field is not currently applicable, but was included in the return at a prior time or during a prior iteration of runtime data processing. In the event that inactive or shadow data is reactivated and reincorporated into the electronic tax return, then the next iteration of tax logic agent processing will involve the reactivated data. For these purposes, the shadow or inactive data and the current or updated runtime data may be stored independently of each other on the same shared data store, while still being associated with each other such as through a common instance identifier or other indicator, such as a suitable tag for statuses such as active, inactive, reactivated, confirmed by tax logic agent, confirmed by user.

In a single or multiple embodiments in which inconsistency rule checks are executed on a remote computing device, such as the end user's computing device or distributed among multiple components such as the end user's computing device and a server or cloud resource, the resulting data that is written to the server for subsequent tax logic agent processing may be data may be identification of the inconsistency, which may then be the basis for a suggestion generated by the tax logic agent, or data is to update or replace the current runtime data in the shared data store and which may be written to the shared data store directly or through the UI controller. Thus, the type of data and whether and how it is processed may depend in part upon the functionality that is provided locally, e.g., via execution of a validation engine within a browser executed by the user's computing device.

BRIEF DESCRIPTION OF THE DRAWINGS

FIG. 6C illustrates an example of how a rule engine may process a decision table when determining which question to select;

DETAILED DESCRIPTION OF ILLUSTRATED EMBODIMENTS

Figure 1:
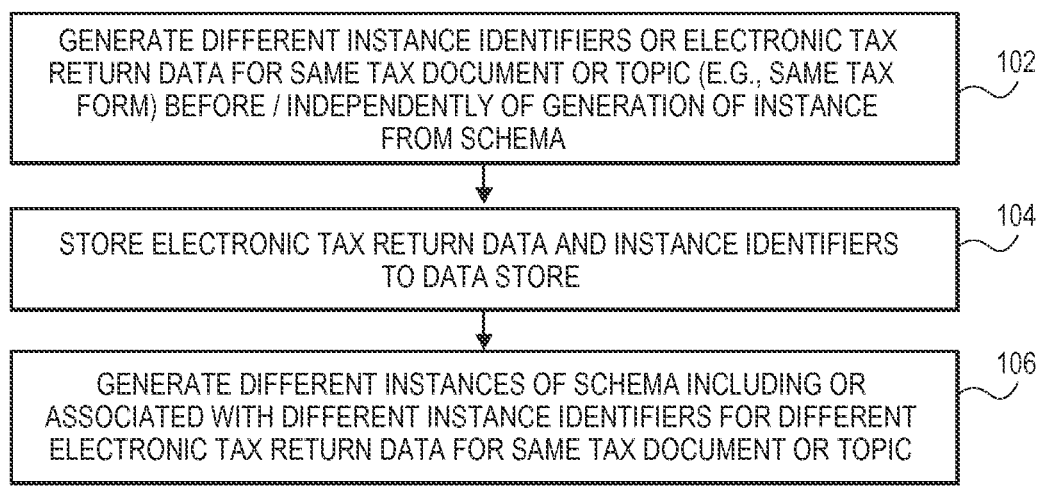
FIG. 1 is a flow diagram of one embodiment of a computer-implemented method for uniquely identifying schema instances that may involve the same tax document or topic during preparation of an electronic tax return.

Embodiments are related to cross-field validation of data of an electronic tax return, or checking different fields of an interview screen or electronic form or worksheet of an electronic tax return prepared by a tax return preparation application. Cross-field checks identify errors or inconsistencies of electronic tax return data that are brought to the attention of the user during preparation of the electronic tax return through an interview screen. For this purpose, runtime data is checked against conditions of respective validation rules.

A simplified example of a validation rule is a withholding amount must be less than gross income. Another simplified example of a rule is that if a user indicates that the user is married, then a box indicating that the user is single must be unchecked. Checking boxes indicating "married" and "single" would result in inconsistent electronic tax return data. As another simplified example, an inconsistency may be identified when the user indicates no dependents are to be claimed, but the electronic tax return includes information about the user's children and daycare expenses. As yet another example, a rule may identify an inconsistency based on the user's social security number being entered in multiple fields when it should be entered in only one field. A further example involves the user entering data for two W-2 forms for different employer, and the user inadvertently copying the same Employer ID for one employer into a field for the other employer. As a final example, a rule may identify an inconsistency based on a field that is currently unpopulated but that must be populated given other data of the electronic tax return. Electronic tax return errors or inconsistencies may involve analysis of fields of the same interview screen or form, or fields that are scattered across different screens or forms such that it may not be readily apparent to a user preparing an electronic tax return utilizing a tax return preparation application. Thus, an error or inconsistency that is in an interview screen or electronic form or document may be brought to the attention of the user before the user has even navigated to that interview screen or electronic form or document, or when the user is currently working on a different interview screen or electronic form or document.

Embodiments are also related to cross-field validation system architectures. Certain architectures involve back end or server side cross-field checks and detection of inconsistent tax return data, e.g., within a desktop version of a tax return preparation application or a tax return preparation application that is an online or cloud resource accessible by multiple users through respective networks. Other architectures involve front end or client side cross-field checks and detection of inconsistent electronic tax return data, e.g., by execution of a validation engine by a browser. Other architectures involve a combination, or a hybrid architecture in which, certain cross-field checks and detection of electronic tax return data inconsistencies are performed on both client and server devices. Thus, for example, cross-field validation may be performed by a dedicated computing device, such as a back end server that hosts an online version of the tax return preparation application constructed according to embodiments and that can be accessed by multiple users. Cross-field validation may also be performed locally on the user's device, e.g., by downloading appropriate software to the user's device, which is executed by the user's browser. Cross-field validation may also involve a combination of these two systems, or a hybrid approach, in which cross-field validation is distributed among different computing devices, which may be later synchronized. For example, certain cross-field validations are performed on the back end or host server on which the tax return preparation application executes, and other cross-field validations are performed locally on the front end by the user's computing device, e.g., when the user is executing a browser to access an online version or a cloud resource of the tax return preparation application. Distributed or hybrid cross-validation systems may also be configured such that the backed or host computer will perform all cross-field validations, including those performed on the front end or locally by the user's computing device, to server as a double check of the validation analysis performed by the user's computing device.

Embodiments are also related to how data that is the subject of inconsistency determinations, and resulting corrected or updated runtime data, are managed with in a data store. With embodiments, data that is identified as being incorrect or inconsistent can be stored together with the correct or active runtime data, but the incorrect or inconsistent data, e.g., data that was corrected and no longer applies given the current runtime data, can be stored and tagged as such (e.g., as "inactive" or "shadow" data), such that if the current or active runtime data is changed back to what it was before, the inactive or shadow data can be restored or reactivated.

Embodiments may utilize computer-implemented methods, computerized systems and articles of manufacture or computer program products for uniquely identifying and distinguishing instances or objects generated from the same schema element for the same type of electronic tax return data during preparation of an electronic tax return as described in U.S. patent application Ser. No. 14/462,315, filed Aug. 18, 2014, entitled COMPUTER IMPLEMENTED METHODS SYSTEMS AND ARTICLES OF MANUFACTURE FOR INSTANCE AND SUGGESTION DIFFERENTIATION DURING PREPARATION OF ELECTRONIC TAX RETURN, Docket No. INT-206-US1 (148178), the contents of which are incorporated herein by reference as though set forth in full.

Aspects of how instance identifiers may be generated, e.g., as described in U.S. application Ser. No. 14/462,315 noted above, are described with reference to FIGS. 1-16, and embodiments related to cross-field validation during preparation of an electronic tax return, which may utilize said instance identifiers, are described with reference to FIGS. 17-26C.

Referring to FIG. 1, regarding generation of unique instance identifiers, when data is received (e.g., for multiple Form W-2s or other forms or documents of the same type that the user has for preparing an electronic tax return), whether entered in an ad hoc or spontaneous manner, or in response to an interview screen generated based on a suggestion, and whether received at different times or simultaneously, different instance identifiers for the electronic tax return data for same tax document or topic are generated before and independently of generation of an instance from the schema. At 104, the electronic tax return data and instance identifiers are written to and stored in the data store, and 106, different instances are generated from the same element or term of the schema. Respective instances include the electronic tax data and associated different instance identifiers that were previously generated for subsequent processing.

Figure 2:
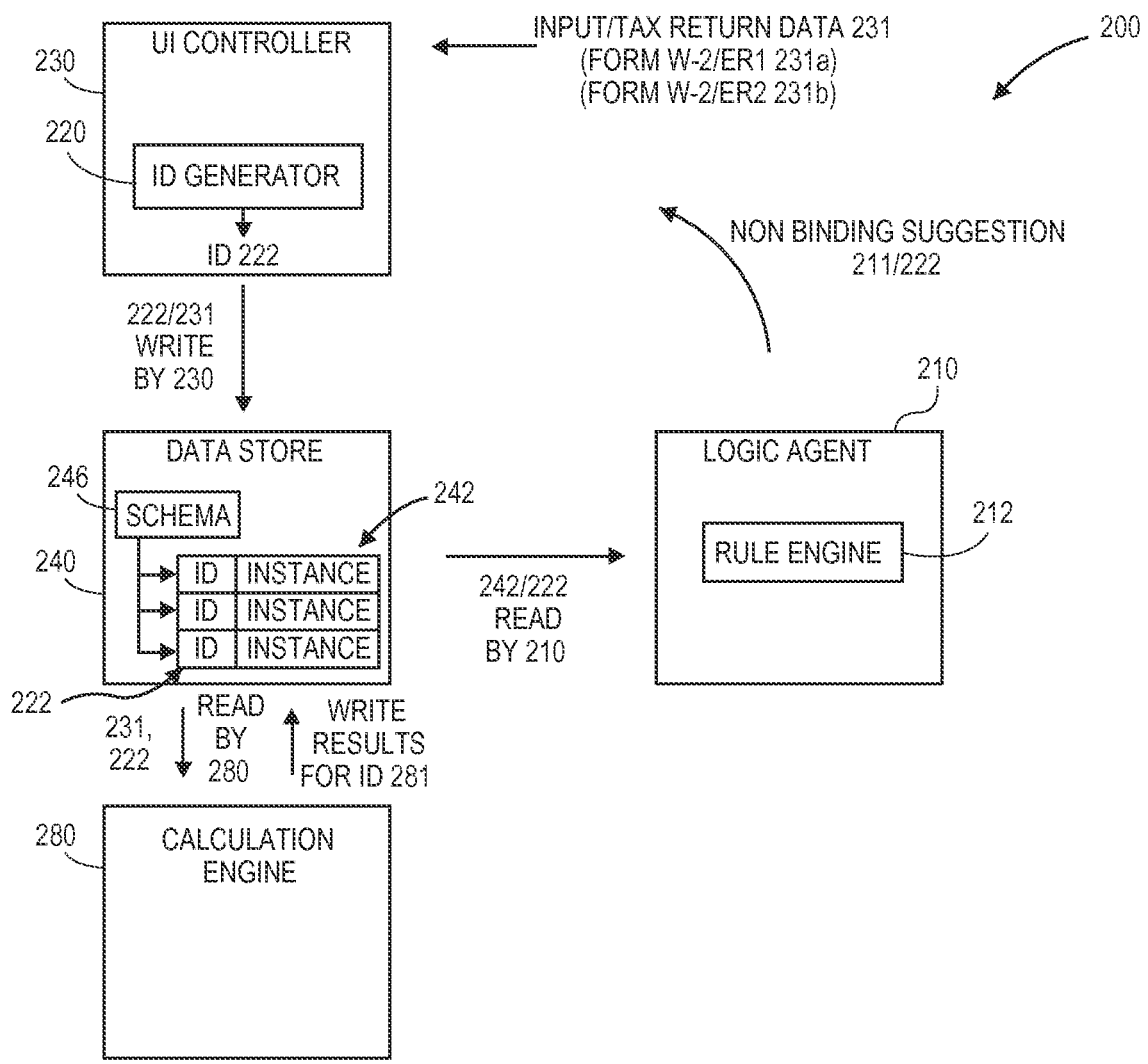
FIG. 2 is a block diagram of a system constructed according to one embodiment that is configured or operable to uniquely identify schema instances that may involve the same tax document or topic during preparation of an electronic tax return.
Figure 3:
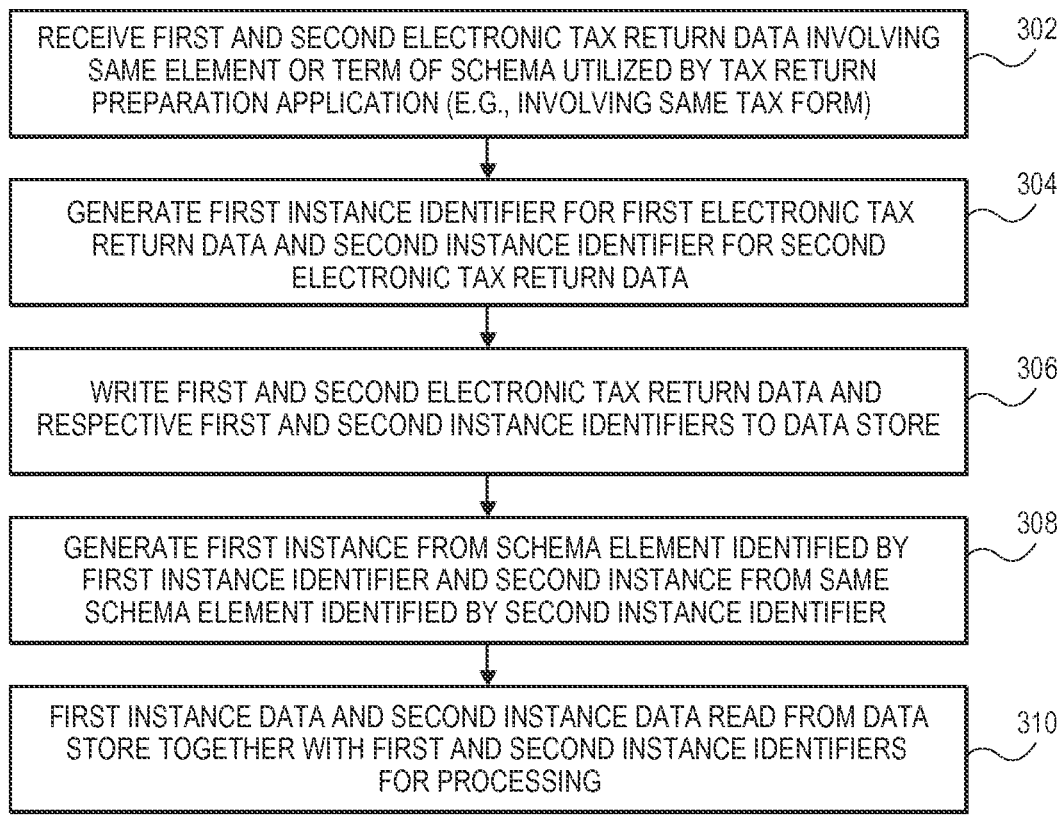
FIG. 3 is a flow diagram of one embodiment of a computer-implemented method for uniquely identifying and processing schema instances that may involve the same tax document or topic during preparation of an electronic tax return.

For example, referring to FIGS. 2-3, a system 200 constructed according to one embodiment comprises a tax logic agent 210 comprising a rule engine 212, which is in communication with a UI controller 230, a data store 240, and a tax calculation engine 280. Tax logic agent 210, UI controller 230 and calculation engine 280 all share the data store 240. UI controller 230 at least writes to shared data store 240, calculation engine 280 reads from and writes to shared data store 240, and tax logic agent 210 at least reads from shared data store 240. Continuing with reference to FIG. 3 at 302, UI controller 230 receives first and second electronic tax return data 231a, 231b involving same element or term of a schema 246 utilized by tax return preparation application (e.g., involving same tax form, different Form W-2s for different employers, ER1 and ER2). At 304, an identifier generator 220 of or utilized by UI controller 230 generates different first and second instance identifiers 222a,b for or based at least in part upon respective first and second electronic tax return data 231a,b. At 306, first and second electronic tax return data 231a,b and respective first and second instance identifiers 222a,b ("Data" and "ID" in FIG. 2) are written by UI controller 230 to shared data store 240. At 308, a first instance 242a is generated or initialized from an element or term of schema 246 and identified by first instance identifier 222a, and a second instance 242b is generated or initialized from the same schema 246 element or term and identified by the different, second instance identifier 222b. At 310, first instance 242a or runtime data and second instance 242b or runtime data are read from shared data store 240 together with first and second instance identifiers 222a,b for processing.

For example, processing may involve, tax logic agent 210 determining one or more non-binding suggestions 211 based at least in part upon runtime or instance data 242, and providing non-binding suggestions 211 including or associated with one or more of instance identifiers 222a,b to UI controller 230 (which was the source or generator of instance identifiers 222).

Processing may also involve calculation engine 280 reading runtime or instance data 242, including associated identifiers 222, and performing calculations using the data to generate calculation results 281. Calculation results 281 are written back to instances 242/data store 240 with reference to identifiers 222, and then runtime data 242 including the new result 281 is read by tax logic agent 210. Thus, not only can UI controller 230 generate instance identifiers 222 for received electronic tax data 231, but other components utilize identifiers 222, and identifiers 222 are later utilized by UI controller 230 when UI controller 230 determines whether or how to process the received non-binding suggestions 211. Further details regarding embodiments are described with reference to FIGS. 4-17.

Figure 4:
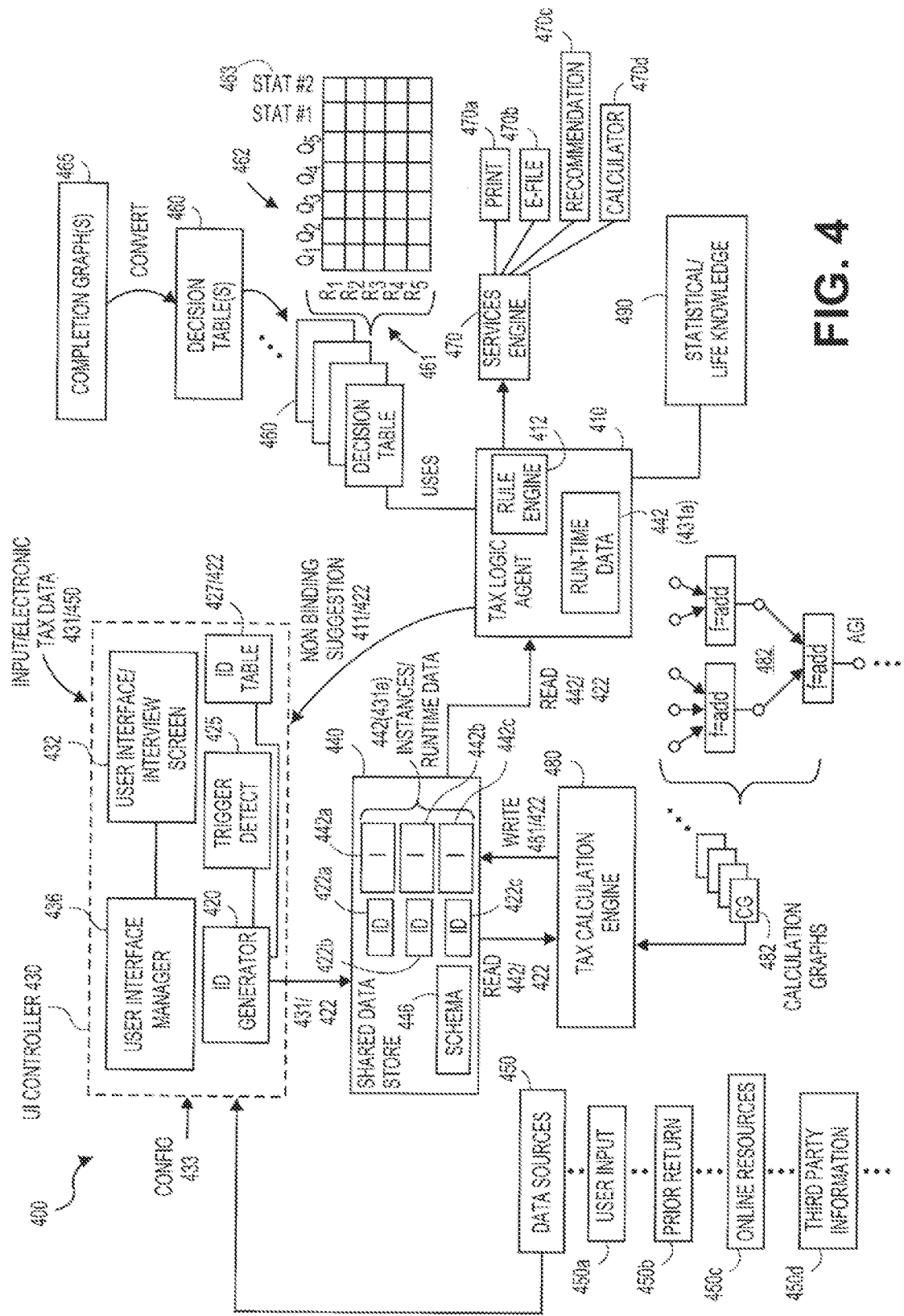
FIG. 4 is a block diagram of a system constructed according to one embodiment that includes a user interface controller configured or operable to uniquely identify schema instances that may involve the same tax document or topic during preparation of an electronic tax return.

FIG. 4 is a more detailed illustration of a system 400 constructed according to one embodiment and that includes tax logic agent 410 comprising or executing a rule engine 412 based on runtime or instance data 442, UI controller 430, shared or intermediate data store 440, and tax calculation engine 480.

In the illustrated embodiment, system 400 includes tax logic agent 410 comprising or executing a rule engine or processor 412 that is used to scan or analyze decision tables 460 using runtime or instance data 442. Rule engine 412 may utilize a fact cache to generate either non-binding suggestions for additional question(s) to present to a user or "Done" instructions which indicate that completeness has occurred and additional input is not needed. Rule engine 412 may operate in the form a Drools expert engine. Other declarative rules engines 412 may be utilized and a Drools expert rule engine is provided as one example of how embodiments may be implemented. Tax logic agent 410 may be implemented as a dedicated module or engine that is executed by or as part of the tax return preparation application and may be embodied as a programmed subroutine that is executed by a processor or controller as described herein.

Tax logic agent 410 reads runtime 442 from shared data store 440. UI controller 430 and tax calculation engine 480 are also in communication with shared data store 440. Logic agent 410 can read runtime data 442 from shared data store 440, UI controller 430 can write data to shared data store 440, and calculation engine 480 can read data from shared data store 440, perform a calculation using a calculation graph 482, and write a calculation or result to shared data store 440.

Tax logic agent 410 is operable to receive runtime or instance data 442 (generally, runtime data 442) based on a "dictionary" of terms of data model or schema 446 (generally, schema 446). Schema 446 specifies, defines or lists tax-related concepts or terms, e.g., by names, type or category and hierarchy such as "name," "social security number," "citizenship," "address," "employer," "interest," "dividends," "mortgage," "deduction," "tax credit," "capital gain," etc. An instance 442 is instantiated or created for the collection of data received and for each term or topic of schema 446. Schema 446 may also specify data constraints such as a certain format of questions and answers (e.g., answer is binary (Y/N) or a number/value). It will be understood that the schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. Further, it will be understood that embodiments may utilize various other schemas, and that these schemas are provided as a non-limiting example of a schema 446 that can be utilized in embodiments.

Runtime data 442 stored in shared data store 440 is used to populate corresponding fields of an electronic tax return or electronic tax form used to prepare an electronic tax return and may be received from or based on data from various data electronic data sources 450a-d (generally, electronic data source 450). Examples of electronic data sources 450 include user input, such as a user answer to a question presented in an interview screen, data imported from a prior year electronic tax return, data from online resources (such as online social networks or other online resources) and third parties databases or resources (such as government databases or documents, such as property tax records, Department of Motor Vehicle (DMV) records, etc. Rule engine 412 reads runtime data 442 including generated identifiers 422 from shared data store 440. Rule engine 412 utilizes decision table 460 including rules 461 to determine, based on the runtime data 442, which rules 461 still require data, or which questions 462 for rules 461 still need to be presented to the user and answered given the current runtime data 442.

Rules 461 may involve various topics. For example, "tax" rules 461 that are utilized by the rule engine 412 may specify types of data or tax documents that are required, or which fields or forms of the electronic tax return should be completed. One simplified example is if a taxpayer is married, then the electronic tax return is required to include information about a spouse. A tax rule 461 may involve if a certain box on a form (e.g., Box 1 of Form W2) is greater than a pre-determined amount, then certain fields of the electronic tax return (e.g., withholding fields) cannot be left empty and must be completed. Or, if Box 1 of Form X is populated, then Form Y must be completed. Thus, tax rules 461 may reflect various tax requirements and are expressed using the concepts or terms of the data model or schema 446.

Rules 461 can be used for identifying or narrowing which questions 462 are identified as potential questions to be presented to the user. This may involve utilizing rules 461 based on one or more associated data structures such as a decision table 460, which is based on a completion graph 465, which recites, for example, requirements of a tax authority or a tax authority rules or laws. Decision table 460 may be used for invalidation of potential questions 461 or topics and input or runtime data 442 requirements.

For example, referring to FIGS. 5A-C, 6A-C and 7, and as described in further detail in U.S. application Ser. No. 14/097,057, filed Dec. 4, 2013, entitled Methods Systems and Computer Program Products for Applying Generated Rules for Personalized Interview Experience," U.S. application Ser. No. 14/206,834, filed Mar. 12, 2014, entitled "Computer Implemented Methods Systems and Articles of Manufacture for Suggestion-Based Interview Engine for Tax Return Preparation Application, and U.S. application Ser. No. 14/448,678, filed Jul. 31, 2014, and entitled "Computer Implemented Methods Systems and Articles of Manufacture for Preparing Electronic Tax Return With Assumption Data," and U.S. application Ser. No. 14/448,886, entitled "System and Method Representing Tax Rules and Calculations Thereof Using Declarative Data Structures, filed Jul. 31, 2014, the contents of all which are expressly incorporated herein by reference as though set forth herein in full, completeness or directed graph 465 reflects a flow of questions and answers of requirements, rules or laws 500 a tax authority or tax collecting entity, and completeness or directed graph 465 is converted into decision table 460.

FIGS. 5A-C and 6A-C illustrate graphically how tax legislation/tax rules 500 are broken down into completeness graph 465 and tax calculation graph 482. Tax legislation or rules 500 are parsed or broken into various topics. For example, there may be nearly one hundred topics that need to be covered for completing a federal tax return. There may be various numbers and many tax topics that need to be covered. When tax legislation or tax rules 500 are broken into various topics or sub-topics, each particular topic (e.g., topics A, B) may each have their own dedicated completeness graph 465, and tax calculation graph 482.

Figure 5A:
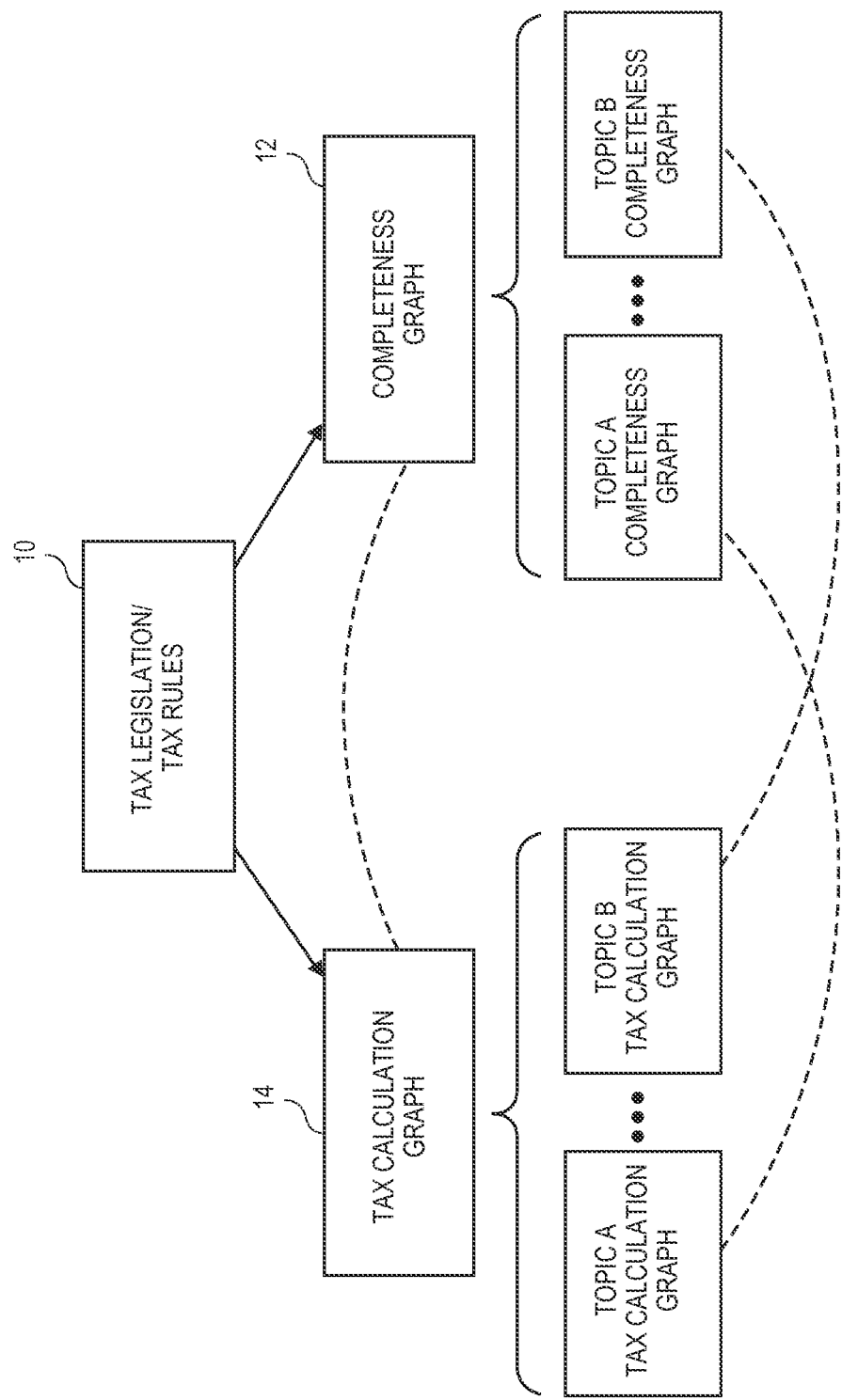
FIG. 5A schematically illustrates how tax legislation/tax rules are parsed and represented by a completeness graph and a tax calculation graph according to embodiments.

As shown in FIG. 5A, completeness graph 465 and tax calculation graph 482 are interdependent as illustrated by dashed lines. In other words, some elements contained within completeness graph 465 are needed to perform actual tax calculations using tax calculation graph 482. Likewise, aspects within tax calculation graph 482 may be needed as part of completion graph 465. Thus, for example, depending on how a system and linking between a completeness graph 465 and tax calculation graph 482 are configured, completion graph 465 may reference or be associated with a particular schema 446 element and associated instance data 442 in shared data store 440, and completion graph 465 may include a pointer or reference to that section of calculation graph 465, and/or calculation graph 465 may include a pointer or reference to a section of completion graph 465. Taken collectively, completeness graph 465 and tax calculation graph 482 represent data structures that capture all the conditions necessary to complete the computations that are required to complete a tax return that can be filed. Completeness graph 465, for example, determines when all conditions have been satisfied such that a "fileable" tax return can be prepared with current runtime data 442. Completeness graph 465 is used to determine, for example, that no additional data input is needed to prepare and ultimately file a tax return, and the tax return can be prepared and filed. Individual combinations of completeness graphs 465 and tax calculation graphs 482 that relate to one or more topics can be used complete the computations required for some sub-calculation. In the context of a tax setting, for example, a sub-selection of topical completeness graphs 465 and tax calculation graphs 482 can be used for intermediate tax results such as Adjusted Gross Income (AGI) or Taxable Income (TI).

Figure 5B:
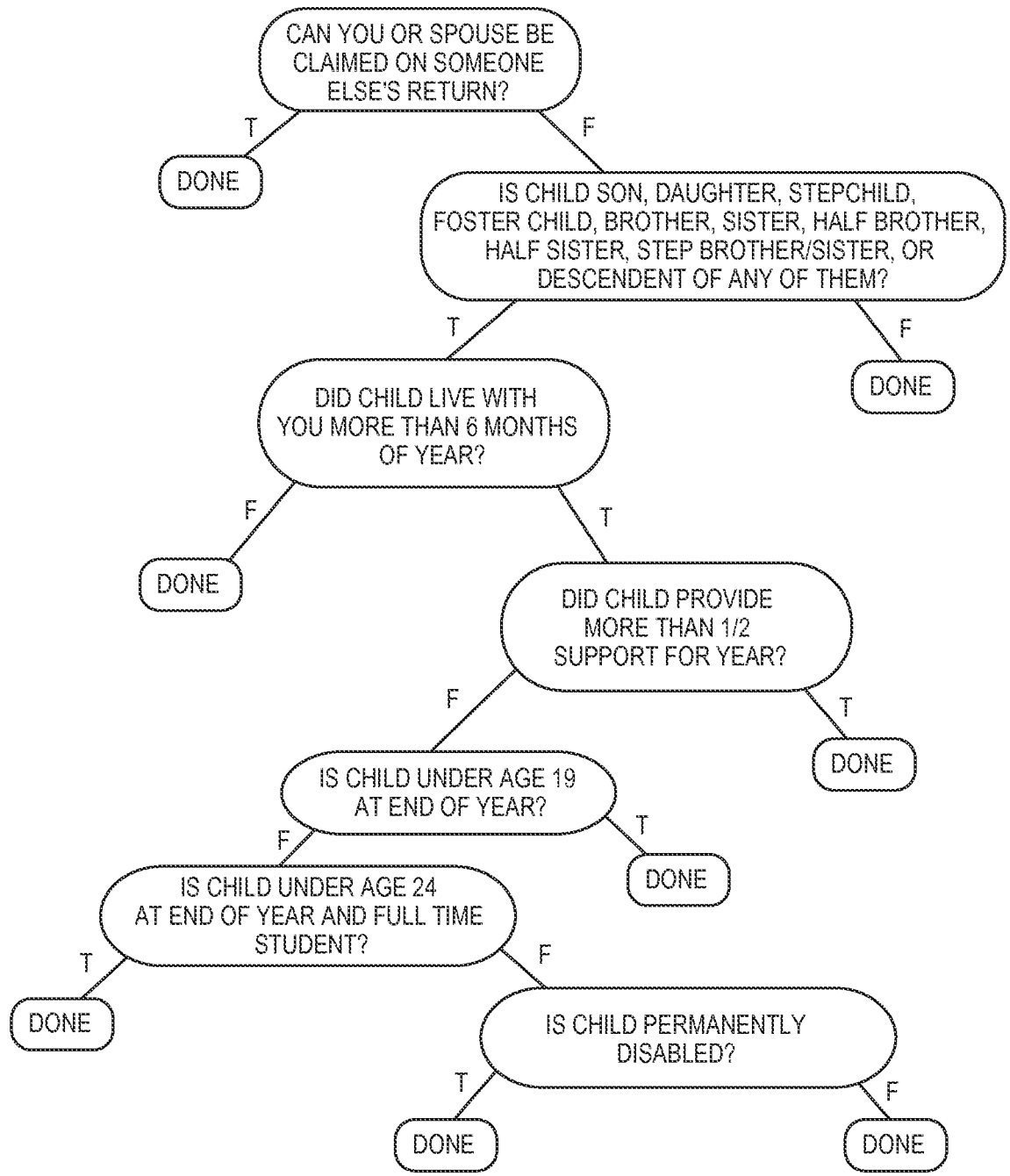
FIG. 5B illustrates an example of a simplified version of a completeness graph related to a qualifying child for purposes of determining deductions for federal income tax purposes.
Figure 5C:
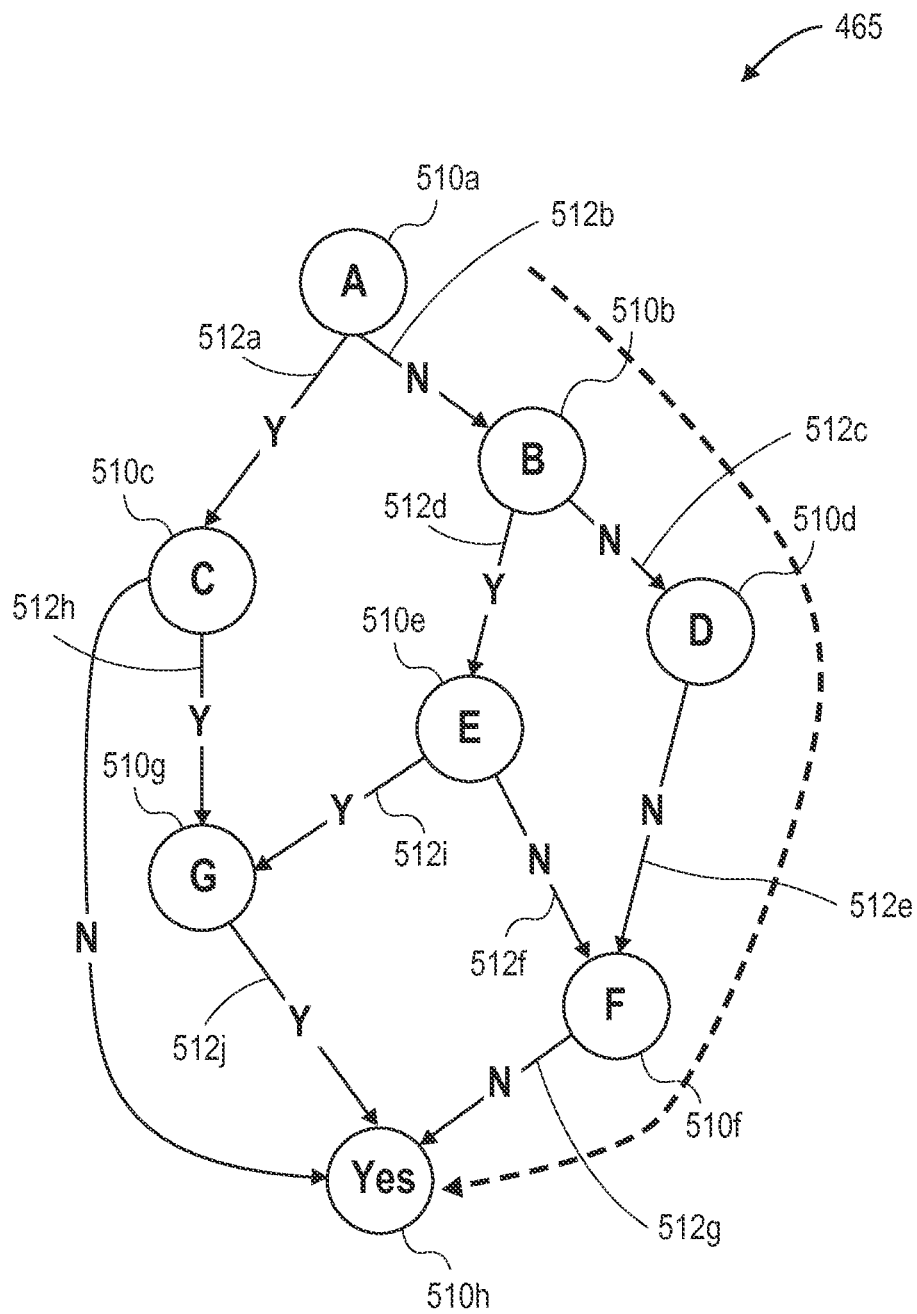
FIG. 5C illustrates an example of a directed graph or completeness graph.

Completeness graph 465 and tax calculation graph 482 represent data structures that can be constructed in the form of tree. FIG. 5C generally illustrates completeness graph 465 in the form of a tree structure including nodes 510*a-g*, in which node 510*a* is a beginning or start node, a "Yes" or termination node 510*h* indicating completion, and arcs 512 a-j representing different possible answers and the relationship between different nodes 510 or questions depend on a basic or general version of a completeness graph 465 for the particular topic, such as determining whether a child qualifies as a dependent for federal income tax purposes. FIG. 5B illustrates an example of a flow-chart based representation of questions, and a more complete flow chart-based representation of questions related to determining a "qualified child" may be found in U.S. patent application Ser. No. 14/097,057, which is incorporated by reference herein. Each node 510 contains a condition that in this example is expressed as a Boolean expression that, in the illustrated embodiment, can be answered in the affirmative or negative. Arcs 512 that connect each node 510 illustrate the answers and dependencies between nodes 510, and the combination of arcs 512 in completeness graph 465 illustrates the various pathways to completion. A single arc 512 or combination of arcs 512 that result in a determination of "Done" represent a pathway to completion. As generally shown in FIG. 5C, there are several pathways to completion.

More specifically, FIG. 5C generally illustrates completeness graph 465 that includes beginning node (Node A) 510*a*, intermediate nodes (Nodes B-G) 510*b-g* and a termination node (Node "Yes" or "Done") 510*h*. Each of the beginning node 510*a*, and intermediate nodes 510*b-g* represents a question. Inter-node connections or arcs 512 represent response options. In the illustrated embodiment, each inter-node connection 512 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options, whereas other nodes, such as nodes D, G and F, have one response option.

As a specific example, referring again to FIG. 5B, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As will be understood, given the complexities and nuances of the tax code, many tax topics may contain completeness graphs 465 that have many nodes 510 with a large number of pathways to completion. However, by many branches or lines within the completeness graph 465 can be ignored, for example, when certain questions internal to the completeness graph 465 are answered that eliminate other pathways, or other nodes 510 and arcs 512, within the completeness graph 465. The dependent logic expressed by the completeness graph 465 utilized according to embodiments allows one to minimize subsequent questions based on answers given to prior questions, which allows for generation of a reduced or minimized question set that is presented to a user as explained herein, thus providing for more efficient, meaningful and user friendly tax return preparation experience.

Figure 6A:
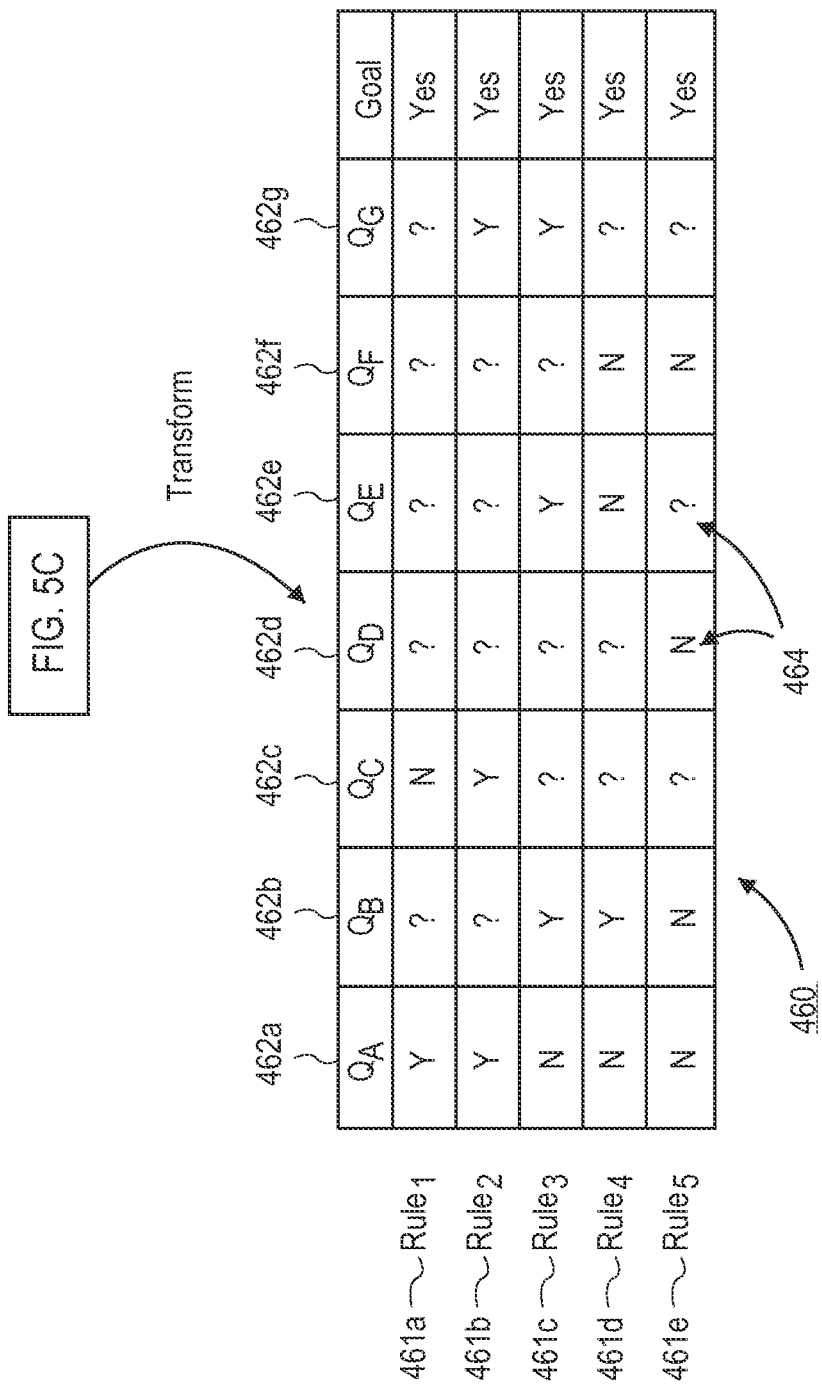
FIG. 6A illustrates a decision table based on or derived from a completeness graph of FIG. 5C.

Referring to FIG. 6A, decision table 460 reflects the question-and-answer flow of completeness or directed graph 465. In the illustrated example, rows of decision table 460 define rules 461*a-e* (e.g., Rules R1-R5 as shown in FIG. 6A), and columns of the decision table 460 indicate questions 462*a-g* (Q1-Q5 shown in FIG. 4 OR Qa-Qg as shown in FIG. 6A). During processing, decision table 460 is scanned by tax logic agent 410 to determine which answers 464 or which aspects of a rule 461 or condition elements are included in received runtime data 442. Tax logic agent 410 determines how much the runtime data 442 completes decision table 460 and determines or selects candidate questions 462 to be presented to user.

Tax logic agent 410 uses decision tables 460 to analyze the runtime data 442 and determine whether a tax return is complete. Each decision table 460 created for each topic or sub-topic is scanned or otherwise analyzed to determine completeness for each particular topic or sub-topic. In the event that completeness has been determined with respect to each decision table 460, then rule engine 412 outputs a "done" instruction to UI controller 430. If rule engine 412 does not output a "done" instruction that means there are one or more topics or sub-topics that are not complete, which, as explained in more detail below presents interview questions to a user for answer. Tax logic agent 410 identifies decision table 460 corresponding to one of the non-complete topics or sub-topics and, using the rule engine 412, identifies one or more non-binding suggestions 411 to present to UI controller 430. Non-binding suggestions 411 may include a listing of compilation of one or more questions from one or more decision tables 460.

Figure 6B:
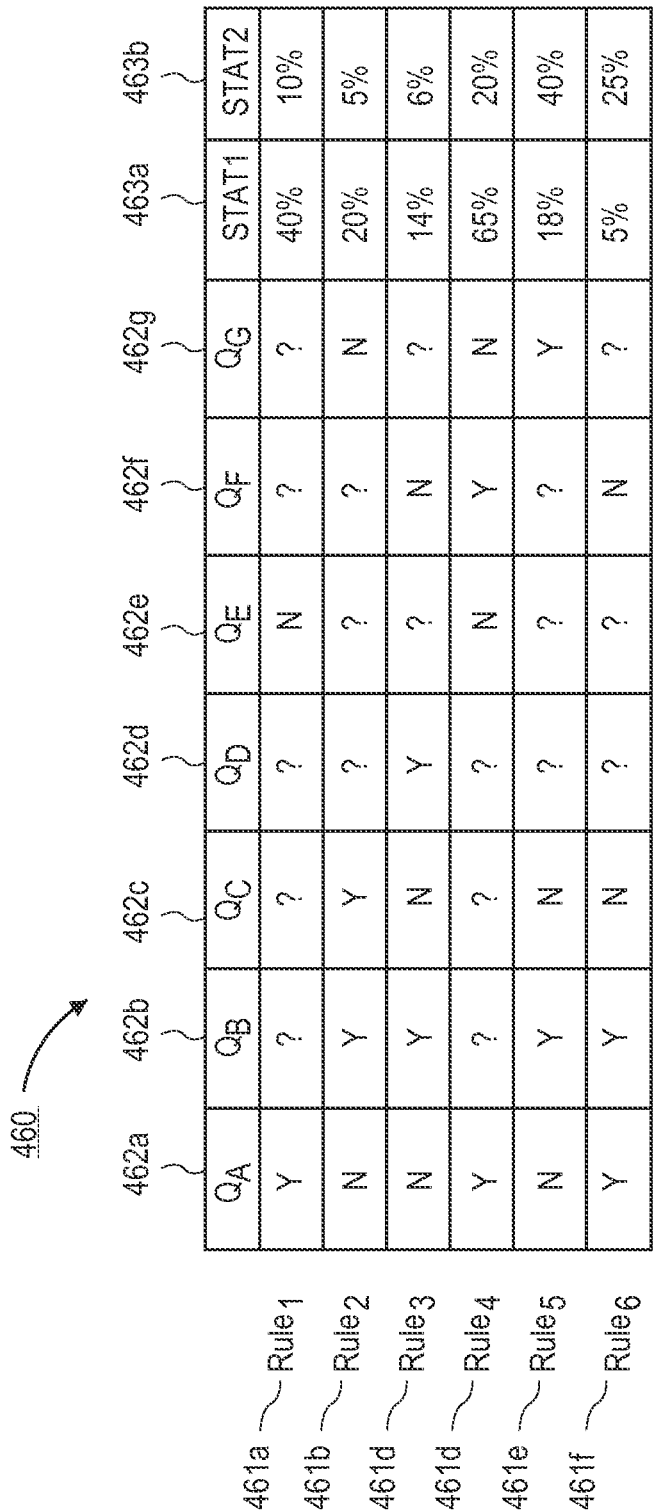
FIG. 6B illustrates another embodiment of a decision table that incorporates statistical data that may be used for determining a likelihood or probability of an answer to a question of the decision table according to embodiments.

The following pseudo code generally expresses how a rule engine 412 functions utilizing a fact cache based on the runtime canonical data 442 or the instantiated representation of the canonical tax schema 446 at runtime and generating non-binding suggestions 411 provided as an input to UI controller 430. As described in U.S. application Ser. No. 14/097,057 incorporated herein by reference, data such as required inputs can be stored to a fact cache so that the needed inputs can be recalled at a later time, and to determine what is already known about variables, factors or requirements of various rules.:

Rule engine (412)/Tax Logic Agent (TLA) (410)
// initialization process
Load_Tax_Knowledge_Base;
Create_Fact_Cache; While (new_data_from_application)
Insert_data_into_fact_cache;

collection=Execute_Tax_Rules; // collection is all the fired rules and corresponding conditions
suggestions=Generate_suggestions (collection);
send_to_application(suggestions);

In one embodiment, as shown in FIG. 6B, statistical data 463 (which may be appended as columns to the rule-question decision table 460 shown in FIG. 6A, may be received from or based on data collected by statistical/life knowledge module 490 described in further detail below) indicates how likely a question or topic 462 is to be relevant to a user given a set of runtime data 442 and may be utilized by rule engine 412 when determining which candidate question or topic 462 to select. Instead of, or in addition to, statistical data 463/490, embodiments may also involve tax logic agent 410 executing one or more predictive models 493 for purposes of determining how likely a question or topic 462 is to be relative to a given user based on input runtime data 442. Examples of predictive models that may be utilized for this purpose include predictive modeling techniques selected from the group consisting of: logistic regression; naive bayes; k-means classification; K-means clustering; other clustering techniques; k-nearest neighbor; neural networks; decision trees; random forests; boosted trees; k-nn classification; kd trees; generalized linear models; support vector machines; and substantial equivalents thereof.

For example, in embodiments that utilize statistical data, decision table 460 may include columns that contain statistical data 463 in the form of percentages. Column (STAT1 shown in FIG. 9B) may contain a percentage value that indicates taxpayers under the age of thirty-five where Rule$_1$ is satisfied. Another column (STAT2 shown in FIG. 6B) may contain a percentage value that indicates taxpayers over the age of thirty-five where Rule$_1$ is satisfied. Any number of additional columns could be added to the decision table 460 and the statistics 463 do not have to relate to an age threshold or grouping. Statistical data 463 may be used, as explained in more detail below, by the tax return preparation application to determine which of the candidate questions ($Q_A$-$Q_G$) 462 should be selected by tax logic agent 410 for presentation to or asked of user. Statistical data 463 may be compared to one or more known taxpayer data fields (e.g., age, income level, tax filing status, geographic location, or the like) such that the question that is presented to the user is most likely to lead to a path to completion. Candidate questions 462 may also be excluded or grouped together and then presented to the user to efficiently minimize tax interview questions during the data acquisition process. For example, questions 462 that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

Tax logic agent 410 may also receive or otherwise incorporate information from statistical/life knowledge module 490. Statistical/life knowledge module 490 contains statistical or probabilistic data related to the current or other users of the tax return preparation application and/or other taxpayers. For example, statistical/life knowledge module 490 may indicate that taxpayers residing within a particular zip code are more likely to be homeowners than renters. Tax logic agent 410 may use this knowledge to weight particular topics or questions related to these topics when processing rules 461 and questions 462 and generating non-binding suggestions 411.

Non-binding suggestions 411 generated by tax logic agent 410 may be, for example, a question, declarative statement, identification of a topic and may include a ranked listing of suggestions 411. Ranking may be weighted in order of importance, relevancy, confidence level, or the like. According to one embodiment, statistical data or results generated by predictive models may be incorporated by tax logic agent 410 to be used as part of the candidate question ranking which, in turn, may be used by tax logic agent 410 to assign a ranking to the non-binding suggestions 411 generated by tax logic agent 410.

For example, questions 462 about home mortgage interest may be promoted or otherwise given a higher weight for users in particular zip codes or income levels. Statistical knowledge 490 or results generated by execution of predictive models may apply in other ways as well. For example, tax forms often require a user to list his or her profession. These professions may be associated with transactions that may affect tax liability. For instance, a taxpayer may list his or her occupation as "teacher." Statistic/life knowledge module 490 may contain data that shows that a large percentage of teachers have retirement accounts, and in particular, 403(b) retirement accounts. This information may then be used by tax logic agent 410 when generating its non-binding suggestions 411. For example, rather than asking generically about retirement accounts, the non-binding suggestion 411 can be tailored directly to a question about 403(b) retirement accounts. According to one embodiment, candidate question scoring and ranking is used to select candidate questions 462 to use to generate a non-binding suggestion 411, and according to another embodiment, ranking is also used to impose a ranking of non-binding suggestions 411 themselves for reference by UI controller 430.

Data that is contained within statistic/life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by statistic/life knowledge module 490. This information may be periodically refreshed or updated to reflect the most up-to-date relationships. Generally, the data contained in the statistic/life knowledge module 490 is not specific to a particular tax payer but is rather generalized to characteristics shared across a number of tax payers although in other embodiments, the data may be more specific to an individual taxpayer.

In one embodiment, rule engine 412 reads runtime data 442 and uses that data 442 as answers or inputs to decision table 460 to eliminate rules 461 that may apply which, is used to eliminate questions 462 from consideration rather than requiring the user to step through each question of a pre-determined sequence of questions in order to conclude that a particular tax situation or topic applies to the user.

For example, referring to FIG. 6C, and continuing with the example of decision table 465 shown in FIG. 6A, runtime data 442 that is known is used to determine which rows or rules 461 to cross out in the decision table 460. In the illustrated example, if it is known from runtime data 442 that the answer to Question A is "Y" then rules 461 R3-R5 involving a "N" answer to Question A are not applicable, and those rows or rules 461 of decision table 460 including a "N" answer to Question A (i.e., the bottom three rows in the illustrated example) can be crossed out 1010 or eliminated from consideration. This leaves two rows or rules 461 R1 and R2 in the illustrated example. Since questions B, D and E are "don't care" or "not relevant" (indicated by "?") and the answer to Question A is already known ("Y"), then the remaining candidate questions 462 that require answers based on the current runtime data 442 include Questions C and G. Thus, rule engine 412 uses decision table 460 to select one or more rules 461 and determine or select one or more candidate questions 462 that are unanswered in view of current runtime or instance data 442 and that should be presented or asked of the user to proceed to completion.

Tax logic agent 410 provides to UI controller 430 a non-binding suggestion 411 comprising a selected question or topic 461 to be addressed. In the illustrated embodiment, UI controller 430 includes a UI or user experience manager 436 that determines how to process the non-binding suggestions 411 with selected questions or topics 461 and generates an interview screen 432 for the UI or selects an interview screen of the UI based on the question or topic 461 of the non-binding suggestion 411. For ease of explanation, reference is made to interview screen generator 432 or resulting interview screen 432. UI controller 430 may include suggestion resolution element, a generator element, and an interview screen management element or flow/view management" module as described in U.S. application Ser. No. 14/206,834, previously incorporated herein by reference. Suggestion resolution element is responsible for resolving the strategy of how to respond to incoming non-binding suggestions 411 provided by tax 410 logic agent, and for this purpose, the suggestion resolution element may be programmed or configured or controlled by configuration files 433 that specify whether, when and/or how non-binding suggestions 411 are processed (e.g., priority, sequence, timing, in a current, next or subsequent interview screen, random, never or ignore, not until additional data received or other tax forms are completed). For ease of explanation, reference is made generally to UI controller 430 and interview screen 432.

For example, configuration file 433 for UI controller 430 may specify one or more or all of how to process non-binding suggestion 411 based on whether to consider or ignore non-binding suggestion 411, when non-binding suggestion 411 should be processed, content of interview screen 432 based on non-binding suggestion 411, how to present content or interview screens 432 based on non-binding suggestion 411 in view of a form factor or type of a computing device utilized by the user of the tax preparation application or that executes the tax return preparation application embodying system components described above, which non-binding suggestion(s) 411 have priority over others or a sequence of non-binding suggestions 411, which UI controller configuration files 433 have priority over others or a sequence of configuration files 433 in the event that multiple UI controller configuration files 433 may potentially be used for purposes of configuration conflict resolution. For example, UI controller configuration file 433 may specify that a non-binding suggestion 411 should be processed or addressed immediately or on the spot, next, at a later time, after certain or other additional tax return data has been received, or at the end of the process. UI controller configuration files 433 may also specify whether non-binding suggestions 411 should be processed individually or aggregated for processing as a group with resolution of any priority issues. As another example, a UI controller configuration file 433 may specify that content should be adjusted or whether or how non-binding suggestions 411 should be processed in view of a screen size or dimension of a type of computing device that executes the tax preparation application since questions or more content may be more suitable for computing devices such as laptop and desktop computers, which have larger screens than smaller mobile communication devices such as smartphones.

UI controller 430 generates the resulting user interaction or experience or creates or prepares an interview screen 432 or content thereof based on a library of visual assets such as pre-programmed interview screens or interview screens that are templates and that can be populated by UI controller 430 with a question 462 or topic of non-binding suggestion 411.

Figure 7:
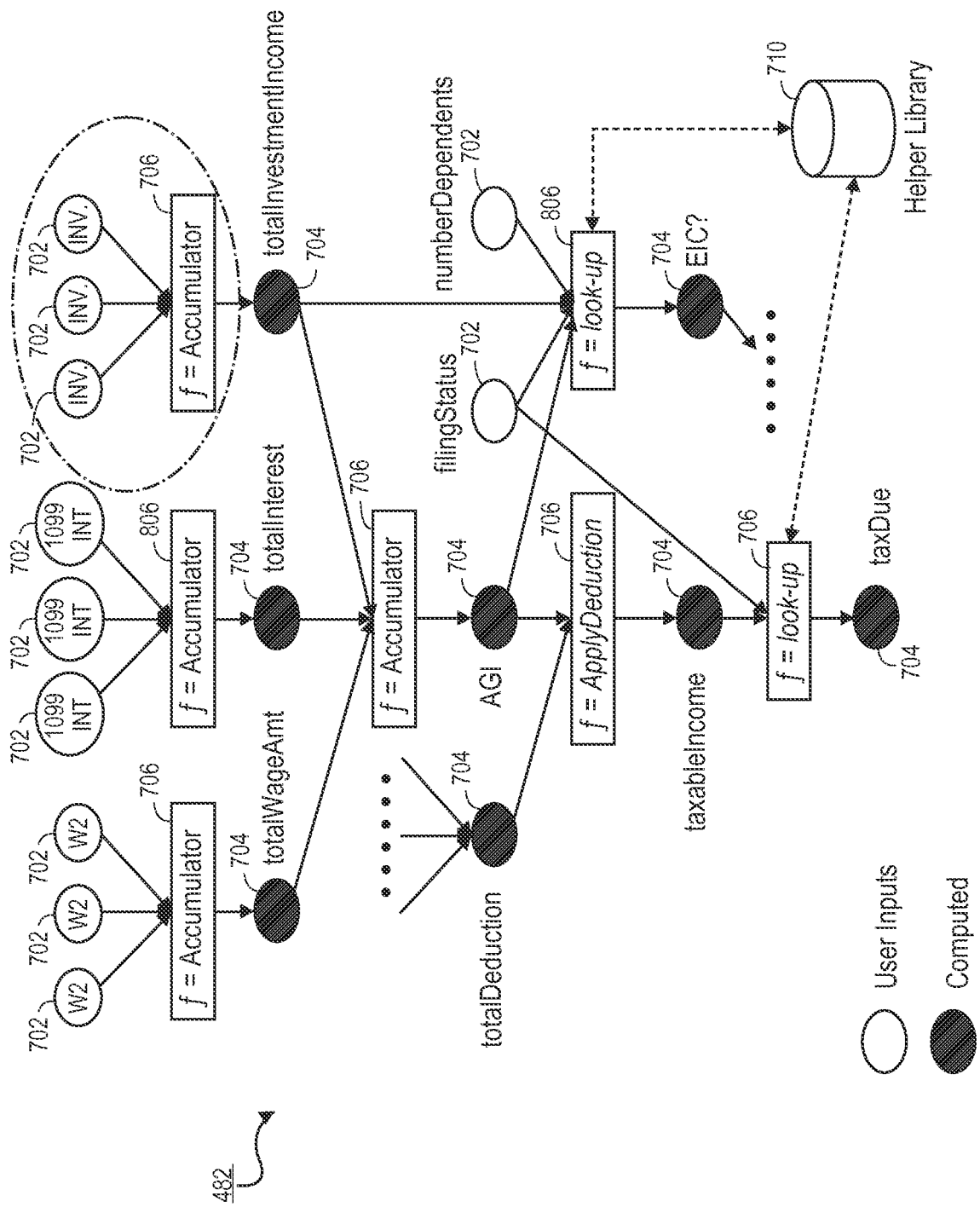
FIG. 7 illustrates an example of a calculation graph.

With continuing reference to FIGS. 4 and 7, tax calculation engine 480 reads current runtime data 442 from shared data store 440, and uses this data as inputs into respective nodes of one or more calculation graphs 482. Respective results or values are calculated with associated functions that are executed with the input data. New or resulting data is written back by tax calculation engine 480 to shared data store 440 for subsequent reading by tax logic agent 410. For example, if runtime data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, tax calculation engine 480 will run calculation graphs 482 again to calculate a new AGI value, which would then be stored to shared data store 440.

FIG. 7 illustrates one example of a tax calculation graph 482. Tax calculation graph 482 semantically describes data dependent tax operations that used perform a tax calculation in accordance with the tax code or tax rules. Tax calculation graph 482 in FIG. 7 is a simplified view of data dependent tax operations that are used to determine the taxes Due (taxDue) based on various sources of income, deductions, exemptions, and credits. Tax calculation graph 482 is a type of directed graph and, in most situations relevant to tax calculations, is a directed acyclic graph that encodes the data dependencies amongst tax concepts or topics.

In FIG. 7, various nodes 702 are leaf or input nodes. Examples of leaf nodes 702 in this particular example include data obtained from W-2 forms, data obtained from 1099-INT forms, data obtained from other investment income (INV), filing status, and number of dependents. Typically, though not exclusively, leaf nodes 702 are populated with user inputs. That is to say the user taxpayer will enter this information from a user interface as described herein. In other embodiments, however, the leaf nodes 702 may be populated with information that is automatically obtained by the tax preparation software. For example, in some embodiments, tax documents may be imaged or scanned with relevant data being automatically extracted using Optical Character Recognition (OCR) techniques. In other embodiments, prior tax returns may be used by the tax preparation software to extract information (e.g., name, potential dependents, address, and social security number) which can then be used to populate the leaf nodes 702. Online resources such as financial services websites or other user-specific websites can be crawled and scanned to scrape or otherwise download tax related information that can be automatically populated into leaf nodes 702. Additional third party information sources such as credit bureaus, government databases, and the like can also be used by the tax preparation software to obtain information that can then be populated in to respective leaf nodes 702.

In still other embodiments, values for leaf nodes 702 may be derived or otherwise calculated. For example, while the number of dependents may be manually entered by a taxpayer, those dependent may not all be "qualifying" dependents for tax purposes. In such instances, the actual number of "qualified" dependents may be derived or calculated by the tax preparation software. In still other embodiments, values for leaf nodes 702 may be estimated.

Still other internal nodes referred to as functional nodes 704 semantically represent a tax concept and may be calculated or otherwise determined using a function 706. Functional node 704 and the associated function 706 define a particular tax operation. For example, as seen in FIG. 7, operation refers to total wage income and is the result of the accumulator function 706 summing all W-2 income from leaf nodes 702. Functional node 704 may include a number in some instances. In other instances, the functional node 704 may include a response to a Boolean expression such as "true" or "false." The functional nodes 704 may also be constant values in some instances. Some or all of these functional nodes 704 may be labelled as "tax concepts" or "tax topics." The combination of a functional node 704 and its associated function 706 relate to a specific tax operation as part of the tax topic.

Interconnected function nodes 704 containing data dependent tax concepts or topics are associated with a discrete set of functions 706 that are used to capture domain specific patterns and semantic abstractions used in the tax calculation. The discrete set of functions 706 that are associated with any particular function node 704 are commonly reoccurring operations for functions that are used throughout the process of calculating tax liability. For example, examples of such commonly reoccurring functions 806 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In one embodiment, the entire set of functions 706 that is used to compute or calculate a tax liability is stored within a data store 710 which in some instances may be a database. The various functions 706 that are used to semantically describe data connections between function nodes 704 can be called upon by the tax preparation software for performing tax calculations. Utilizing these common functions 706 greatly improves the efficiency of the tax preparation software can be used by programmer to more easily track and follow the complex nature of the ever-evolving tax code. The common functions 706 also enables easier updating of the tax preparation software because as tax laws and regulations change, fewer changes need to be made to the software code as compared to prior hard-wired approaches.

Tax calculation graph 482 and the associated function nodes 704 and functions 706 can be tagged and later be used or called upon to intelligently explain to the user the reasoning behind why a particular result was calculated or determined by the tax preparation software program as explained in more detail below. Functions 706 can be de-coupled from a specific narrow definition and instead be associated with one or more explanations. Examples of common functions 706 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plants. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

Function 706 may also include any number of mathematical or other operations. Examples of functions 706 include summation, subtraction, multiplication, division, and comparisons, greater of, lesser of, at least one of, calling of look-ups of tables or values from a database 710 or library as is illustrated in FIG. 7. It should be understood that the function nodes 704 in the tax calculation graph 482 may be shared in some instances. For example, AGI is a reoccurring tax concept that occurs in many places in the tax code. AGI is used not only for the mathematical computation of taxes is also used, for example, to determine eligibility of certain tax deductions and credits. The AGI function node 704 may be found in multiple locations within the tax calculation graph 482. Taxable income is another example of such a function node 704.

Thus, in contrast to the rigidly defined user interface screens used in prior iterations of tax preparation software, embodiments of the current invention provide tax preparation software that runs on computing devices that operates on a new construct in which tax rules and the calculations based thereon are established in declarative data-structures, namely, completeness graph(s) and tax calculation graph(s). Use of these data-structures permits the user interface to be loosely connected or even divorced from the tax calculation engine and the data used in the tax calculations. Tax calculations are dynamically calculated based in tax data derived from sourced data, estimates, or user input. A smart tax logic agent 410 running on a set of rules 461 can review current run time data 442 and evaluate missing data fields and propose suggested questions 411 to be asked to a user to fill in missing blanks. This process can be continued until completeness of all tax topics reflected in decision tables 460 has occurred. An electronic return can then be prepared and filed with respect to the relevant taxing jurisdictions.

UI controller 430 may also include or utilize an identity generator module 420 (generally, ID generator 420) as shown in FIG. 4 that generates an identifier 422 for an instance 442 to be generated based on schema 446 of shared data store 440. Thus, embodiments involve an ID generator 420 that generates identifier 422 for instance 442 independently of shared data store 440 or processing element of or utilized by shared data store 440 to generate instances 442, and before instance 442 has been generated from schema 446. Further, in the embodiment illustrated in FIG. 4, embodiments involve UI controller 430 including ID generator 420 to generate instance identifier 422 and later receive non-binding suggestion 411 with that same instance identifier 422 for continuing reference by UI controller 430 when processing suggestions 411 and writing results 481 or electronic tax return data 431 to shared data store 440. Thus, embodiments, uniquely identify instances 442 and suggestions 411, which may involve the same term or element of schema 446. For example, if a taxpayer has multiple Form W-2s for different jobs, or multiple 1099-INT forms for interest earnings from different financial institutions, embodiments are utilized to uniquely identify and distinguish these two different forms for the same topic. In this manner, calculation engine 480, tax logic agent 410, and UI controller 430, initially and when processing non-binding suggestions 411, can uniquely identify the proper Form W-2 or Form 1099-INT that is the subject of a calculation result 481 or suggestion 411, for example, and which ones are not.

Further embodiments and aspects of embodiments are described in further detail below with reference to FIGS. 8-17.

Figure 8:
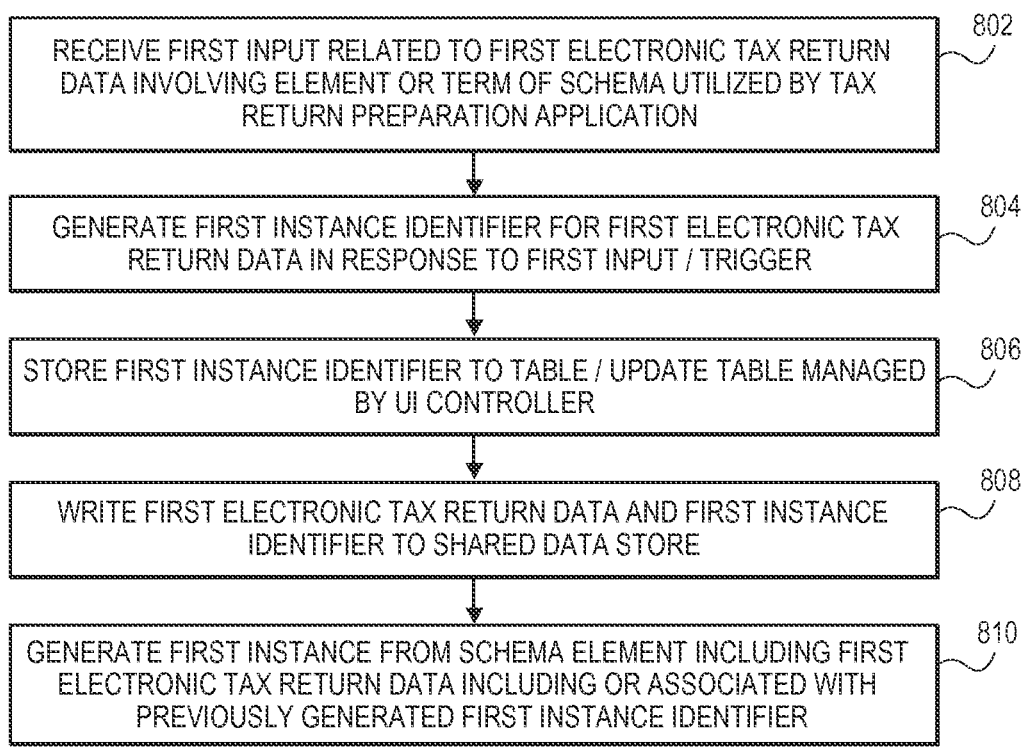
FIG. 8 is a flow diagram illustrating one embodiment for generating and writing electronic tax return data and an instance identify to a shared data store.

Referring to FIG. 8, in a computer-implemented method according to one embodiment, at 802, UI controller 430 receives a first input of or related to first electronic tax return data 431 involving element or term of schema 446 utilized by tax return preparation application. The input may be a request by a user to begin preparing a particular electronic tax return form, selecting a field, entering data, or importing data. One or more of these inputs is used to trigger generation of an instance identifier 422, and for this purpose, UI controller 430 as shown in FIG. 4 includes a trigger detect module 425 (generally, trigger 425 or trigger module 425) in communication with ID generator 420. Thus, according to one embodiment, a trigger input for generation of instance identifier 422 is the user submitting a request through UI controller 430, or through an interview screen 432 generated by UI controller 430, to enter data into an electronic tax form of the electronic tax return. For example, the trigger input may be based on a request to begin preparation of a particular tax document, or selection of a button, field or other UI element within an interview screen 432 generated by UI controller 430, or entry by the user of data into a field or selection of a certain answer or option presented with in interview screen 432.

Other embodiments may involve a trigger input in the form of a request by the user to import electronic tax return data from an electronic tax return of a prior tax year, initiating the importation of such data, or populating a pre-determined field of an interview screen 432 with such data. Other embodiments may involve a trigger input in the form of a request to import electronic tax return data from an electronic file of a financial management system utilized by the user, initiating the importation of such data, or population of a pre-determined field of an interview screen 432 with such data. Further, UI controller 430 may involve a trigger input in the form of a request to import, or importation of, data from other data resources such as an account the user has with an online social networking site such as linkedin.com or facebook.com.

Continuing with reference to FIGS. 4 and 8, at 804, UI controller 430 generates a first instance identifier 422a for first electronic tax return data 431a in response to first input/trigger detected by trigger module 425. Continuing with the examples above, the electronic tax return data 431a may be for Form 1099-INT, and a first instance identifier 422a is generated for this data.

According to one embodiment, instance identifier 422 is generated for each data element received, e.g., for each specific piece of data (name, SSN, income, etc.) as well as for a collection or aggregation or collection of data (e.g., a separate instance identifier 422 for schema 466 element Form W-2 that includes a collection of other data that have their own instance identifiers 422). According to one embodiment, instance identifier 422 that is generated is a Universally Unique Identifier (UUID), which is represented by 32 hexadecimal digits, resulting in approximately $3.4 \times 10^{38}$ possible UUID combinations. While this specification refers to a "unique" instance identifier 422, it will be understood that the probability of an instance identifier 422 being unique or not being duplicated is 99.99%+(e.g., for when UUIDs are utilized), and while there is a minute possibility that there could be a duplicate UUID, for purposes of explanation, reference is made to a unique UUID or unique instance identifier 422.

According to another embodiment, instance identifier 422 is generated by UI generator 430 utilizing a random generator, such as a random number generator of a suitable number of digits to provide a suitable number of number possible instance 422 variations to provide for "unique" instance identifiers 422. UUIDs may also involve randomly generated numbers.

Certain embodiments may utilize instance identifiers 422 that embody or incorporate other aspects of the system, such as timestamp data of when a user request was made through UI controller 430, when electronic tax return data 431 was received or imported, and timestamp data of when an instance identifier 422 was generated. UUIDs may also use or be based at least in part upon these or other types of timestamp data. Certain embodiments may also embody or incorporate other system aspects such as an identifier, such as a network address, of a computing component that generated the instance identifier 422. UUIDs may also be based on a Media Access Control (MAC) address of the computing component that generated the UUID. Certain embodiments may also utilize an instance identifier 422 that embodies or encodes the electronic tax return data 431 itself. Embodiments may also utilize one or more of these identifier generation methods. Moreover, while FIG. 8 involves generation of a first instance identifier 422a, or first set of instance identifiers, a second instance identifier 422b or second set of instance identifiers (as described with reference to FIG. 9) may be generated utilizing the same generation method, or generated utilizing a different generation method to increase the probability that instance identifiers 422 will not be duplicated. Accordingly, it will be understood that various types, numbers and combinations of instance identifier generation methods may be utilized according to embodiments. For ease of explanation, reference is made to the UI controller 430 generating the instance identifier 422.

Continuing with reference to FIG. 6, at 806, according to one embodiment, UI controller 430 may maintain a record of instance identifiers 422 that are generated for a particular user, or for a particular tax return, and record those to a table 427, database or other data structure maintained by the UI controller 430 or ID generator 420. This table 427 may be used as cross-check to ensure that no duplicate instance identifiers 422 have been generated (although such probability is very low) and also for recording information about non-binding suggestions 411 involving those instance identifiers 422 as described in further detail below. If a duplicate instance identifier 422 is detected, ID generator 420 may generate another instance identifier 422.

At 808, first electronic tax return data 431a and first instance identifier 422a generated by UI controller 230 are written to shared data store 240 which, at 808, generates first instance 442a from schema 446 element or term including first electronic tax return data 431a and including or associated with previously generated first instance identifier 422a. As noted above, first electronic tax return data 431a may involve different numbers of instance identifiers 422, and for ease of explanation, reference is made to first electronic tax return data 431a and first instance identifier 422a.

Figure 9:
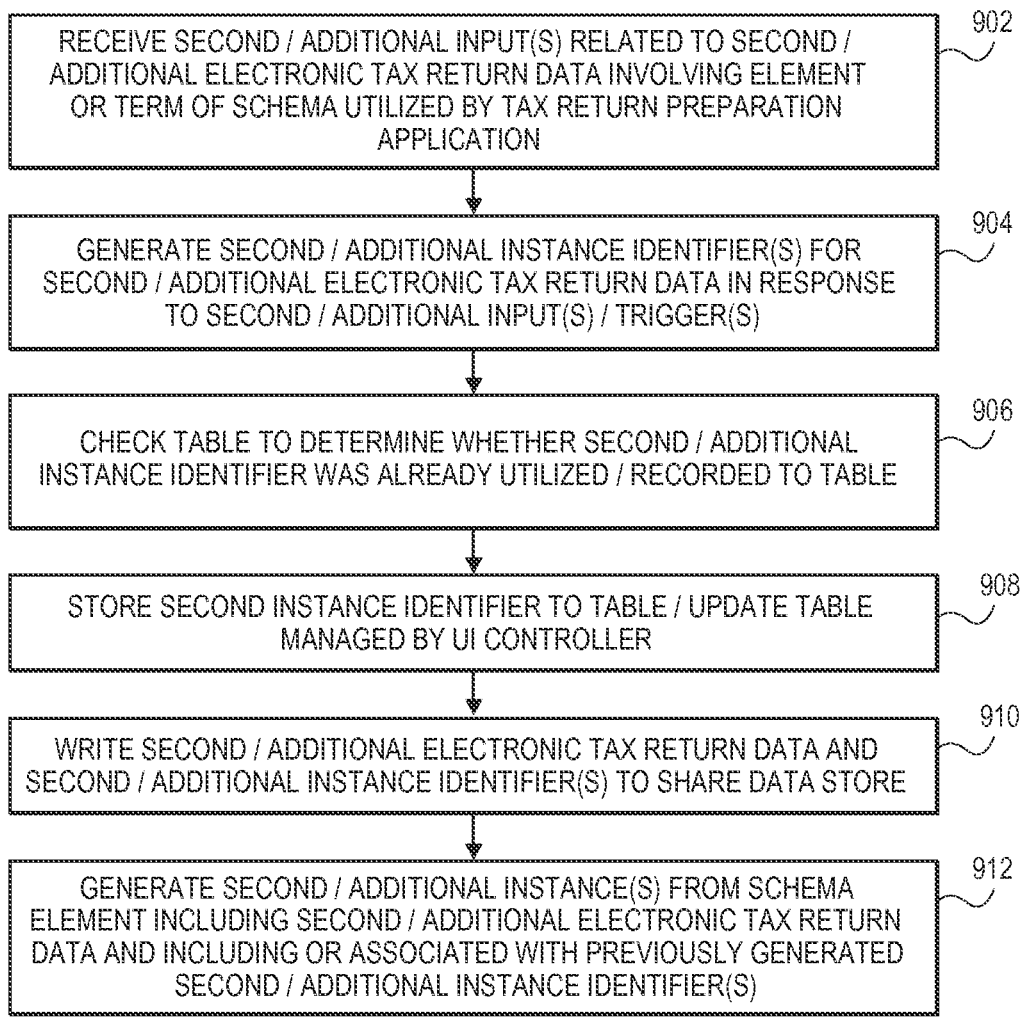
FIG. 9 is a flow diagram illustrating one embodiment for generating and writing additional electronic tax return data and another instance identify to a shared data store and performing checks for duplicate instance identifiers.

Referring to FIG. 9, and with continuing reference to FIG. 4, at 902, UI controller 430 receives a second input of or related to second electronic tax return data 431b involving element or term of schema 446 utilized by tax return preparation application. As described above, the second or additional input may be a request to enter data or generate a new tax document, selecting a field or button of an interview screen, entering data or importing data, and one or more of these actions detected by trigger detector 425 to generate another instance identifier 222b. Continuing with the example above, this may involve a second Form-W2 for a user's second job, or another Form-1099 for interest earned from another financial institution. At 904, UI controller 430 generates second or additional instance identifier(s) 222b for second/additional electronic tax return data 231b in response to second/additional input(s)/trigger(s), and at 906, if necessary, checks table 247 to determine whether the generated instance identifier 422 was previously utilized. While the probability of a duplicate identifier 422 is very low, particularly when using UUIDs, probabilities of a duplicate identifier 422 may increase if generation methods involving fewer possible instance identifiers 422 are utilized. If instance identifier 422b has been utilized before, another one is generated by ID generator 420. At 908, assuming that the second or additional instance identifier 422b has not been utilized previously, or following generation of another unique identifier, second instance identifier 422b is written to table 427 managed by UI controller, 430 and at 910, second electronic tax return data 431b and second instance identifier 422b generated by UI controller 430 are written to shared data store 240 which, at 912, generates a second instance 422b from schema 446 element or term including second electronic tax return data 431b and including or associated with previously generated second instance identifier 422b. As noted above, second electronic tax return data 431b may involve different numbers of instance identifiers 422, for but ease of explanation, reference is made to first electronic tax return data 431a and first instance identifier 422a and to second electronic tax return data 431b and second instance identifier 422b.

Figure 10:
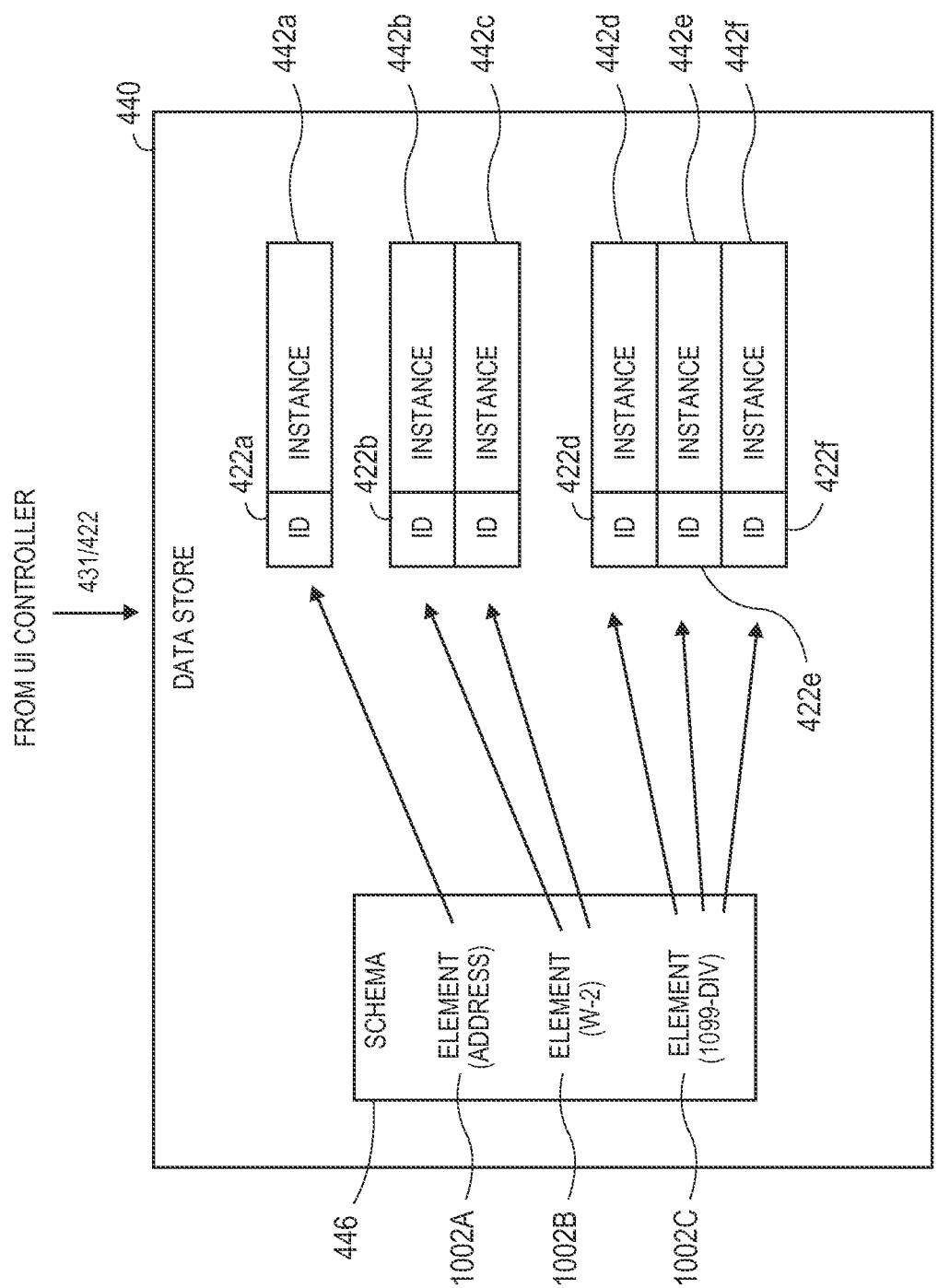
FIG. 10 illustrates an example in which a single instance identifier is generated for a single schema element and multiple instance identifiers are generated for another schema element.
Figure 11:
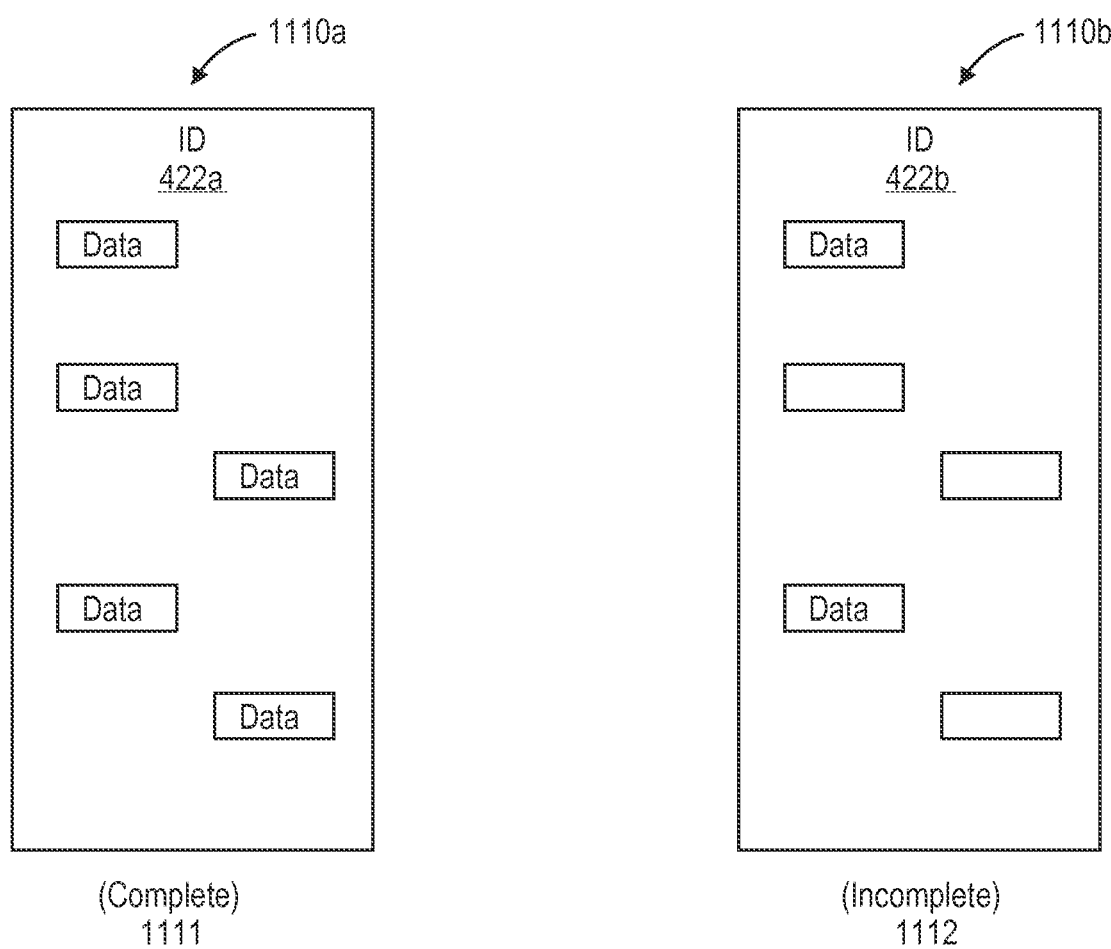
FIG. 11 illustrates how different instances identified by different instance identifiers for the same schema element such as instances for Form W-2, may have different data and different levels of completeness.
Figure 12:
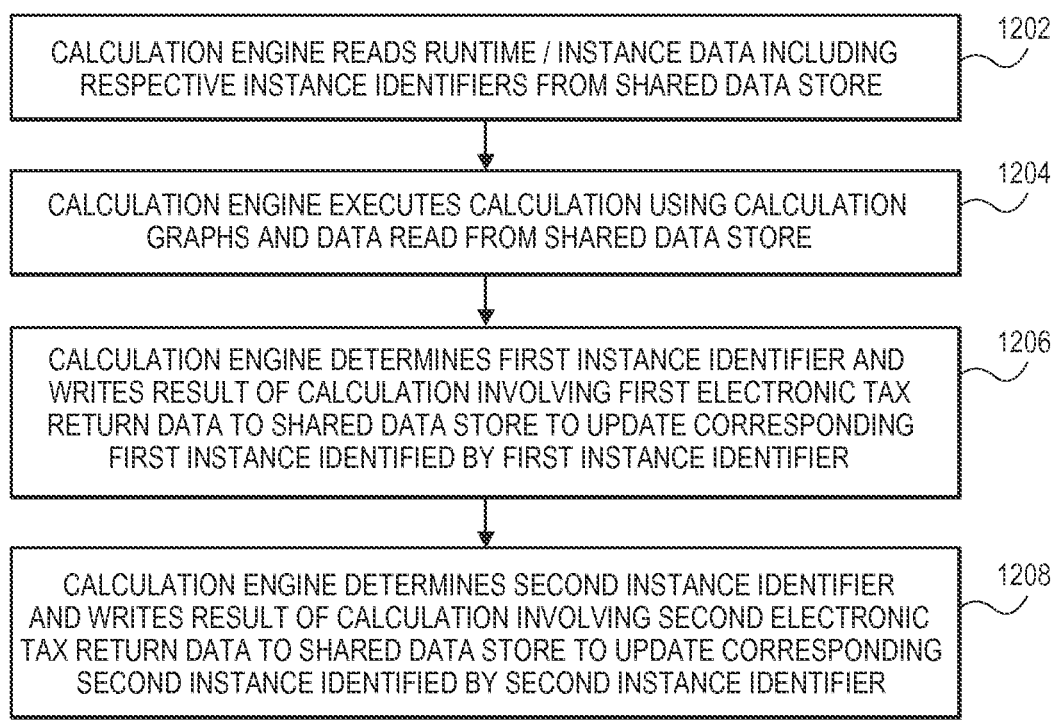
FIG. 12 is a flow diagram showing how embodiments may utilize a calculation engine that generates a result that is written to a shared data store using instance identifiers generated according to embodiments.
Figure 13:
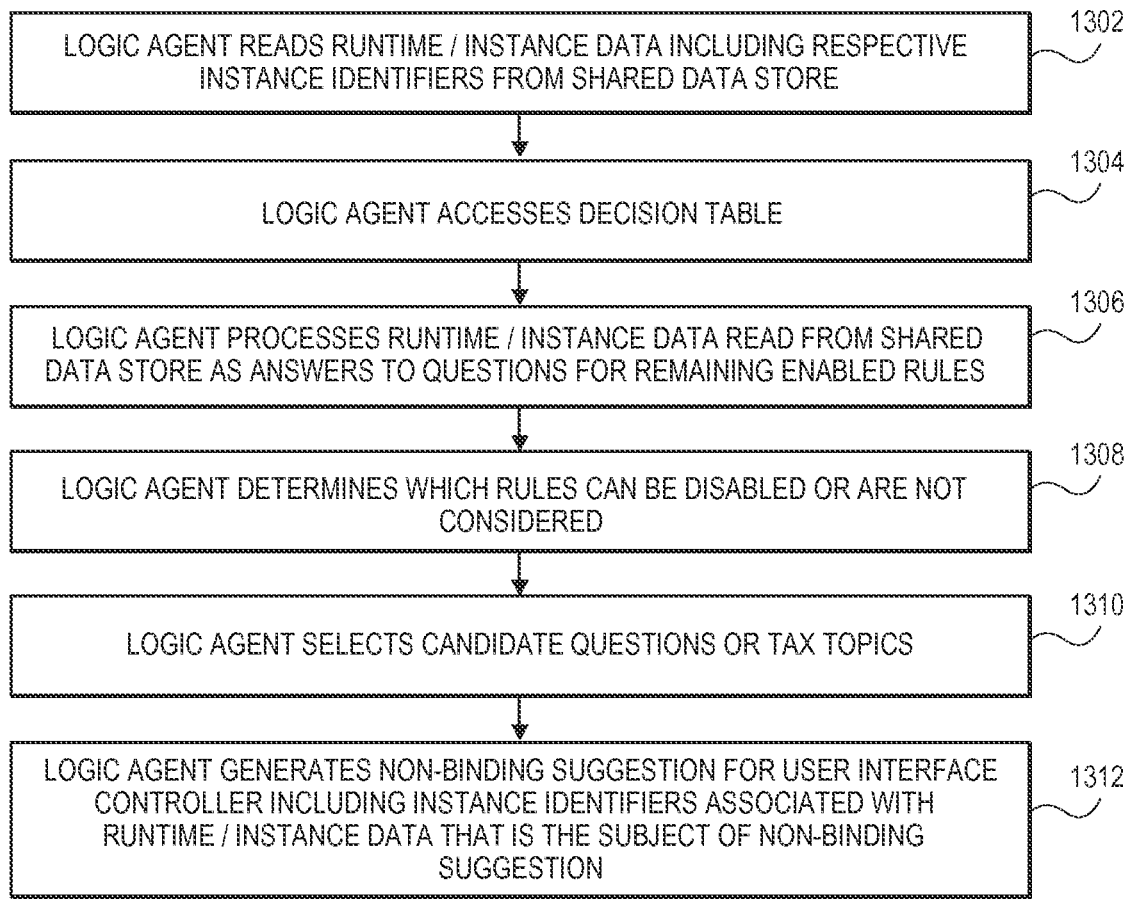
FIG. 13 is a flow diagram showing how embodiments may utilize a logic agent that reads runtime or instance data and associated unique instance identifiers from a shared data store for processing to generate non-binding suggestions for a user interface controller.

Thus, referring to FIG. 10, depending on the types of electronic tax return data 431 being entered, there may be only one instance 442 generated from a particular element 1002a of schema 446, whereas for other elements of schema 446, there may be multiple instances 442 (e.g. for multiple Form W-s or multiple 1099-INT). FIG. 10 generally illustrates one instance 442a being generated for a particular element 1002a, two instances 442b,c being generated from another schema element 1002b, and three instances 442d-f being generated from yet another schema element 1002c. Further, referring to FIG. 11, based on the data received thus far, for two Form W-2s, for example, all of the data may have already been entered into one of the forms 1100a such that the instance 442 for that schema element contains all data to complete 1111 that form, whereas the other instance is incomplete and still requires data 1112.

Referring to FIGS. 12A-B, having generated instance identifiers 422, and written the respective electronic tax return data 431 and respective instance identifiers 422 to the data store 240, at 1202, the calculation engine 480 reads the runtime data 442 from the data store 440, which includes the first and second electronic tax return data 431a,b and respective first and second instance identifiers 422a,b, and at 1204, executes a calculation using calculation graphs 482. For this purpose, runtime or instance data 442 is read from the data store 440 by the calculation engine 480, and at 1206, the calculation result 481 is written by the calculation engine 480 to the data store 440.

Depending on runtime data 442 was initially available and calculations that were performed, calculation engine 480 may operate on only first electronic tax return data 431a, only on second electronic tax return data 431b, or both. Thus, at 1206, calculation engine 480 determines first instance identifier 222a and writes result 481a of calculation involving first electronic tax return data 431a to shared data store 440 to update corresponding first instance 442a identified by first instance identifier 422a. Similarly, at 1208, calculation engine 480 determines second instance identifier 422b and writes result 481b of calculation involving second electronic tax return data 431b to shared data store 440 to update corresponding second instance 442b identified by second instance identifier 422b. In this manner, calculation engine 480 utilizes generated instance identifiers 422a,b to distinguish a calculation involving, for example, one Form W-2, but not another Form W-2, and is able to write a result 481 back to the correct instance 442 utilizing the generated instance identifiers 422, thus preventing or reducing the possibility that calculation results for one form will be inadvertently written to the shared data store 440 for another form.

While certain embodiments are described with reference to performing calculations involving both first and second electronic tax return data 431a,b and writing back results 481a,b to shared data store 440 with reference to respective first and second instance identifiers 422a,b, it may be the case that the calculations involve one or some of the electronic tax return data, but when the calculations are performed and results are written back to shared data store 440, instance identifier 422 for that data is still utilized to ensure that result 481 data is written back to the correct location within shared data store 440. For example, first electronic tax return data 431a may have been processed first, and then a calculation was performed on that first electronic tax return data 431a, and later, the user entered data for a second form, and a subsequent calculation may involve involved only second electronic tax return data 431b, or both the first and second data. Or, a calculation may involve the first electronic tax return data 431a again. Thus, reference is made to processing involving both the first and second electronic tax return data 431a,b for ease of explanation, not limitation, and it will be understood that calculation engine 480 may operate on various types and combinations of electronic tax return data 431 that was written to or available from shared data store 440 at various times.

Referring to FIG. 13, and referring again to FIG. 4, at 1302, tax logic agent 410 reads current runtime data 442, which may include one or more of the first and second/additional electronic tax return data 431a,b and that includes, or is associated with respective first and second/additional instance identifiers 422a,b (and which may include any result 481 generated by the calculation engine 480 as discussed above). Tax logic agent 410 accesses decision table(s) 460 at 1304, and at 1306, processes runtime data 442 read from shared data store 440 as answers to questions 462 for remaining enabled rules 461. At 1308, tax logic agent 410 determines which rules 461 can be eliminated or disabled (e.g., as previously described with reference to FIGS. 5-7).

At 1310, tax logic agent 410 determines which questions or topics 462 remain or are eligible to be asked of the user, and these questions or topics 462, at 1312 are the subject of one or more non-binding suggestions 411 generated by tax logic agent 410 and provided to UI controller 430. According to embodiments, non-binding suggestion 411 includes or is associated with instance identifier 422, such that instance identifier 422 that was originally generated by UI controller 430 for electronic tax return data 431 is also part of or associated with non-binding suggestion 411 generated by tax logic agent 430 based at least in part upon that same electronic tax return data 431.

Figure 14:
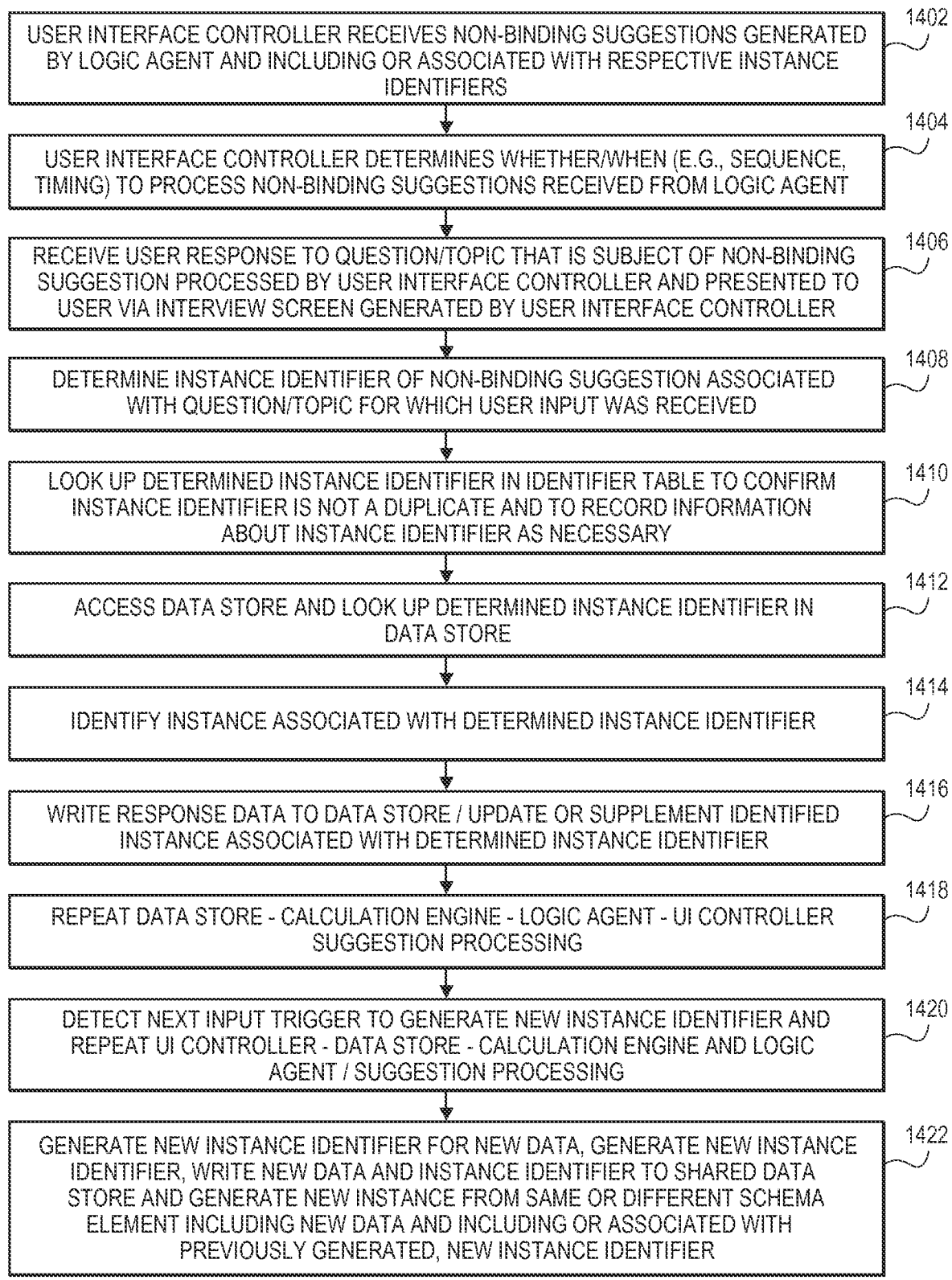
FIG. 14 is a flow diagram illustrating processing of non-binding suggestions and instance identifiers according to one embodiments.

Referring to FIG. 14, at 1402, UI controller 430 receives non-binding suggestions 411 generated by tax logic agent 430 and including or associated with respective instance identifiers 422, and at 1404, determines whether and when (e.g., sequence, timing) to process non-binding suggestions 411 received from tax logic agent 430.

As discussed above with reference to FIG. 4, UI controller's 430 analysis of non-binding suggestions 411 and whether and how to process them may be based at least in part upon an applicable configuration file 433. UI controller's 430 decision may also be based at least in part upon what UI controller 430 is currently processing or UI controller's 430 current focus. For example, UI controller 430 may be taking certain action or working on a certain document, and if a non-binding suggestion 411 involves that current action or document, non-binding suggestion 411 may be selected before others, whereas if the non-binding suggestion 411 involves an action or document that is currently not the subject of UI controller 430 processing, UI controller 430 may assign a lower priority to those non-binding suggestions 411. Further, if a non-binding suggestion 411 is selected by UI controller 430 for processing, instance identifier 422 can be utilized to identify other non-binding suggestions 411 that are also associated with the same instance identifier 422, but for a different suggested purpose. For example, a non-binding suggestion 411 with a particular instance identifier 422 may be selected since it involves data required for Form W-2, and UI controller 430 is currently processing Form W-2 related matters, but another non-binding suggestion 411 may have been generated and that includes the same instance identifier 422, e.g., for a possible error identified by the logic agent 410. Thus, when one non-binding suggestion 411 is selected for processing, the instance identifier 422 for that suggest can be identified, then other non-binding suggestions 411 having the same instance identifier 422 can also be selected for consideration and/or processing by UI controller 430 depending on UI controller's 430 current focus.

With continuing reference to FIG. 14, UI controller 430 selects one or more non-binding suggestions 411 and selects or generates one or more interview screens 432 that are presented to the user, at 1416, in response, to the questions or topics presented to the user, the user provides various answers or provides data 431/450 into the interview screen 432 and received by UI controller 430. At 1408, UI controller 430 determines instance identifier 422 of or associated with non-binding suggestion 411 that was the subject of the user's response to the presented question or topic.

With embodiments, instance identifier 422 is utilized to differentiate objects or non-binding suggestions 411 involving the same tax topic or question. For example, if the user has three Form W-2s from three employers, UI controller 430 is able to differentiate which of two of the three Form W-2s requires action or is the subject of a non-binding suggestion 411 and which ones are not.

With continuing reference to FIG. 14, at 1410, UI controller 430 looks up the determined instance identifier 422 in identifier table 427 to confirm instance identifier 422 is not a duplicate and to record information about instance identifier 422 as necessary, e.g., any further or delayed actions that UI controller 430 should take at a later time, or after other data is entered or other tax documents are completed. UI controller 430 may also assign a priority or other status indicator concerning instance identifier 422. Thus, table 427 may serve a dual purpose of recording instance identifiers 422 to check for duplicates and to record actions taken or actions to be taken in the future by UI controller 430 in connection with the UI controller's determinations of whether and how to process non-binding suggestions 411, e.g., in conjunction with configuration files 433, or in certain cases, table 427 status make take priority over what is specified by configuration file 433.

Continuing with reference to FIG. 14, at 1412, UI controller 430 accesses shared data store 440 and looks up instance identifier 422 in shared data store 440, and at 1414, identifies identifier 422 and instance 442 associated with determined instance identifier 422. At 1416, UI controller 430 writes data 431 of the user's responses or answers to shared data store 440 to update instance 442 identified by instance identifier 422.

At 1418, for non-binding suggestions 411 and responses/answers 431 that are already associated with instance identifiers 422, the processing described above in which calculation engine 480 accesses shared data store 440, generates a calculation result 481, writes calculation result 481 to shared data store 440, tax logic agent 410 reads runtime data 442 from shared data store 440 and generates non-binding suggestions 411, which are processed by the UI controller 430 is repeated. At 1418, when trigger detect module 425 detects an input trigger to generate a new instance identifier 422, the process described above in which UI controller 430 generates instance identifier 422, updates identifier table 427, writes electronic tax return data 431 and instance identifier 422 to shared data store 440, and generation of an instance 422 including the electronic tax return data 431 and associated instance identifier 422 are repeated. It will be understood that whether instance identifier 422 has already been generated for an answer or response or whether a new instance identifier 422 is generated by the UI controller 430 is based at least in part upon how schema 446 is configured, and what the input triggers are, e.g., an input trigger may be for data input into a specified field that was not answered such that a new instance identifier 422 is not yet needed, but if the specified field was answered, then UI controller 430 would generate a new instance identifier 422 based at least in part upon the selection or entry of data for that specified field.

Figure 15:
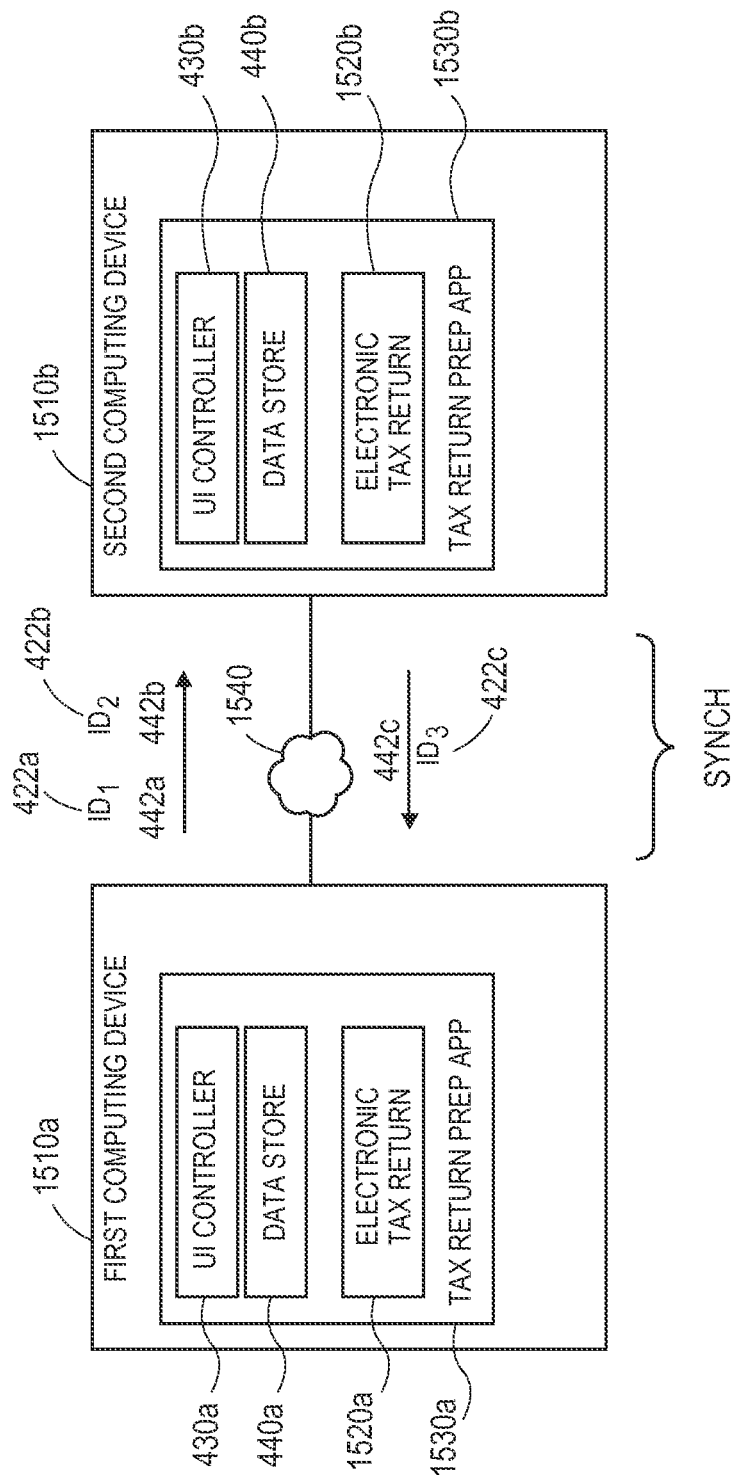
FIG. 15 illustrates how embodiments may be utilized to synchronized electronic tax return data for an electronic tax return when the electronic tax return is prepared using different computing devices.
Figure 16:
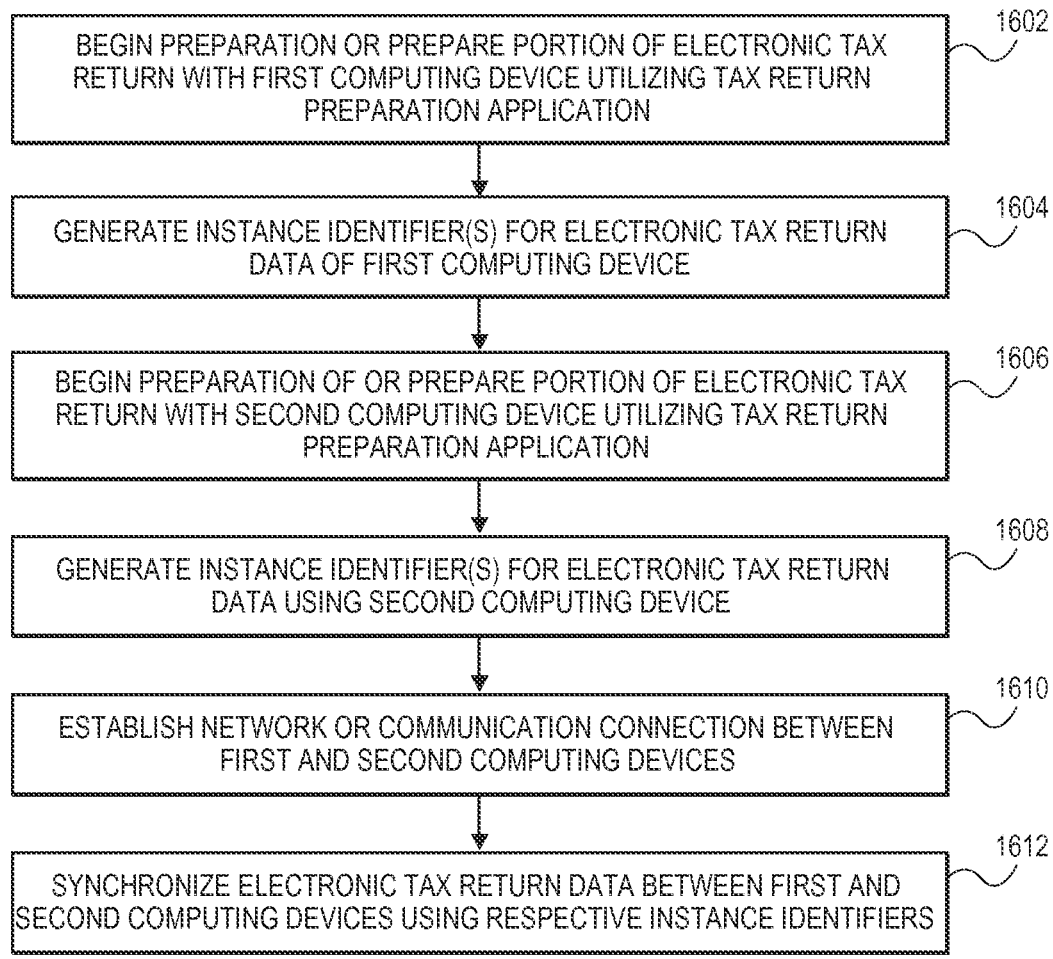
FIG. 16 is a flow diagram illustrating one embodiment of a method of synchronizing electronic tax return data across different computing devices utilizing instance identifiers generated according to embodiments.

Referring to FIGS. 15-16, instance identifiers 422 generated and processed according to embodiments may also be utilized for embodiments for synchronization of electronic tax return data 431 across different computing devices 1510*a,b* that are utilized to prepare different portions of an electronic tax return 1520. For example, at 1602, a first user begins to prepare or prepares a portion of an electronic tax return 1520 with a first computing device 1510*a* utilizing first tax return preparation application or first version of a tax return preparation application 1530, and at 1604, as described above, UI controller 430 generates one or more instance identifier(s) 422*a-b* for respective electronic tax return data 431*a,b* received by or entered using the first computing device 1510. At 1606, the first user or a second user associated with the first user (e.g. a spouse or business partner), begins to prepare, or prepares a portion of the electronic tax return 1520 with a different, second computing device 1510*b* utilizing a second tax return preparation application 1530*b* or a second version of the tax return preparation application 1530*b*. For example, different versions of a tax return preparation application may be configured for operation on a laptop or desktop computer, whereas another version is configured for operation on a mobile communication device or a tablet computing device.

The first user may prepare a portion of the electronic tax return 1520 using a laptop computer 1510*a*, and the second user may prepare a portion of the electronic tax return 1520 using a tablet computing device 1510b. At 1608, second UI controller 430b of the second tax return preparation application 1530 executing on the second computing device 1510b generates instance identifier(s) 422c for electronic tax return data 431c. At 1610, a network or communication connection 1540 between first and second computing devices 1510a,b is established, and the tax return preparation applications 1530a,b communicate with each other to synchronize electronic tax return data 431a,b and 431c between first and second computing devices 1510a,b using respective instance identifiers 422a,b and 422c at 1712. Synchronization may involve one-way synchronization or two-way synchronization.

For example, synchronization may involve the laptop computer 1510a and the tablet computing device 1510b being connected to each other through a wired network connection or a wireless network connection 1540, and according to one synchronization embodiment, first UI controller 430a of first tax return preparation application 1530a executing on first computing device 1510a accesses second table 427b managed by second UI controller 430b and/or second data store 440b of second tax return preparation application 1530b executing on second computing device 1510b. First UI controller 430a determines whether there are any instance identifiers in second table 427b or shared data store 440b that first UI controller 430a did not generate. This may involve first UI controller 430a comparing instance identifiers 422 maintained in first table 427a managed by first UI controller 430a and instance identifiers 422 maintained in second table 427b managed by second UI controller 430b and/or the second shared data store 427b. For any instance identifiers 422 that are not present within first table 427a managed by first UI controller 430a, this indicates electronic tax return data 431 on the second computing device 1510b that is not on first computing device 1510a. First UI controller 430a then requests second tax return preparation application 1530b, e.g., through one or more of second UI controller 430b and second shared data store 440b, to transfer electronic tax return data 431 and respective instance identifiers 422 from second computing device 1510b to first computing device 1510b so that first computing device 1510a will then include any instance data 442 of second computing device 1510b identified by instance identifiers 422 not generated by first computing device 1510a.

Similarly, second UI controller 430b of second tax return preparation application 1530b executing on second computing device 1510b accesses first table 427a managed by first UI controller 430a and/or first data store 440a of first tax return preparation application 1530a executing on first computing device 1510a. Second UI controller 430b determines whether there are any instance identifiers 422 in first table 427a or first data store 440a that second UI controller 430b did not generate. This may involve second UI controller 430b comparing instance identifiers 422 maintained in second table 427b managed by second UI controller 430b and the instance identifiers 422 maintained in first table 427a managed by first UI controller 430a and/or first data store 440a. For any instance identifiers 422 that are not present within second table 427b managed by second UI controller 430b, this indicates electronic tax return data on first computing device 1510a that is not on second computing device 1510b. Second UI controller 430b then requests first tax return preparation application 1530a, e.g., through one or more of first UI controller 430a and first data store 440a, to transfer instance data 442 and respective instance identifiers 422 from first computing device 1510a to second computing device 1510b so that second computing device 1510b will then include any instance data 442 of first computing device 1510a identified by instance identifiers 422 that were not generated by second computing device 1510b.

Synchronization may involve one-way synchronization, e.g., from first computing device 1510a to second computing device 1510b, or from second computing device 1510b to first computing device 1510a. Thus, with one-way synchronization, one computing device includes all of the instance data, but not both computing devices 1510a,b. Synchronization may also be two-way synchronization so that first and second computing devices 1510a,b (or other numbers of computing devices utilized to prepare an electronic tax return) are synchronized with each other and both devices have all of current runtime or instance data 442. Synchronization may be performed in response to user request or automatically and periodically.

When the electronic tax return is populated and completed by logic agent 410 or by the direction of logic agent 410 or using one or more components or services 470 as applicable, the electronic tax return can be printed and/or filed with a tax authority such federal state or local tax authority or other tax collecting entity such as Internal Revenue Service and Franchise Tax Board of the State of California.

Embodiments are related to cross-field validation in an electronic tax return, which may utilized embodiments directed to instance identifier generation described above, are described with reference to FIGS. 17-26C. As noted above, embodiments are related to cross-field validation, or checking different fields of an interview screen or form or worksheet of an electronic tax return prepared by a tax return preparation application to identify errors or inconsistencies of electronic tax return data, which are the subject of a non-binding suggestion that can be processed by the UI controller and brought to the attention of the user during preparation of the electronic tax return.

Figure 17:
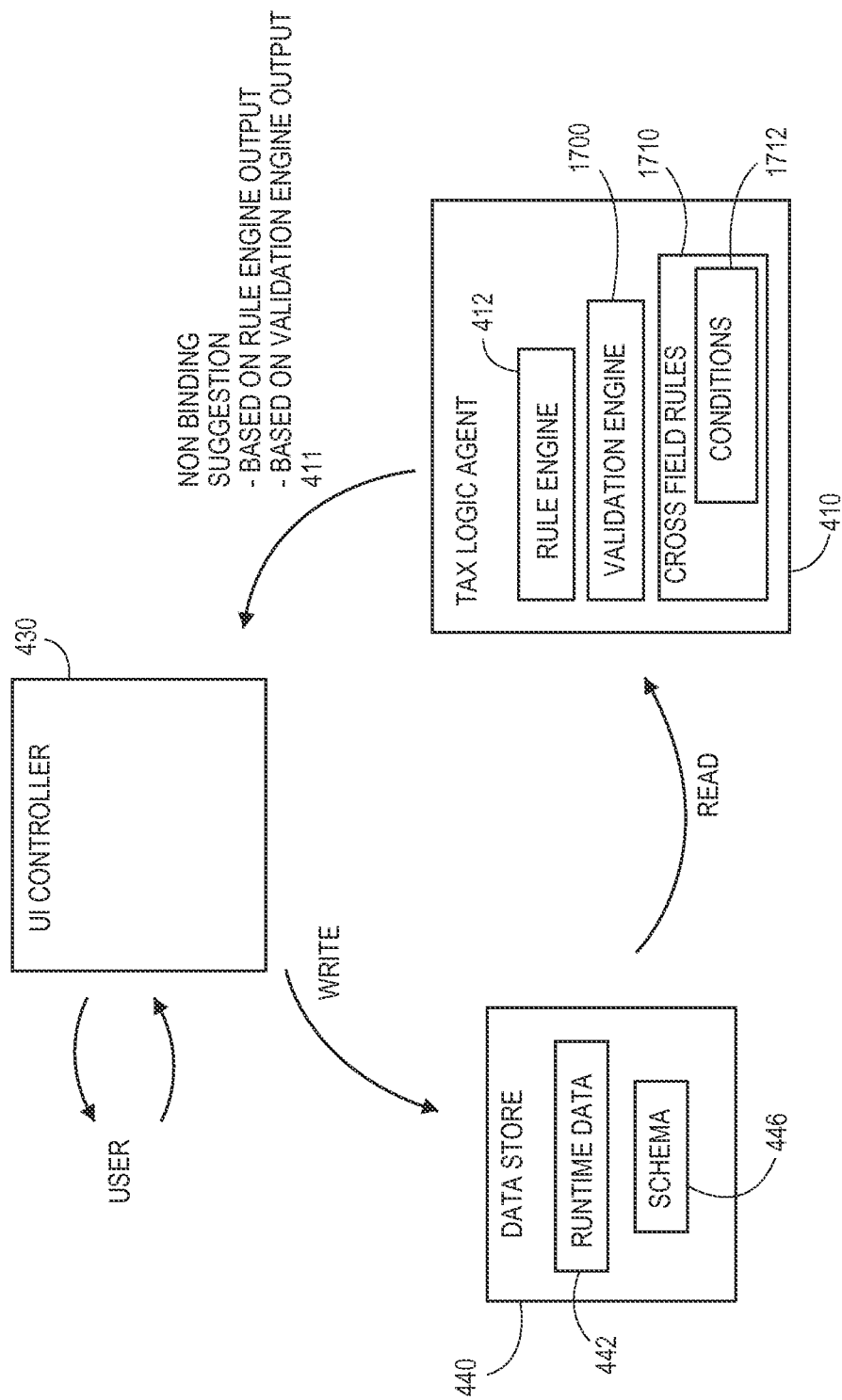
FIG. 17 is a block diagram of a system constructed according to one embodiment that is configured or operable to perform cross-field validation of electronic tax return data and in which a tax logic agent executes a validation engine.

Referring to FIG. 17, a system constructed according to one embodiment includes or involves components described in detail above including tax logic agent 410 including rule engine 412 that is utilized for generating non-binding suggestions 411 of questions or topics 462 that can be presented to the user, UI controller 430 that receives and processes the non-binding suggestions 411, and shared data store 440 including runtime data 442 that is based on schema 446. Tax logic agent 410 reads runtime data 442 from shared data store 440, and UI controller 430 writes or stores data to shared data store 440 to update or add runtime data 442. Also as shown in FIG. 17, according to embodiments, tax logic agent 410 comprises or executes a validation engine 1700, which is operable to detect errors or inconsistencies in runtime data 442 based on conditions 1712 of cross-field rules 1710, or rules that specify requirements of first runtime data 442, or data of a certain type or that is used to populate a first field of an interview screen or electronic document or form, relative to at least one other type of runtime data 442, or data of a certain type or that is used to populated a different, second field of an interview screen or electronic document or form.

Figure 18:
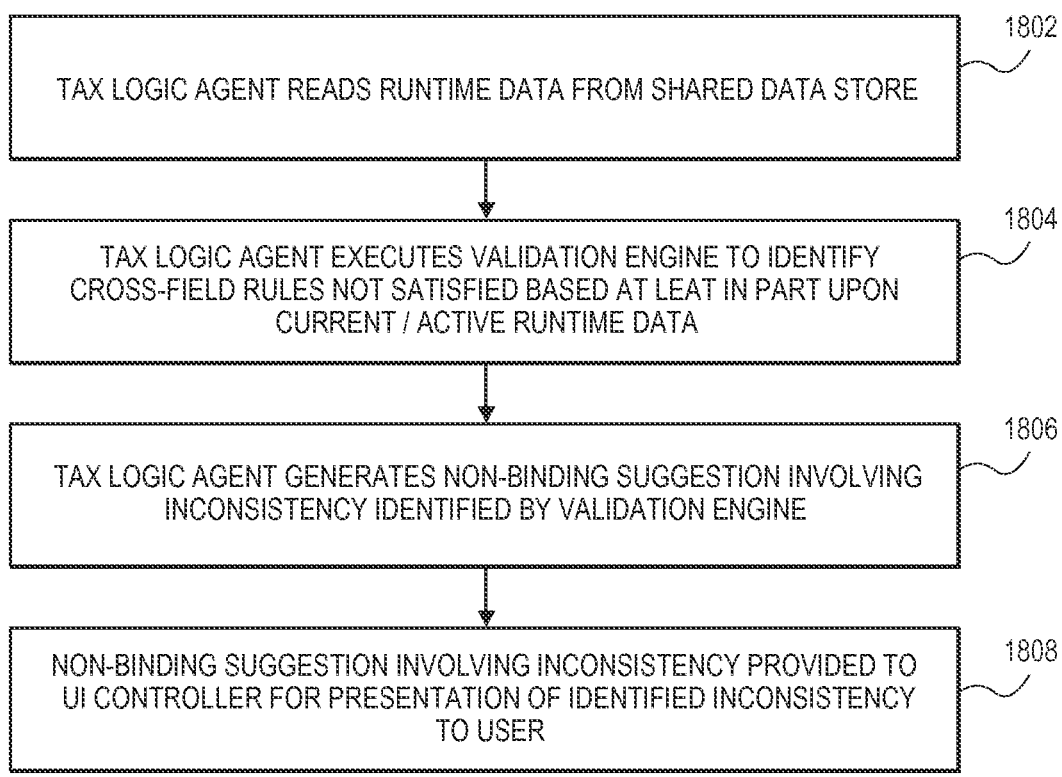
FIG. 18 is a flow diagram of one embodiment of a computer-implemented method for performing cross-field validation during preparation of an electronic tax return.

Referring to FIG. 18, in a computer-implemented method according to one embodiment, in which validation engine 1700 is a component of or utilized by tax logic agent 410 at 1802, tax logic agent 410 reads runtime data 442 from shared data store 440, together with associated instance identifiers 422 as described above with reference to FIGS. 1-16 such that the specific data for specific topics or fields can be identified by the various system components, whether for reading runtime data 442, writing runtime data 442, or performing a calculation involving runtime data 442. Further, as described below with reference to certain embodiments, the validation engine 1700 may read status indicators or tags 1720 indicating, for example, which data in the shared data store 440 is "active" or current runtime data 442, and which data is "inactive" or "shadow" data that was the subject of a correction. At 1804, tax logic agent 410 executes validation engine, 1700 which reads cross-field rules 1710 and conditions 1712 thereof to identify any cross-field rule 1710 conditions that are not satisfied based at least in part upon the current runtime data 442. At 1806, in the event that a cross-field rule 1710 is identified as not having all conditions 1712 satisfied, tax logic agent 410 generates a non-binding suggestion 411 involving the inconsistency that is based on the identified cross-field rule 1710 or condition 1712, and at 1808, UI controller 430 receives non-binding suggestion 411. Non-binding suggestion 411 is processed, and the identified inconsistency is presented to the user.

Figure 19:
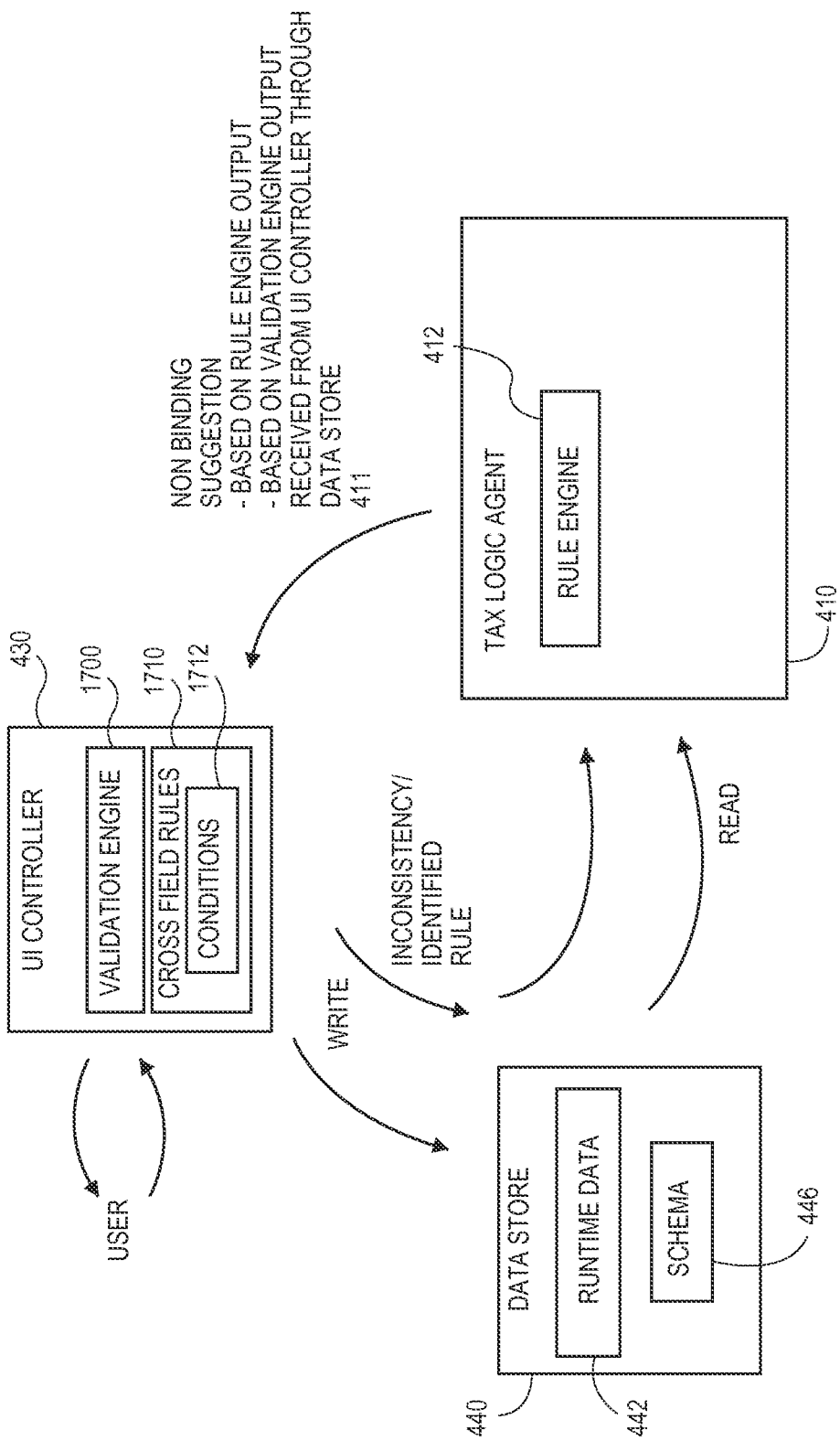
FIG. 19 is a block diagram of a system constructed according to one embodiment that is configured or operable to perform cross-field validation of electronic tax return data and in which a user interface controller executes a validation engine.

Referring to FIG. 19, while FIGS. 17-18 involve an embodiment in which validation engine 1700 and cross-field rules 1710 are components of or utilized by tax logic engine 410, in another embodiment, as shown in FIG. 19, UI controller 430 may include or utilize validation engine 1700 and cross-field rules 1710. With this embodiment, rather than tax logic agent 410 analyzing the collection or aggregate of runtime data 442 as read from shared data store 440, UI controller 430 may analyze cross-field rules 1710 relative to data that is received or imported through UI controller 430 as data is received. In another embodiment, retain a copy of runtime data 442 (e.g., as received from the tax logic agent 410), or access runtime data 442 of shared data store 440, and execute validation engine 1700 to analyze data as it is received by UI controller 430, to enable identification of errors or inconsistencies and on-the-spot presentment of the inconsistencies before received data is even stored to shared data store 440 and read by tax logic agent 410.

In another embodiment, a system includes multiple or distributed validation engines 1700, or validation engine 1700 that shared by tax logic agent 410 and UI controller 430, such that received data can be analyzed as it is received by UI controller 442, e.g., as a result of importation from an electronic file of a financial management system or by manual entry of data by the user, before it is written by UI controller 430 to shared data store 440, and analyzed a second time in the aggregate by the tax logic agent 410. For this purpose, UI controller 430 and tax logic agent 410 may share or access the same set of cross-field rules 1710. For ease of explanation, and not limitation, reference is made to the system configuration generally illustrated in FIG. 17, an implementation of which his further illustrated in FIG. 20.

Figure 20:
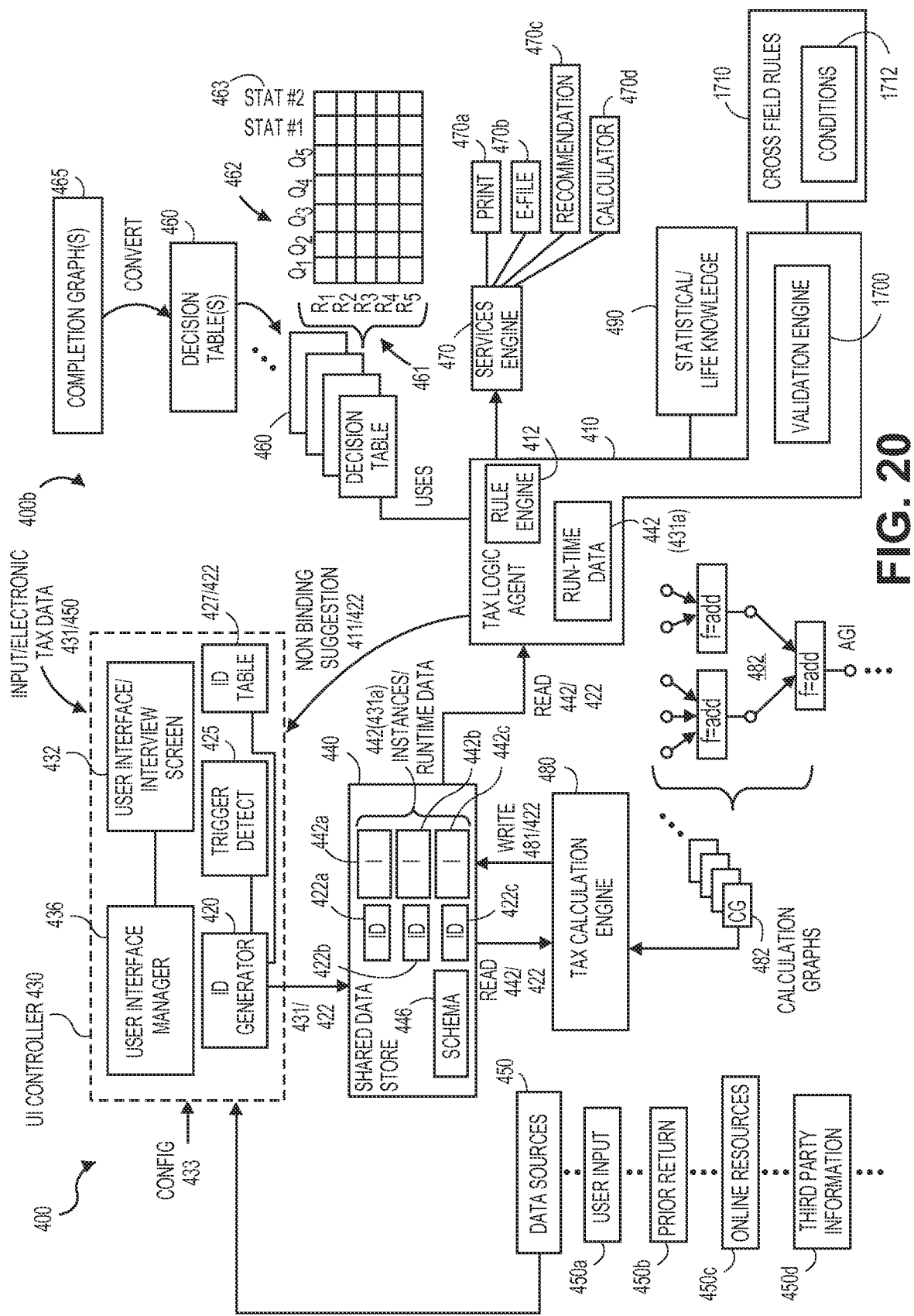
FIG. 20 is a block diagram of a system constructed according to one embodiment that includes a validation engine.

In the embodiment illustrated in FIG. 20, validation engine 1700 is a component of or executed by tax logic agent 410 and accesses cross-field rules 1710 that specific certain conditions 1712 involving certain terms or topics (e.g., based on terms or topics of the schema 446). Other components shown in FIG. 20 and their interoperability are described above and not repeated.

An example of a cross-field rule 1710 and conditions 1712 thereof, with reference to Form W-2, is that a withholding amount (Box 2 of Form W-2) must be less than gross income (Box 1 of Form W-2). Thus, in the event that the amount in Box 2 is greater than the amount in Box 1, then rule condition 1712 is not satisfied and this cross-field rule 1710 is identified by tax logic agent 410. As another example, a cross-field rule 1710 may state that if a user indicates that the user is married (e.g., by checking a certain box, or by entering spouse information), then a different box indicating that the user is single must be unchecked. Thus, checking boxes or entering data indicating that the user is both "married" and "single" would result failure to satisfy the rule's condition 1712 and inconsistent electronic tax return data. As a further example, an inconsistency may be identified when the user indicates no dependents are to be claimed, but the electronic tax return includes information about the user's children and daycare expenses. As yet another example, a rule may identify an inconsistency based on the user's social security number being entered in multiple fields when it should be entered in only one field. A further example involves the user entering data for two W-2 forms for different employer, and the user inadvertently copying the same Employer ID for one employer into a field for the other employer. As a final example, a rule may identify an inconsistency based on a field that is currently unpopulated but that must be populated given other data of the electronic tax return. Electronic tax return errors or inconsistencies may involve analysis of fields of the same interview screen or form, or fields that are scattered across different screens or forms such that it may not be readily apparent to a user preparing an electronic tax return utilizing a tax return preparation application.

Figure 21:
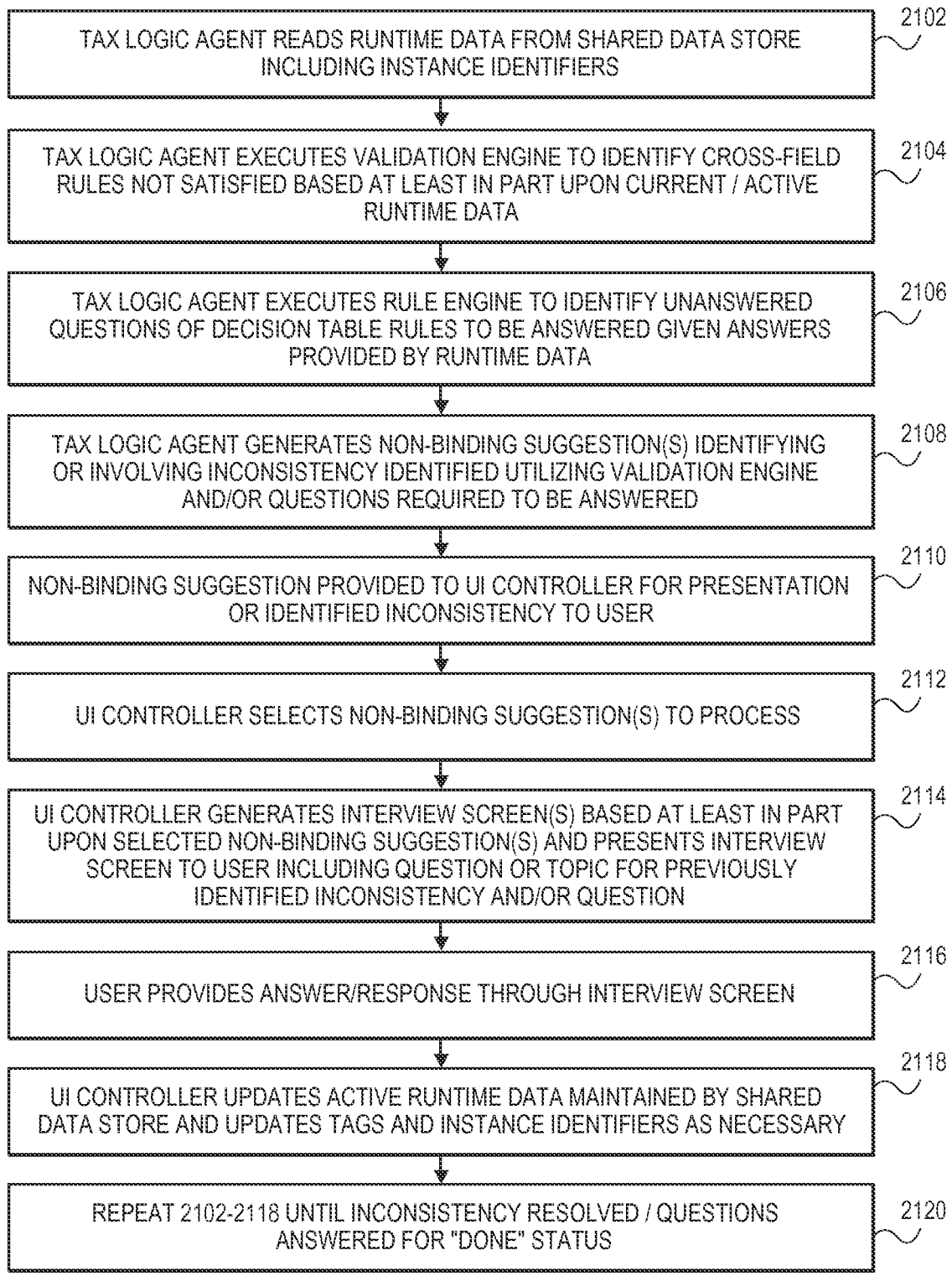
FIG. 21 is a flow diagram of one embodiment of a computer-implemented method for performing cross-field validation during preparation of an electronic tax return executed by system components shown in FIG. 20.

Referring to FIG. 21, and with continuing reference to FIG. 20, in a computer-implemented method according to one embodiment, at 2102, tax logic agent 410 reads runtime data 442 from shared data store 440 including instance identifiers 422, and at 2104, tax logic agent 410 executes validation engine 1700 to identify cross-field rules 1710 not satisfied based at least in part upon current/active runtime data 442.

Referring to FIGS. 22A-D, a cross-field rule 1710 may involve different numbers of fields 2210, field chains or links and different numbers of interview screens 432, forms or documents.

Figure 22A:
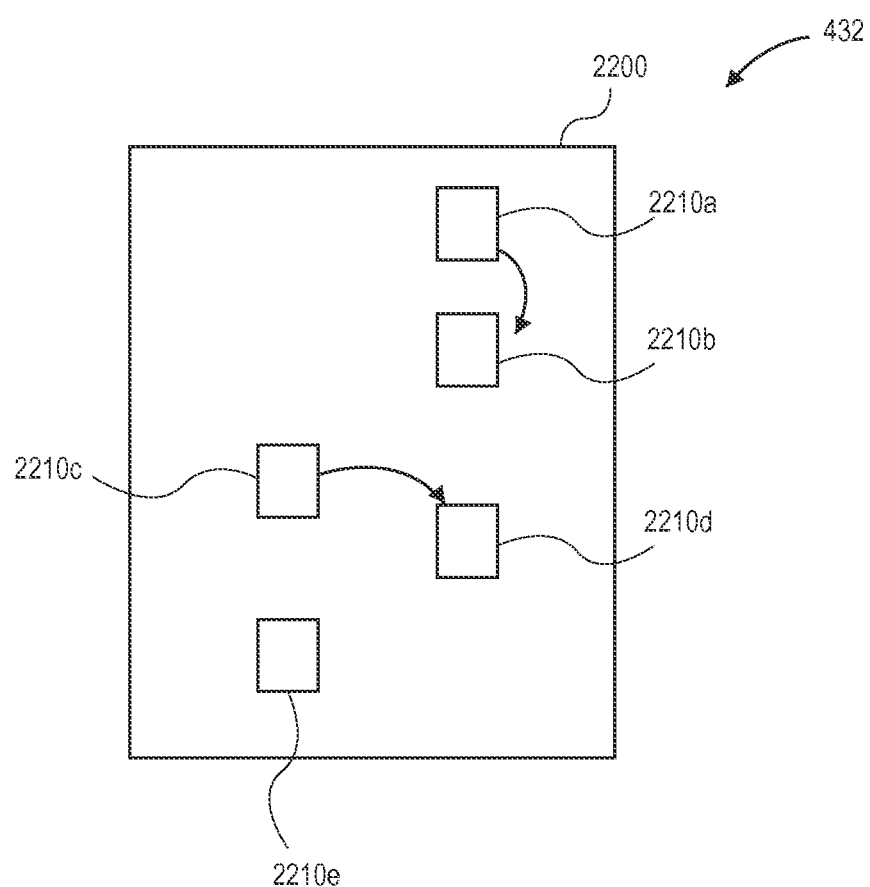
FIGS. 22A-D illustrate different examples of cross-field validation implemented by embodiments that may involve fields of a single interview screen or document or fields of multiple interview screens or documents.

For example, referring to FIG. 22A, according to one embodiment, cross-field rule 1710 including conditions 1712 involving two or a pair of files, e.g., fields 2210*a* and 2210*b*, and fields 2210*c* and 2210*d* of a single interview screen 2200, form or document. Thus, a cross-field rule 1710 may generally specify "If Field A is X then condition Y for Field B must be satisfied. For example, a cross-field rule 1710 may specify that that if an interview screen for Form W-2 is populated, Box 2 Federal income tax withheld must be less than the amount in Box 2 for Wages, tips, other compensation, or a cross-field rule 1710 may specify that if Field C includes data indicating that the user is married, then Box D for the user being single must not be checked. While these examples involve the content of fields, in another embodiment, rule condition 1712 specifies that if a field 2210 is populated or if a certain box is checked, then another field 2210 must be completed or another box must be checked. Thus, this type of rule 1710 may be used to identify an inconsistency concerning whether a required field is empty or populated.

Figure 22B:
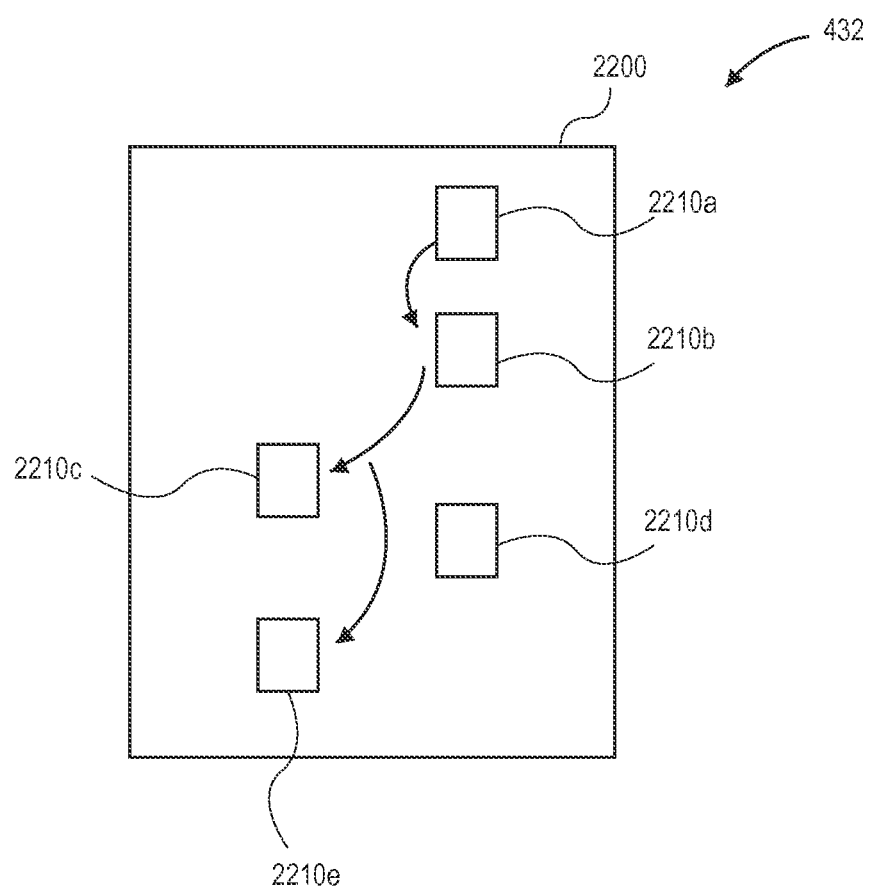

Referring to FIG. 22B, a cross-field rule 1710 may involve more than two fields 2210, or involve a multi-element condition 1712 or a chain of conditions 1712 of a single interview screen 2200, form or document such that a cross-field rule 1710 may generally specify "If Field A is X then Fields B, C and D must be populated." As illustrated in FIG. 22B, for example, rule conditions 1712 involve field 2210*a*, 2210*b*, 2210*c* and 2210*d*. For example, a cross-field rule 1710 may specify that that if the user enters data indicating that the user is married, then then fields for spouse first name, middle initial, last name and social security number must be entered.

Figure 22C:
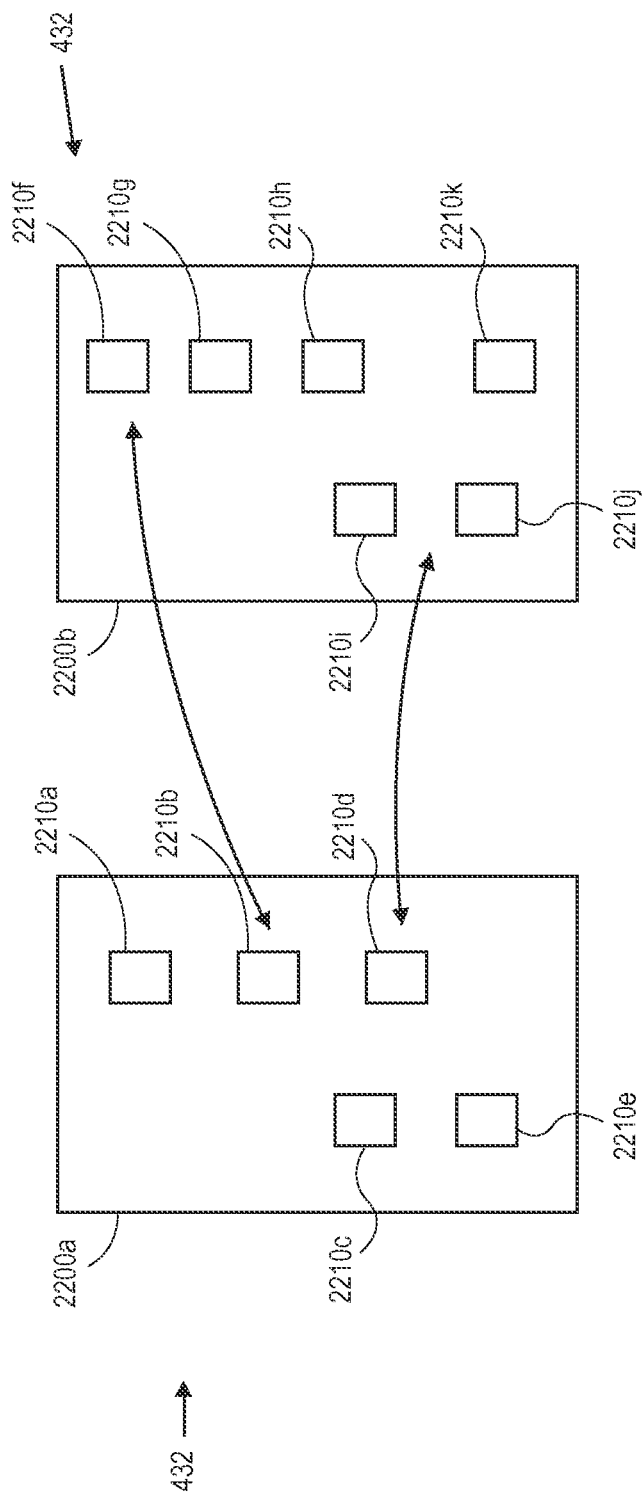
Figure 22D:
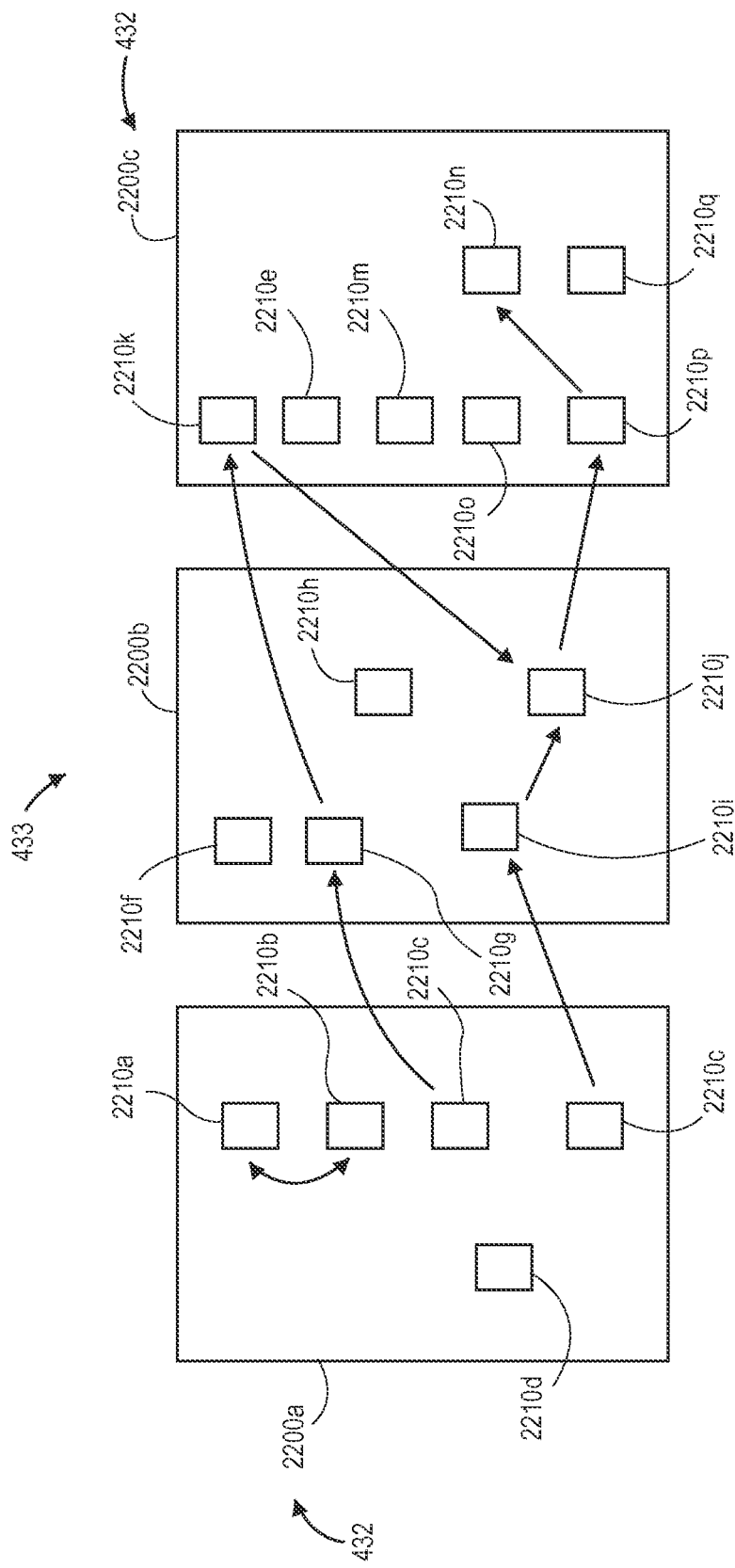

Referring to FIG. 22C-D, cross-field rules 1710 may also involve different topics, interview screens 2200a-b, forms or documents. For example, a user may begin preparing an electronic tax return and is working on a first interview screen 2200a, but as the data is being entered into fields 2210 of the first interview screen 2200a, cross-field rules 1710 are triggered that involve other interview screens 2200b in other sections or concerning other topics that are not current presented to the user, and that may not have been viewed yet by the inventor. For example, if the user enters data indicating that the user owns rental property, the cross field rule 1710 may specify conditions 1712 concerning income and deductions, such as rental income, property tax, mortgage interest, management expenses, and depreciation. Thus, as generally illustrated in FIG. 22C, cross-field rules 1710 may involve two or more fields 2210 of different interview screens 2200a,b, such as field 2210b of interview screen 2200a and field 2210f of interview screen 2200b. While FIG. 22C illustrates an embodiment in which a cross-field rule 1710 involves a pair of fields 2210 of different interview screens 2200a, FIG. 22D further illustrates how cross-field rules 1710 may involve multiple fields 2210, within the same or different interview screens, such that a cross-field rule 1710 may identify multiple fields 2210 of one or more interview screens 2200 that apply to a particular subject field, or a chain of conditions 1712 involving multiple fields 2210 of one or more interview screens 2210. For example, as shown in FIG. 22D, a cross-field rule may involve three different interview screens 2200a-c, and respective fields 2210c, 2210g, 2210k 2210j, 2210p and 2210n thereof.

Referring again to FIG. 21, at 2106, tax logic agent 410 also executes rule engine 412 to identify unanswered questions 462 of decision table rules 461 to be answered given answers provided by runtime data 442. As discussed above, questions 462 that may be identified may also be based on inferences or assumptions that are made based at least in part upon runtime data 442 and statistical data 463/490 and/or execution of a predictive model. For ease of explanation, reference is made to scanning decision table 460 and selecting a question 462 from decision table 460 that must be answered in order to reach a "done" status for that topic. At 2108, tax logic agent 410 generates one or more non-binding suggestion(s) 411. A non-binding suggestion 411 may identify or involve decision table questions 462 and/or cross-field rules 1710 and an inconsistency or error that was identified by execution of validation engine 1700. For each question or topic, an associated instance identifier 422 is included such that the specific data that is stored in shared data store 440 and that is the basis of the non-binding suggestion 411 is known and circulated to involved system components. At 2110, the non-binding suggestion(s) 411 are provided to UI controller 430 for presentation of identified inconsistency to user which, at 2112, selects non-binding suggestion(s) 411 to process and generates or selects interview screen(s) 432 based at least in part upon selected non-binding suggestion(s) 411 at 2114. Thus, an interview screen 432 that includes a question or topic for a question selected from a decision table 460 or to address an in inconsistency is presented to the user.

With continuing reference to FIG. 21, at 2116, user provides answer/response through interview screen 432, e.g., by manual entry of data into an interview screen 432 or importation of data from an electronic file, or by scanning or imaging a tax document that is processed with Optical Character Recognition. At 2118, UI controller 430 updates runtime data 442 maintained by shared data store 440 to include the answer or response provided by the user, and updates tags and instance identifiers (described below with reference to FIG. 23), or generates new instance identifiers 422, as necessary.

Figure 23:
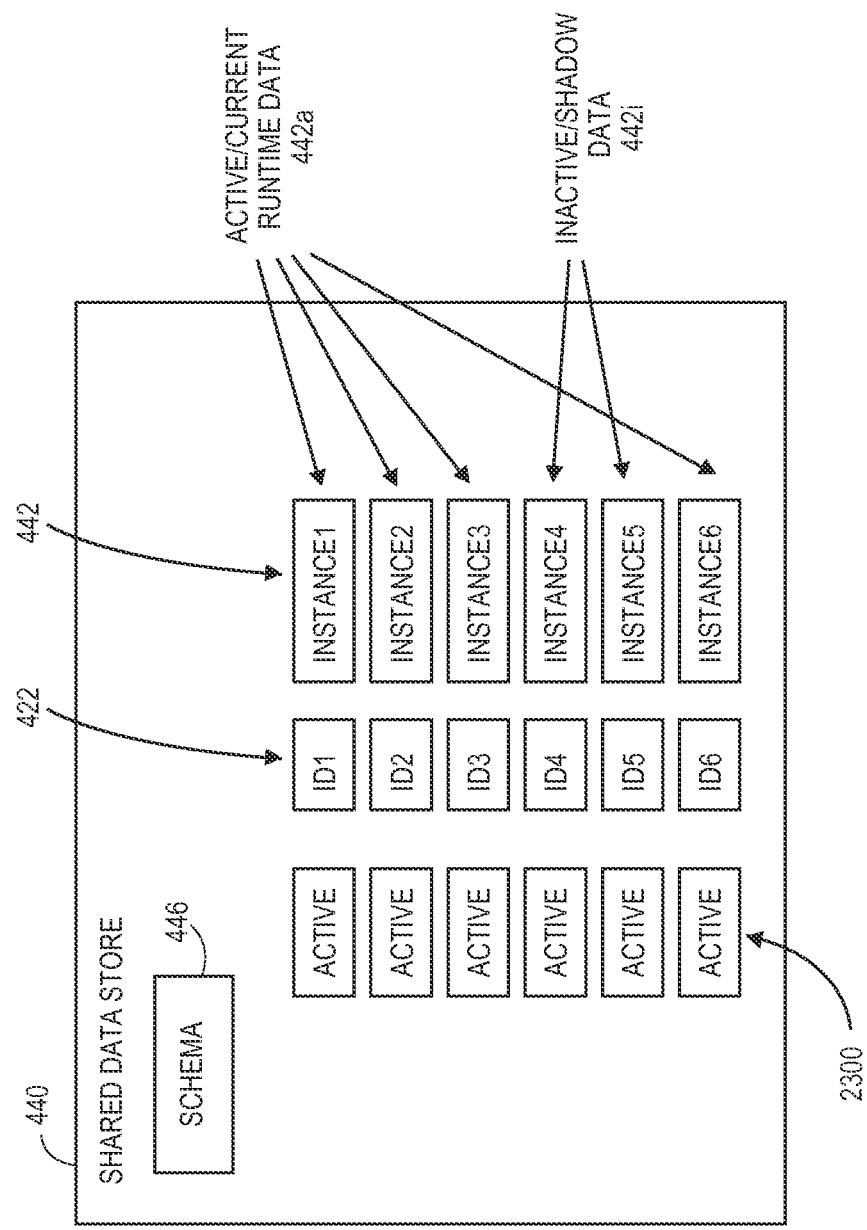
FIG. 23 illustrates how embodiments may be utilized to manage data stored in a shared data store according to embodiments.

For example, referring to FIG. 23, in addition to the previously generated or newly generated instance identifiers 422 associated with stored data, UI controller 430 may also provide, or a status indicator module of shared data store 440 may generate, an indicator or tag 2300 indicating the status of runtime data 442 and other data stored by the shared data store 440. For example, as shown in FIG. 23, tags or indicators 2300 may indicate whether stored data is "active" or current runtime data 442a ("a" referring to currently "active" runtime data) that applies to the electronic tax return, or "inactive" data 442i ("i" referring to "inactive" runtime, otherwise referred to as "shadow" data), which may have been previously designated as "active" based on prior electronic tax return data, but as a result of a change thereto, no longer applies and is thus "inactive," e.g., as a result of being replaced by other data, or corrected or deleted by the user. For example, data stored to shared data store 440 may be initially designated as "active" or as a default, but as non-binding suggestions 411 are processed, e.g., identifying inconsistencies or errors based on analysis of cross-field rules 1710, then data that was previously designated as "active" may be corrected, deleted or replaced by other data, such that certain data associated with a particular instance identifier 422 is "active" whereas other data that was the subject of some type of correction and that is also associated with the same instance identifier 422 is designated as "inactive." This is otherwise referred to as "shadow" data since the inactive or shadow data is still maintained on shared data store 440 in the event that it is later utilized, or reactivated, as a result of a change to runtime data resulting in such change.

In the illustrated embodiment, if there is only active data, then there is an instance 442 and associated instance ID, e.g., for Instance 1 and ID1, whereas if there is active data and inactive data, then both types of data can be identified by the same ID 422 since they involve the same schema 446 topic or term, but can be stored as different instances thereof and identified as such with respective active and inactive status tags 2300. Thus, in the illustrated embodiment, Instance 3 and Instance 4 are both associated with Instance identifier ID3, one instance of which is tagged as "active" and the other being tagged as "inactive." Similarly, Instance 5 and Instance 6 are both associated with Instance identifier ID4, one instance of which is tagged as "active" and the other being tagged as "inactive." Thus, data that may no longer be "current" or "active" runtime data is stored on the shared data store 440, and designated as inactive, for possible reactivation and reincorporation into the electronic tax return should changes to other data invoke the inactive data 442.

Thus, for a topic or schema 446 term of "married" the initial runtime data 442 may have indicated that the user is "single" but then as a result of execution of the validation engine 1700 and resulting non-binding suggestion 411, an inconsistency was identified, the user responded to the issue that was noted in an interview screen 432, and UI controller 430 wrote "married" data to the shared data store 440, such that "single" was changed from "active" to "inactive" and new "married" data for that instance identifier 422 was categorized as "active" or current runtime data 442. According to one embodiment, inactive or shadow data may be read by tax logic agent 410 and included in a non-binding suggestion 411 provided to UI controller 430, and inactive data may be presented in a corresponding field and grayed out (if it has not been populated by current or active runtime data 442) to indicate to the user that this data was previously active but is no longer active.

In embodiments described above, user is presented with an interview screen 432 involving the detected error or inconsistency, and the user responds with an answer or data that addresses the inconsistency, which is then written by UI controller 430 to the shared data store 440. According to another embodiment, UI controller 430 automatically writes data addressing the inconsistency to shared data store 440, and, in certain embodiments, subsequently requests user confirmation.

Figure 24:
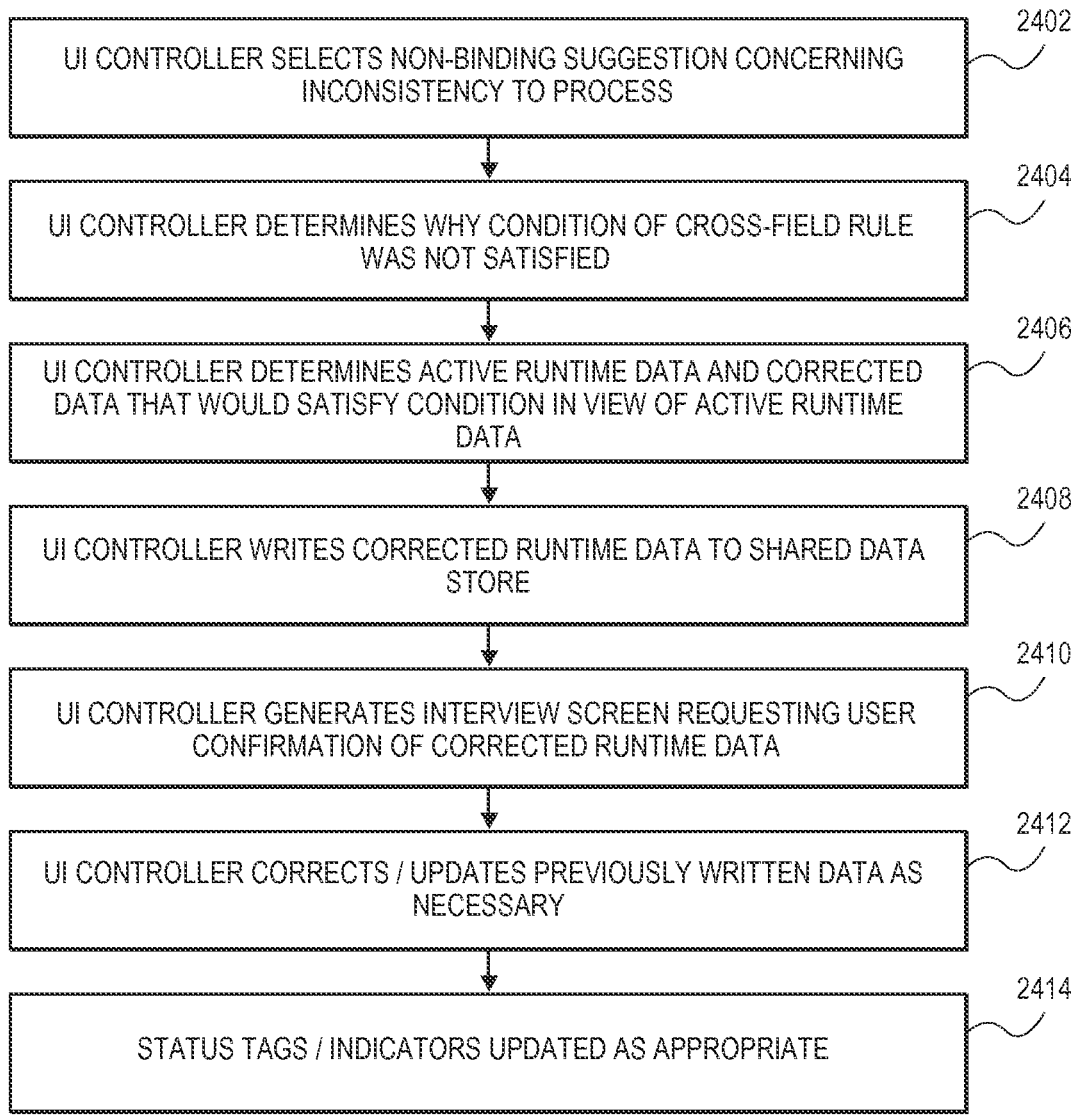
FIG. 24 is a flow diagram of one embodiment of a computer-implemented method in which a user interface controller automatically implements runtime data updates.

For example, referring to FIG. 24, at 2402, UI controller 430 selects non-binding suggestion 411 concerning inconsistency to process, and at 2404, determines, from non-binding suggestion 411, why condition 1712 of cross-field rule 1710 was not satisfied. At 2406, UI controller 430 determines new or corrected data that would satisfy condition 1712 in view of active runtime data 442. For example, the non-binding suggestion 411 may indicate that certain fields indicate that a user is married and has a spouse, and that there is an inconsistency with a box that is checked to indicate that the user is single. Thus, in this embodiment, multiple data indicates that the user is married, whereas only one data indicates that the user is single instead. In these types of embodiments, e.g., in which there are multiple indicators concerning one options compared to another, UI controller 430 can be configured to determine or select the active runtime data 442 that is most likely to apply, and thus identify the data ("single") that needs to be corrected to "married" to then satisfy the condition of a cross-field rule.

With continuing reference to FIG. 24, at 2408, UI controller 430 writes corrected runtime data to shared data store, and at 2410, generates interview screen 432 requesting user confirmation of corrected runtime data 442. At 2412, UI controller 430 corrects or updates the previously written data as needed, and at 2414, updates status tags or indicators 2300, e.g., to identify data stored on the data store 440 that is "active" or "inactive."

Figure 25:
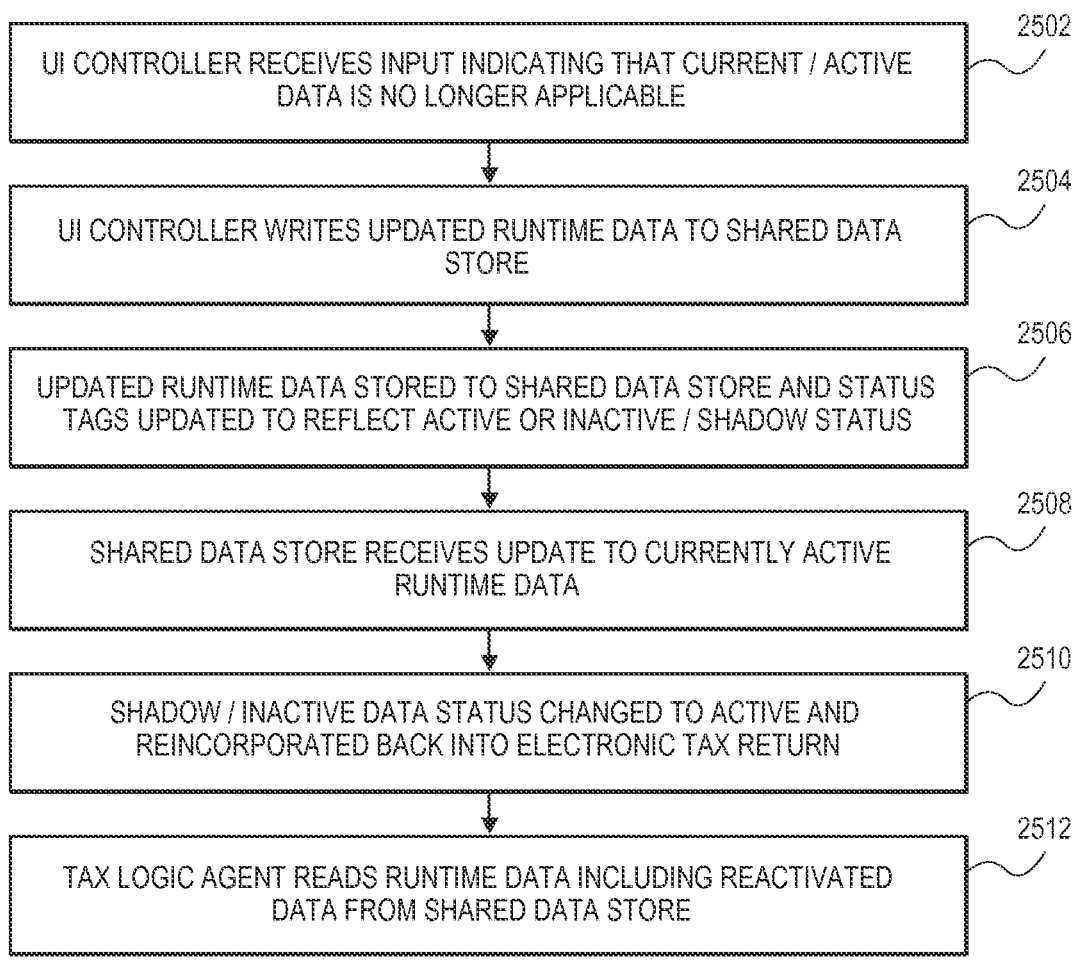
FIG. 25 is a flow diagram of one embodiment of a computer-implemented method involving modifying tags or identifiers as shown in FIG. 23 to identify active runtime data and inactive, shadow data.
Figure 26:
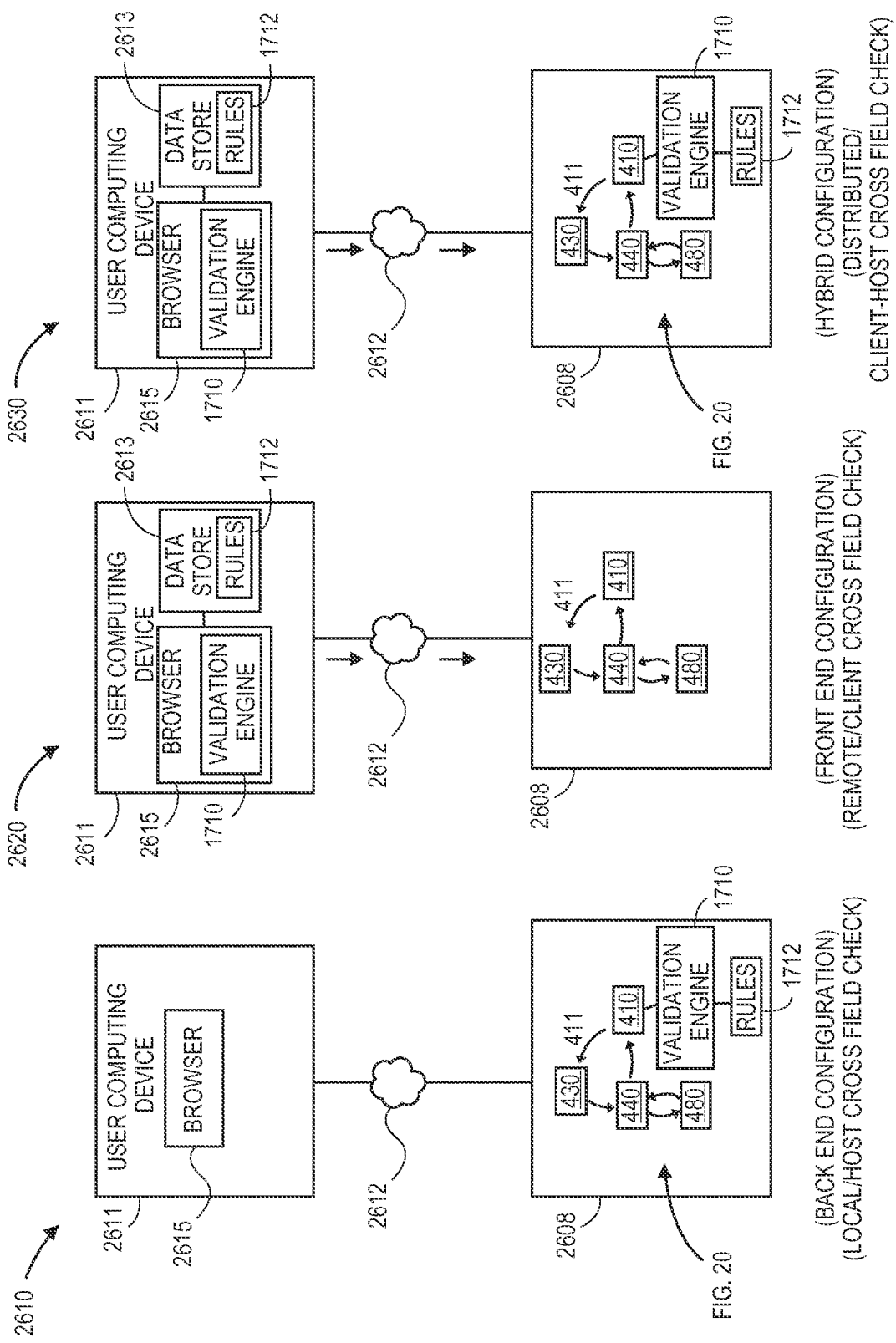
FIGS. 26A-C illustrate system architectures according to embodiments including a backend or server side system, a front end or client side system, and a hybrid system, said systems being operable or configured to execute cross-field validation and identify inconsistencies in electronic tax return data.

For example, with continuing reference to FIG. 23, and with further reference to FIG. 25, whether UI controller 430 first obtains user input regarding an answer to a non-binding suggestion 411, or automatically writes data to shared data store 440, at 2502, UI controller 430 receives input or determines that certain data is no longer accurate or applicable. This may involve the user indicating, for example, instead of a marital status of "single" the marital status should be "married" instead. At 2504, UI controller 430 writes updated runtime data 442 to shared data store 440, and at 2506, updated runtime data 442 is stored to shared data store 440, and status tags or markers 2300 are created or updated to identify runtime data 442 that has been updated or that is currently active, and to identify data that was previously active, but is now inactive. At 2508, tags or indicators 2300 are modified or created to identify the current or updated, active runtime data 442, and at 2510, data that was previously active (e.g., the incorrect "single" as marital status, or other data that was the cause of the identified inconsistency) is maintained on the shared data store 440 and is still associate with the instance identifiers 422, but instead, the status identifier or tag 2300 is changed from "active" to "inactive" or shadow data. Later, if there is another change to the electronic tax return data, e.g., spouse information is deleted, then at 2510, based on this example, change, the marital status can be changed back to "single" such that the "inactive" status for "single" is changed to "active" and reincorporated back into current runtime data 442, which at 2512, is read by tax logic agent 410 together with other runtime data 442 and any other reactivated and active data.

FIGS. 26A-C illustrate different system architectures that may be utilized to implement embodiments that detect errors or cross-field inconsistencies. These system architectures are generally referred to as "back end" or "server side" 2610 (as generally illustrated in FIG. 26A), "front end" or "client side" 2620 (as generally illustrated in FIG. 26B) and "hybrid" 2630 (as generally illustrated in FIG. 26C) architectures.

Referring to FIG. 26A, in a backend or server side implementation 2610, tax return preparation application is an on-line version or a cloud-based resource that can be accessed by a user or client computers 2611 of respective users through respective networks 2612 by executing a browser 2614 (one user computing device 2611 and network 2612 are shown in FIGS. 26A-C for ease of explanation and illustration). In this embodiment, tax logic agent 410, UI controller 430, shared data store 440 and validation engine 1700 and associated cross-field rules 1710 are hosted by or execute on a host computer or server 2608, such that cross-field data checks and other processing described above are performed on the server side or backend of the system, i.e., on or by host or server computer 2608. Thus, in this embodiment, the browser 2614 is used to access the online tax return preparation application and to allow the user to enter or import data using the online tax return preparation application. Thus, backend or client systems involve host computer 2608 including all of the components and functionality described above including tax logic agent 410, validation engine 1700 and associated cross-field rules 1710, UI controller 430 and shared data store 440, such that when cross-field rules 1710 are identified as having at least one condition or constraint 1712 that is not satisfied by the current runtime data 442, a non-binding suggestion 411 can be generated and presented to the UI controller 430 for resolution via an interview screen presented to the user.

Referring to FIG. 26B, in another system configuration, tax return preparation application is an on-line version or a cloud-based resource of a host computer 2608 that can be accessed by a browser 2615 of a client or user's computing device 2611. However, In contrast to the configuration shown in FIG. 26A, the embodiment illustrated in FIG. 26B includes a validation engine 1700 that executes on the client side or on the front end of the system on user's computing device 2611 to provide a remote rule analysis or inconsistency detection system.

For this purpose, in the illustrated embodiment, validation engine 1700 may be downloaded to the user's computing device 2611, and a browser 2615 executing on the user's computing device 2611 and that is utilized to access the on-line version of the tax return preparation application serves as an operating system that executes the validation engine 1700. For example, validation engine 1700 may be programmed in JAVASCRIPT object oriented programming language executed by browser 2615, and cross-field rules 1712 may be downloaded to and stored in a data store 2613 of user's computing device 2611. This type of front-end validation implementation may be useful in cases when, for example, the user has limited or no network 2612 connections so that it would be difficult or not possible to maintain a connection with host computer 2608 such that the user can continue with preparation of an electronic tax return and entering data, and that data is checked by cross-field validation engine 1700 as it is entered, independently of host computer 2608.

According to one embodiment, a front end validation system, as generally illustrated in FIG. 26B, is able to perform validation checks, but does not have functionality for generating or processing non-binding suggestions 411 regarding same, which instead is executed by the backend or server side host computer 2608, which includes components described above including tax logic agent 410, UI controller 430, shared data store 440 and calculation engine 480. Thus, for example, frontend systems can perform various cross-field validations and identify errors or inconsistencies in the forms of rules 1712 that are not satisfied, and then provide those cross-field check results 2618 to the backend of the system or host computer 2608 when a network connection 2612 is available, which can then integrate those results into non-binding suggestions 411.

Referring to FIG. 26C, according to another embodiment involving distributed, or a combination of local and remote cross-field rule analysis by respective validation engines 1700 executing on a user computing device 2611 and host computer 2608.

As noted above with reference to FIG. 26B, validation engine 1700 may be downloaded to the user's computing device 2611, and browser 2615 executing on the user's computing device 2611 and that is utilized to access the on-line version of the tax return preparation application serves as an operating system that executes the validation engine 1700. For example, validation engine 1700 may be programmed in JAVASCRIPT object oriented programming language executed by the browser 2615, and cross-field rules 1710 may be downloaded to and stored in a data store 240 of the user's computing device 2611. This type of hybrid implementation 2630 may be useful in cases when, for example, the user has limited or intermittent network 2612 connections.

According to one embodiment, the complete set of cross-field rules 1710 is maintained on the server side or backend tax return preparation application as well as on user's computing device 2608 for use by browser-based validation engine 1700. This may apply to the front end or client side configuration 2620 and the hybrid configuration 2630. Or, validation engines 1700 of user computing device 2611 and host computer 2608 may share cross-field rules, e.g., as a cloud resource.

According to another embodiment, e.g., in hybrid configuration 2630, selected cross-field rules 1710 are downloaded to the user's computing device 1602 on the client side or front end. According to one embodiment, rules 1712 are selected for download to user's computing device 2602 on an as needed basis. In other words, as the user navigates interview screens 432, forms or worksheets presented by the tax return preparation application, fields 2210 that are selected by the user or populated with data are used to select associated cross-field rules 1712, which are then downloaded from host computer 2608 to the user's computing device 2602, or downloaded when network 2612 connection between user's computing device 2602 and host computer 2608 is available.

For example, if user enters data for Form W2, Box 1 for wages, a request is transmitted to the host computer 2608 for cross-field rules involving "wages" or "Form W2, Box 1" and in response, validation engine 1700 executing on host computer 2608 can select the pertinent cross-field rules 1710 and transmit them to user's computing device 2602, where they are stored in shared data store 240 of the user's computing device 2602 until called by browser-based validation engine 1700.

According to another embodiment, a pre-determined set of cross field rules 1710 are selected to be transmitted to user's computing device 2602. For example, cross-field rules 1710 that are determined to be utilized most often can be selected by validation engine 1700 or this purpose.

According to one embodiment, cross-field rules 1710 are analyzed by either client side validation engine 1700, whereas other cross-field rules 1710 are analyzed by server side or host validation engine 1700. Thus, in these embodiments, there is no duplicate analysis of cross-field rules 1710. According to another embodiment, cross-field rules 1710 are analyzed by the client side validation engine and by the server side or host validation engine 1700. Thus, in these embodiments, there the analysis performed by the host validation engine 1700 serves to "double check" results 2618 generated by client side or front end validation engine 1700.

As the user enters data using client computing device 2602, and browser-based validation engine 1700 is executed, the acquired data is eventually transmitted to backend system host computer 2608, e.g., when network connection 2612 is available when utilizing the front end or hybrid configurations. When cross-field rules 1710 are identified as having at least one condition or constraint 1712 that is not satisfied by the current runtime data 442, a non-binding suggestion 411 can be generated by the host computer 2608 and presented to UI controller 430 for resolution via an interview screen 432 presented to the user.

According to one embodiment, and as noted above with reference to FIG. 26B, hybrid systems 2630, which involve cross-field checks performed by a front end systems 2620, are able to perform validation checks, but in certain embodiments, do not have functionality for generating or processing non-binding suggestions 411 regarding same, which instead is executed by the backend or server side 2610. Thus, for example, hybrid systems 2630 can perform various validations, and then provide the validation results to the backend of the system, which can then integrate those results into non-binding suggestions 411.

Various tax return data and inconsistency synchronization methods may be utilized depending on the system configuration employed. For example, systems can be configured such that that electronic tax return data that was provided by the user through browser 2615 is written directly to shared data store 440, and the back end tax logic agent 410 then reads runtime data 442 from shared data store 440 as described above. According to another embodiment, this data is written to UI controller 430 with associated instance identifiers 422, and then UI controller 430 writes the data to shared data store 440 together with respective instance identifiers 422 and generating instance identifiers 422 as appropriate.

In certain embodiments, the UI controller 430, as described above with reference to FIG. 19, may also perform validation checks using cross-field rules 1710 on data received from client computing device 1602. In the event that there is a conflict between data received from the user's computing device 2611 and data that is already stored in shared data store 440, certain data, e.g., the data with the most recent timestamp, or data that is received from user's computing device 2611, can be designated as controlling data for purposes of updating "active" and "inactive" tags 2300 in shared data store 440.

According to another embodiment, data regarding an error or inconsistency identified utilizing cross-field rules 1700, or results 2618 generated by the client side or front end validation engine 1700, are provided to the server side or backend validation engine 1700, and then used by tax logic agent 410 to generate non-binding suggestions 411. In another embodiment, validation engine results 2618 are received by the UI controller 430, written to shared data store 440 with tags 2300 identifying them as validation results received from the user's computing device 2611, and this result data is read by tax logic agent 410 and incorporated into a non-binding suggestion 411 generated by tax logic agent 410.

Thus, it will be understood that system embodiments may be implemented in different ways to implement local, remote or distributed validation checks and analysis of cross-field rules 1710, and that the electronic tax return data provided by the user, and results 2618 generated by remote or distributed cross-field checks, can be synchronized and processed by a host computer's tax logic agent 410, UI controller 430 and shared data store 440 in different ways.

Further, while certain embodiments are described with reference to user's computing device 2602 executing browser 2615 to utilize an on-line version of the tax return preparation application, it will be understood that embodiments can also be implemented in desktop versions of the tax return preparation application. In these embodiments, tax logic agent 410, UI controller 430, shared data store 440 and validation engine 1700 and associated cross-field rules 1710 are embodied in a desktop version of a tax return preparation application that executes on the user's computing device 2602.

Figure 27:
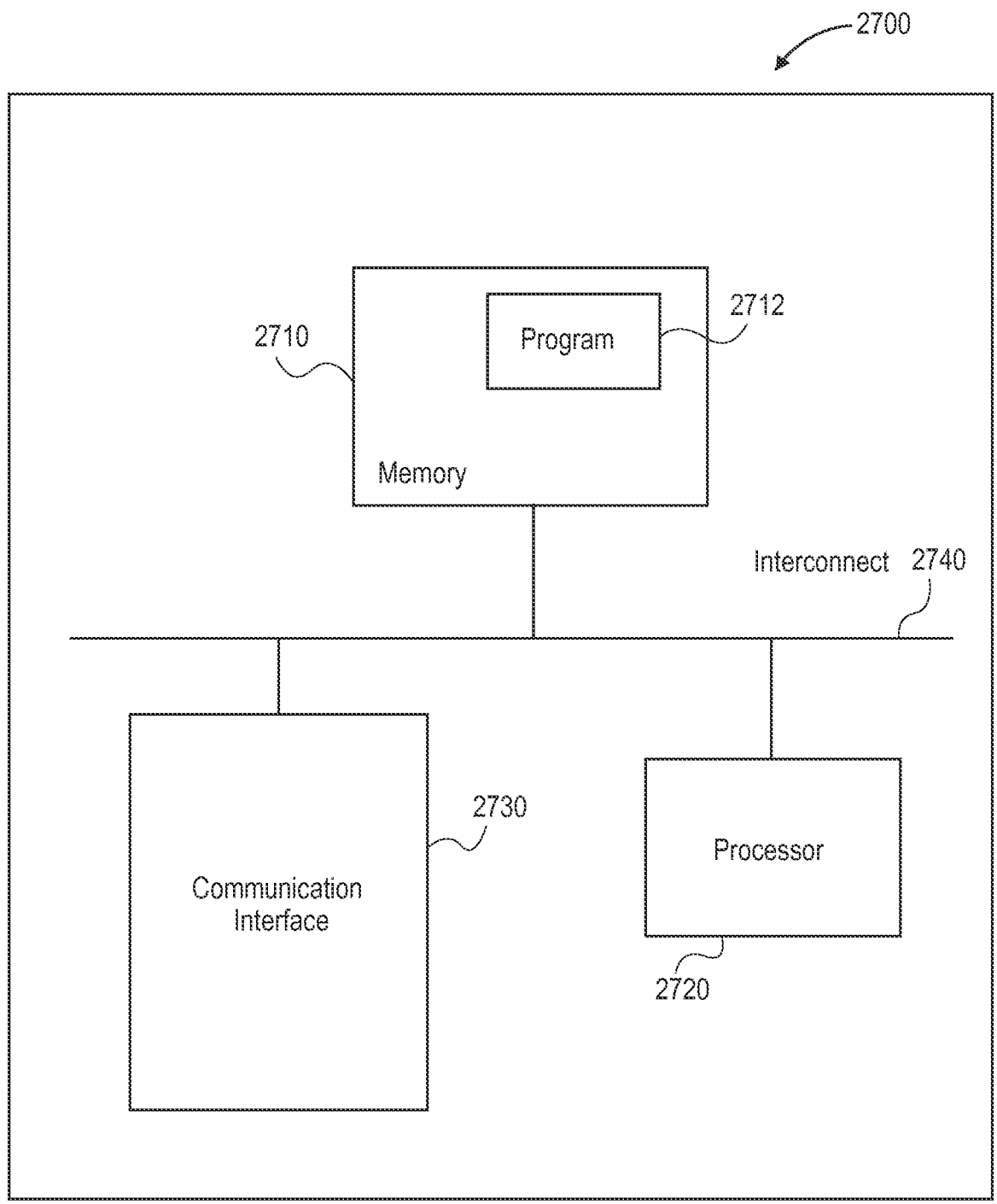
FIG. 27 is a block diagram of components of a system constructed according to another embodiment for performing semantic dependency resolution.

FIG. 27 generally illustrates certain components of a computing device 2700 that may be utilized to execute or that may embody components of embodiments. For example, the computing device may include a memory 2710, program instructions 2712, a processor or controller 2720 to execute instructions 2712, a network or communications interface 2730, e.g., for communications with a network or interconnect 2740 between such components. The memory 2710 may be or include one or more of cache, RAM, ROM, SRAM, DRAM, RDRAM, EEPROM and other types of volatile or non-volatile memory capable of storing data. The processor unit 2720 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2740 may include a system bus, LDT, PCI, ISA, or other types of buses, and the communications or network interface may, for example, be an Ethernet interface, a Frame Relay interface, or other interface. The network interface 2730 may be configured to enable a system component to communicate with other system components across a network which may be a wireless or various other networks. It should be noted that one or more components of computing device 2700 may be located remotely and accessed via a network. Accordingly, the system configuration provided in FIG. 27 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2720 performs steps or executes program instructions 2712 within memory 2710 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Further, where methods and steps described above indicate certain events occurring in certain order, those of ordinary skill in the art having the benefit of this disclosure would recognize that the ordering of certain steps may be modified and that such modifications are in accordance with the variations of the invention. For example, while certain embodiments are described with reference to separate rule and validation engines, which execute based on different data structures, whether a decision table or cross-field rules, rule engine and validation engine processing may be performed simultaneously or in different orders, and non-binding suggestions based thereon can be generated and transmitted simultaneously or in different orders. Additionally, certain of the steps may be performed concurrently in a parallel process as well as performed sequentially. Thus, the methods shown in various flow diagrams are not intended to be limited to a particular sequential order, unless otherwise stated or required.

Further, while certain embodiments have been described individually and in certain combinations, it will be understood that embodiments may involve combinations of one or more of cross-field detection, data updates and management for instance identifiers, active designations and inactive or shadow designations, and methods and systems involving or directed to backend, frontend and hybrid system architectures.

Accordingly, embodiments are intended to exemplify alternatives, modifications, and equivalents that may fall within the scope of the claims.

What is claimed is:

1. A computer-implemented method, comprising:
reading, from a shared data store, by a logic agent comprising computer-executable instructions of a computerized tax return preparation application executed by a processor of a computer, data of the electronic tax return prepared by the computerized tax return preparation application;
accessing, by a validation engine of the logic agent, a plurality of cross-field rules, comparing the data read from the shared data store to conditions of respective cross-field rules, and identifying at least one cross-field rule including at least one condition that is not satisfied based at least in part upon the data read from the shared data store;
the logic agent generating a non-binding suggestion based at least in part upon the at least one identified cross-field rule and transmitting the non-binding suggestion to a user interface controller; and the user interface controller, receiving the non-binding suggestion from the logic agent, tax logic determinations being executed independently of and before the user interface controller receives the non-binding suggestion, generating a first interview screen involving the at least one identified cross-field rule, the first interview screen being presented to a user through a display of the computer without the user navigating to the first interview screen, receiving an answer provided by the user through the first interview screen and writing the answer to the shared data store to generate updated data, wherein the answer replaces data in the shared data store that caused the at least one condition of the at least one cross-field rule to not be satisfied, and replaced data is maintained in the shared data store as inactive data and is associated with the corresponding updated data in the shared data store.

2. The method of claim 1, the at least one identified cross-field rule specifying conditions involving at least three fields of the electronic tax return.

3. The method of claim 1, the non-binding suggestion being generated for the at least one identified cross-field rule involving a first field and a second field of a single interview screen generated by the user interface controller.

4. The method of claim 1, the non-binding suggestion being generated for the at least one identified cross-field rule involving
a first field of a the first interview screen generated by user interface controller and
a second field of a second interview screen generated by the user interface controller different than the first interview screen.

5. The method of claim 1, the non-binding suggestion being generated for the at least one identified cross-field rule involving a first field and a second field of a single tax form or worksheet of the electronic tax return.

6. The method of claim 1, the non-binding suggestion being generated for the at least one identified cross-field rule involving a first field of a first tax form or worksheet of the electronic tax return and a second field of a second tax form or worksheet of the electronic tax return that is different than the first tax form or worksheet.

7. The method of claim 1, the non-binding suggestion being generated for a first field and a second field of the same tax topic.

8. The method of claim 1, the non-binding suggestion being generated for a first field of a first topic and a second field of a second topic that is different than the first topic, the first field being in the first interview screen generated by the user interface controller, and the second field being in a second interview screen generated by the user interface controller.

9. The method of claim 1, the non-binding suggestion being generated based at least in part upon the at least one identified cross-field rule and an inconsistency between data of a first field and data of a second field.

10. The method of claim 9, the inconsistency involving a first numerical value and a second numerical value.

11. The method of claim 9, the inconsistency involving a first field and a selected option of a plurality of options.

12. The method of claim 11, the selected option comprising a box presented within an interview screen generated by the user interface controller and selected or checked by the user.

13. The method of claim 11, the selected option comprising a binary response option selected by the user.

14. The method of claim 9, the inconsistency involving data of a first field of the electronic tax return and an unpopulated second field of the electronic tax return.

15. The method of claim 9, the inconsistency involving first runtime data of a first field of the electronic tax return and a format of data of a second field of the electronic tax return.

16. The method of claim 1, the shared data store comprising respective instance identifiers differentiating a first document or topic that was the subject of the non-binding suggestion and a second document or topic that was not the subject of the non-binding suggestion.

17. The method of claim 1, further comprising the user interface controller:
determining how the at least one condition can be satisfied based at least in part upon the non-binding suggestion generated by the logic agent; and
automatically writing the shared data store to update the data, the updated data satisfying the at least one condition of the at least one cross-field rule that was previously not satisfied, the updated data written by the user interface controller replacing data that caused the at least one condition of the at least one cross-field rule to not be satisfied.

18. The method of claim 17, further comprising the user interface controller generating an interview screen requesting user confirmation of the updated data that was automatically written to the shared data store by the user interface controller.

19. The method of claim 1, the answer modifying data of a previously populated field of the electronic tax return.

20. The method of claim 1, the user interface controller populating a previously unpopulated field with the answer.

21. The method of claim 1, further comprising;
the logic agent reading updated data of the electronic tax return from the shared data store, and
the validation engine accessing the plurality of cross-field rules, comparing the updated data and conditions of respective cross-field rules, and determining whether any cross-field rule includes a condition that is not satisfied based at least in part, upon the updated data.

22. The method of claim 1, the inactive data and the active, updated data being associated with each other through a common instance identifier.

23. The method of claim 1, the inactive data and the active, updated data being identified by respective tags indicating respective inactive and active statuses.

24. The method of claim 1, further comprising:
the logic agent reading the active, updated data and associated inactive data, the validation engine utilizing the active, updated data, to determine whether any cross-field rule includes at least one condition that is not satisfied based at least in part upon the active, updated data,
the logic agent generating a second non-binding suggestion involving the active, updated data, and providing the second non-binding suggestion to the user interface controller; and
the user interface controller
receiving the non-binding suggestion involving the active, updated data generated by the logic agent, and
generating a second interview screen indicating that the inactive data was utilized before the active, updated data.

25. The method of claim 1, further comprising the user interface controller:
reactivating the inactive data such that when the logic agent next reads the updated runtime data from the shared data store, the updated data includes the reactivated data.

26. The method of claim 1, further comprising the computer receiving through a network and from a computing device of a user executing a browser to access the computerized tax return preparation application, data identifying at least one other cross-field rule including at least one condition that is not satisfied based at least in part upon user data provided through the browser.

27. The method of claim 26, the computer receiving data of the at least one other cross-filed rule through the logic agent, the method further comprising the logic agent generating at least one other non-binding suggestion based at least in part upon the at least one other identified cross-field rule; and
the user interface controller receiving the at least one other non-binding suggestion generated by the logic agent and generating a second interview screen involving the at least one other identified cross-field rule, the second interview screen being presented to the user through the browser.

28. The method of claim 26, the computer receiving runtime data of the electronic tax return through the user interface controller from the computing device of the user executing the browser, the method further comprising the user interface controller writing the received runtime data to the data store to update the runtime data of the data store, and the logic agent reading the updated data from the data store and executing the validation engine, the validation engine accessing the plurality of cross-field rules, comparing the updated data and conditions of respective cross-field rules, and determining whether any cross-field rule includes a condition that is not satisfied based at least in part upon the updated data.

29. A computerized system of a computerized tax return preparation application executable by a computer, the computerized system comprising:
a user interface controller,
a logic agent in communication with the user interface controller and comprising a cross-field validation engine; and
a shared data store in communication with the user interface controller and the logic agent, wherein the user interface controller can write data to the shared data store, and the logic agent can read data from the shared data store,
the logic agent being configured or programmed to read, from the shared data store, data of the electronic tax return prepared by the computerized tax return preparation application;
the logic agent, by the cross-field validation engine, being programmed or configured to access a plurality of cross-field rules, compare the data read from the shared data store to conditions of respective cross-field rules, and identify at least one cross-field rule including at least one condition that is not satisfied based at least in part upon the data read from the shared data store;

the logic agent being programmed or configured to generate a non-binding suggestion based at least in part upon the at least one identified cross-field rule, and provide the non-binding suggestion to the user interface controller; and
the user interface controller being programmed or configured to receive the non-binding suggestion from the logic agent, tax logic determinations being executed independently of and before the user interface controller receives the non-binding suggestion, generate a first interview screen involving the at least one identified cross-field rule, the first interview screen being presented to a user through a display of the computer without the user navigating to the first interview screen, receiving an answer provided by the user through the first interview' screen and write the answer to the shared data store to generate updated data, wherein the answer replaces data in the shared data store that caused the at least one condition of the at least one cross-field rule to not be satisfied, and replaced data is maintained in the shared data store as inactive data and is associated with the corresponding updated data in the shared data store.

30. A non-transitory computer-readable medium comprising instructions, which when executed by a processor of a computer, causes the computer to execute a process comprising:
a logic agent comprising computer-executable instructions of a computerized tax return preparation application executed by a processor of a computer, reading, from a shared data store, data of the electronic tax return prepared by the computerized tax return preparation application;
a validation engine of the logic agent accessing a plurality of cross-field rules, comparing the data read from the shared data store to conditions of respective cross-field rules, and identifying at least one cross-field rale including at least one condition that is not satisfied based at least in part upon the data read from the shared data store
the logic agent generating a non-binding suggestion based at least in part upon the at least one identified cross-field rule and transmitting the non-binding suggestion to the user interface controller;
the user interface controller receiving the non-binding suggestion from the logic agent, tax logic determinations being executed independently of and before the user interface controller receives the non-binding suggestion, generating a first interview screen involving the at least one identified cross-field rule, the first interview screen being presented to a user through a display of the computer without the user navigating to the first interview screen, receiving an answer provided by the user through the first interview screen and writing the answer to the shared data store to generate updated data, wherein the answer replaces data in the shared data store that caused the at least one condition of the at least one cross-field rule to not be satisfied, and replaced data is maintained in the shared data store as inactive data and is associated with the corresponding updated data in the shared data store.

* * * * *